United States Patent
Seo et al.

(10) Patent No.: US 9,807,719 B2
(45) Date of Patent: Oct. 31, 2017

(54) METHOD FOR RECEIVING SIGNAL BY USING DEVICE-TO-DEVICE COMMUNICATION IN WIRELESS COMMUNICATION SYSTEM

(71) Applicant: LG ELECTRONICS INC., Seoul (KR)

(72) Inventors: Hanbyul Seo, Seoul (KR);
Byounghoon Kim, Seoul (KR);
Jonghyun Park, Seoul (KR);
Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 14/775,464

(22) PCT Filed: Mar. 13, 2014

(86) PCT No.: PCT/KR2014/002118
§ 371 (c)(1),
(2) Date: Sep. 11, 2015

(87) PCT Pub. No.: WO2014/142576
PCT Pub. Date: Sep. 18, 2014

(65) Prior Publication Data
US 2016/0029331 A1    Jan. 28, 2016

Related U.S. Application Data

(60) Provisional application No. 61/786,134, filed on Mar. 14, 2013, provisional application No. 61/829,271, (Continued)

(51) Int. Cl.
*H04W 56/00* (2009.01)
*H04L 5/00* (2006.01)
(Continued)

(52) U.S. Cl.
CPC ......... *H04W 56/002* (2013.01); *H04L 5/0048* (2013.01); *H04L 27/2613* (2013.01);
(Continued)

(58) Field of Classification Search
CPC ............. H04W 56/002; H04L 27/2692; H04L 27/2613; H04L 27/2656; H04L 5/0048
See application file for complete search history.

(56) References Cited

U.S. PATENT DOCUMENTS

2009/0016320 A1   1/2009 Li et al.
2009/0323642 A1*  12/2009 Tanno ................ H04B 1/7075
                                                      370/336
(Continued)

FOREIGN PATENT DOCUMENTS

EP    1892865 A1    2/2008
EP    2688226 A2    1/2014
(Continued)

*Primary Examiner* — Jackie Zuniga Abad
(74) *Attorney, Agent, or Firm* — Birch, Stewart, Kolasch & Birch, LLP

(57) ABSTRACT

Disclosed is a method by which a first terminal receives a signal in a wireless communication system. Particularly, the method comprises the steps of: receiving a synchronization signal for device-to-device communication from a second terminal; obtaining synchronization based on the synchronization signal; receiving a boundary signal for the device-to-device communication from the second terminal; and receiving a control signal or a data signal using the device-to-device communication based on the boundary signal, wherein the synchronization signal is transmitted by using a part of one symbol.

14 Claims, 48 Drawing Sheets

Related U.S. Application Data filed on May 31, 2013, provisional application No. 61/843,062, filed on Jul. 5, 2013, provisional application No. 61/863,873, filed on Aug. 8, 2013, provisional application No. 61/869,629, filed on Oct. 28, 2013, provisional application No. 61/902,227, filed on Nov. 10, 2013.

(51) Int. Cl.
*H04L 27/26* (2006.01)
*H04W 88/02* (2009.01)

(52) U.S. Cl.
CPC ...... *H04L 27/2656* (2013.01); *H04L 27/2692* (2013.01); *H04W 88/02* (2013.01)

(56) References Cited

U.S. PATENT DOCUMENTS

| | | |
|---|---|---|
| 2011/0051747 A1 | 3/2011 | Schmidl et al. |
| 2012/0163278 A1 | 6/2012 | Chang et al. |
| 2012/0224546 A1 | 9/2012 | Chang et al. |
| 2014/0064203 A1 | 3/2014 | Seo et al. |

FOREIGN PATENT DOCUMENTS

| | | |
|---|---|---|
| KR | 10-2010-0038226 A | 4/2010 |
| KR | 10-2012-0073147 A | 7/2012 |
| KR | 10-2012-0100833 A | 9/2012 |
| WO | WO 2012/128505 A2 | 9/2012 |

\* cited by examiner

-- Prior Art --

FIG. 18
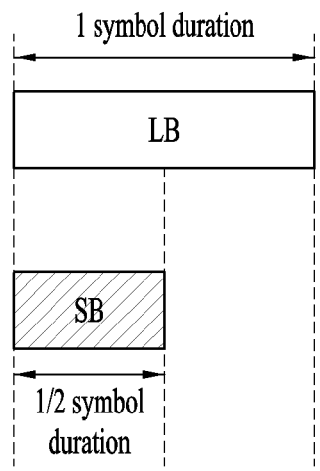
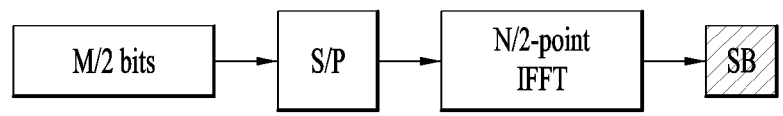
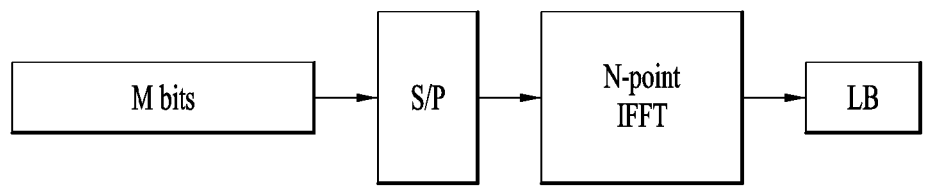
FIG. 19
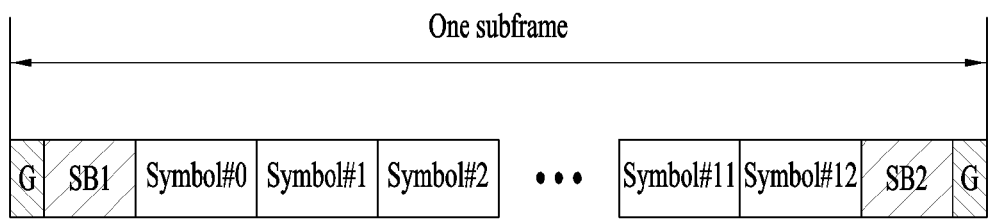

METHOD FOR RECEIVING SIGNAL BY USING DEVICE-TO-DEVICE COMMUNICATION IN WIRELESS COMMUNICATION SYSTEM

CROSS REFERENCE TO RELATED APPLICATION

This application is the National Phase of PCT International Application No. PCT/KR2014/002118, filed on Mar. 13, 2014, which claims priority under 35 U.S.C. 119(e) to U.S. Provisional Application No. 61/786,134, filed on Mar. 14, 2013, 61/829,271 filed on May 31, 2013, 61/843,062, filed on Jul. 5, 2013, 61/863,873, filed on Aug. 8, 2013, 61/896,629, filed on Oct. 28, 2013, and 61/902,227, filed on Nov. 10, 2013, all of which are hereby expressly incorporated by reference into the present application.

TECHNICAL FIELD

The present invention relates to a wireless communication system and, more specifically, to a method for receiving a signal using device-to-device communication in a wireless communication system.

BACKGROUND ART

The present invention describes a method for receiving a signal in device-to-device communication.

Prior to description of the present invention, device-to-device communication is described. FIG. 1 is a conceptual diagram of device-to-device communication.

Referring to FIG. 1, UE1 120 and UE2 130 perform device-to-device communication. Here, a UE refers to a terminal of a user. However, network equipment such as a base station can be regarded as a UE when the network equipment transmits and receives signals using device-to-device communication. An eNB can control positions of time/frequency resources, transmit power and the like for device-to-device communication between UEs using appropriate control signals. However, when UEs are located outside the coverage of an eNB 110, device-to-device communication can be performed without a control signal of the eNB 110. In the following description, device-to-device communication is referred to as D2D communication, a link for D2D communication is referred to as a D2D link and a link through which a UE communicates with an eNB is referred to as an NU (eNB-UE) link.

The UEs linked to the eNB 110 perform D2D communication using subframes and perform communication with the eNB using other subframes. When such D2D system is designed, it is necessary to consider timing advance provided to uplink transmission of UE1 120 and UE2 130 and propagation delay between UE1 120 and UE2 130. When UE1 120 transmits a signal to UE2 130, the boundary of a D2D subframe received by UE2 130 may not correspond to a subframe boundary of UE1 120 and a subframe boundary of UE2 130 due to propagation delay generated during transmission. Since D2D communication is generally performed between UEs located close to each other, it is possible to assume that D2D communication is performed with round-trip propagation delay within 0.5 orthogonal frequency division multiplexing (OFDM) symbol. When a UE transmits a signal to the eNB in a specific subframe and receives a D2D signal in the subsequent subframe, a predetermined time is required for switching from transmission operation to reception operation. Furthermore, even when the UE performs the reception operation and then transmits a signal to the eNB in the subsequent subframe, a predetermined time is required for switching from reception operation to transmission operation. That is, a predetermined guard interval (referred to as GI hereinafter) is present between a D2D link subframe and an NU link subframe for cancellation of propagation delay between UEs and transmission/reception operation switching, and transmission and reception of significant signals need to be suspended in the GI. In general, the GI is shorter than the duration of a single OFDM symbol and, particularly, can be regarded as being less than 0.5 symbol duration.

When the GI is set to be less than 0.5 symbol length, a special signal can be transmitted using the remaining 0.5 symbol duration of one symbol. The special signal can be used to detect a correct time at which a D2D subframe starts by using a sequence known to a D2D receiver UE. In view of this, the special signal can be called a D2D subframe synchronization signal or a D2D subframe determining signal. The special signal may be used for channel estimation for D2D signals and measurement for channel state information (CSI) feedback since the special signal is known to a D2D receiver.

DISCLOSURE

Technical Problem

An object of the present invention devised to solve the problem lies in a method for receiving a signal using D2D communication in a wireless communication system.

Technical Solution

In an aspect of the present invention, a method for receiving a signal using device-to-device communication in a wireless communication system includes: receiving a synchronization signal for device-to-device communication from a second terminal; acquiring synchronization based on the synchronization signal; receiving a boundary signal for device-to-device communication from the second terminal; and receiving a control signal or a data signal through device-to-device communication based on the boundary signal, wherein the synchronization signal is transmitted using a part of one symbol.

The symbol may include N intervals, the synchronization signal may be transmitted using M intervals from among the N intervals and the remaining N−M intervals may be used as a guard interval. The synchronization signal may be repeated in the M intervals. Accordingly, the synchronization may be acquired based on a difference between a starting point of the synchronization and a starting point of a window.

The boundary signal may be transmitted using a sequence different from the synchronization signal.

The receiving of the control signal or the data signal using device-to-device communication based on the boundary signal may include determining a bandwidth of the control signal or the data signal based on a bandwidth of the boundary signal. The bandwidth of the boundary signal may be a subset of the bandwidth of the control signal or the data signal. The boundary signal may be transmitted in resource blocks $k-k_1$ to $k+k_2$, the control signal or the data signal may be transmitted in resource blocks $n_1$ to $n_2$, and k may be determined by $floor((n_1+n_2)/2)$. The number of resource blocks in which the boundary signal is transmitted may be determined by the number of resource blocks in which the data signal or the control signal is transmitted. In addition, the resource blocks in which the boundary signal is transmitted may be grouped into a plurality of groups, and the number of resource blocks in which the boundary signal is transmitted may be determined per group.

The control signal or the data signal may be received using the same bandwidth as that of the boundary signal, and the second terminal may be identified based on the sequence of the boundary signal transmitted from the second terminal. The boundary signal may be generated based on specific parameters, wherein the specific parameters are determined based on a hashing function by which IDs of a plurality of terminals are mapped to one parameter.

The boundary signal may be generated based on specific parameters, wherein the specific parameters are associated with transmission parameters of the control signal or the data signal. The transmission parameters may be grouped into a plurality of groups, wherein the groups are associated with the specific parameters. Specifically, parameters of the control signal or the data signal may include at least one of the bandwidth of the control signal, the bandwidth of the data signal and a demodulation reference signal parameter.

The synchronization signal may be a sounding reference signal.

The boundary signal may be a demodulation reference signal.

Advantageous Effects

According to embodiments of the present invention, it is possible to efficiently receive a signal using D2D communication in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 18 illustrates a method of comparing a short block with a long block and generating a short block.
FIG. 19 illustrates an example of allocating a short block to a symbol including a GI.

BEST MODE

Figure 1:
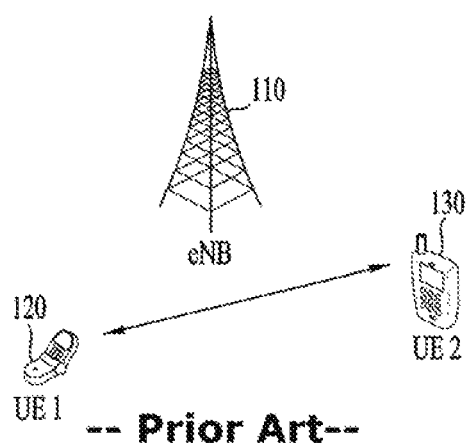
FIG. 1 is a conceptual diagram of D2D communication.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or may be substituted for corresponding configurations or features of another embodiment.

In this specification, embodiments of the present invention are described centering on the data transmission/reception relations between a base station and a user equipment. In this case, a base station has a meaning of a terminal node of a network directly communicating with a user equipment. In this disclosure, a specific operation explained as performed by a base station may be performed by an upper node of the base station in some cases.

In particular, in a network constructed with a plurality of network nodes including a base station, it is apparent that various operations performed for communication with a user equipment may be performed by a base station or other network nodes except the base station. 'Base station (BS)' may be substituted with such a terminology as a fixed station, a Node B, an eNode B (eNB), an access point (AP), Remote Radio Head (RRD), Transmission point (TP), Reception Point (RP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies may be modified into a different form in a range of not deviating from the technical idea of the present invention.

Occasionally, to prevent the present invention from getting vaguer, structures and/or devices known to the public are skipped or may be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA may be implemented with such a radio technology as UTRA (universal terrestrial radio access), CDMA 2000 and the like. TDMA may be implemented with such a radio technology as GSM/GPRS/EDGE (Global System for Mobile communications)/General Packet Radio Service/Enhanced Data Rates for GSM Evolution). OFDMA may be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

Figure 2:
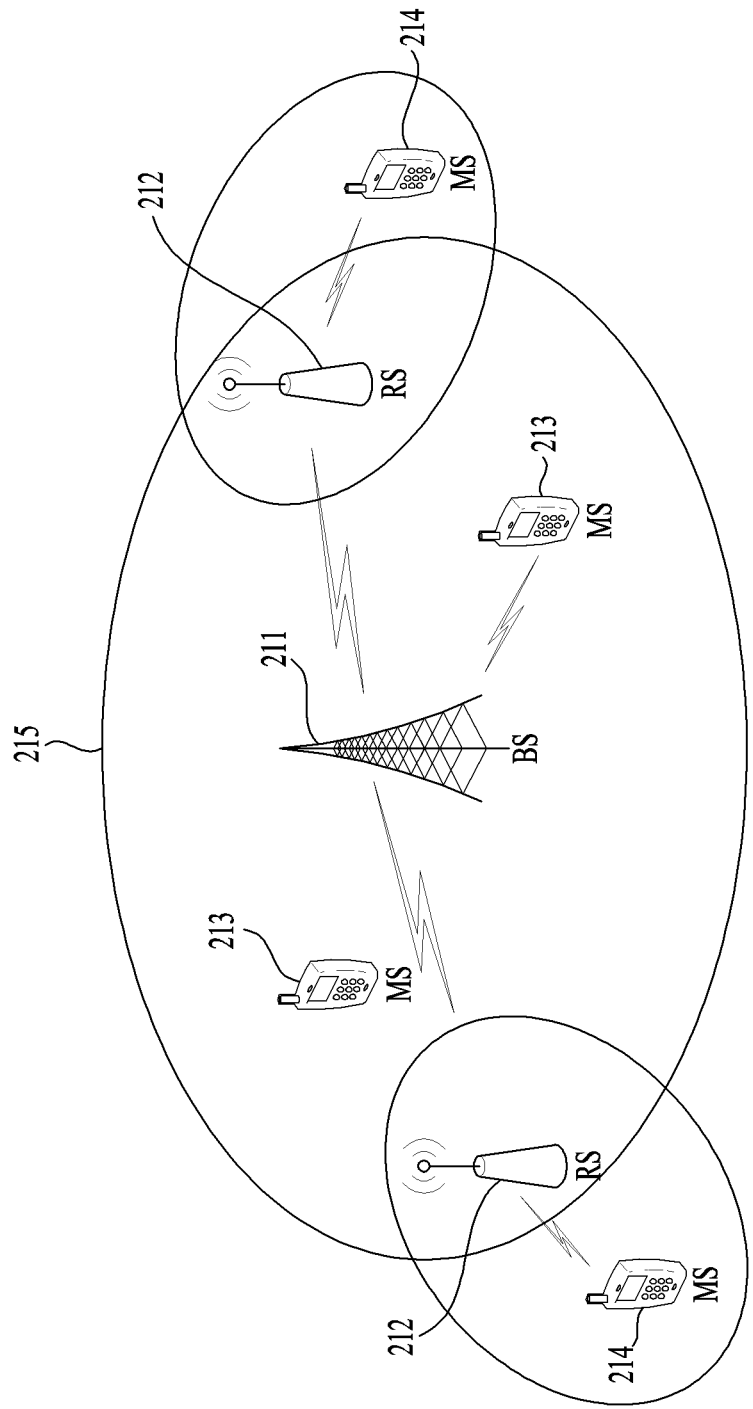
FIG. 2 illustrates a wireless communication system including a relay station.

FIG. 2 illustrates a wireless communication system including relay stations.

Referring to FIG. 2, a wireless communication system 210 including relay stations includes at least one base station (BS) 211. Each BS 211 provides communication services for a specific geographical area 215 called a cell. A cell may be divided into a plurality of regions each of which is called a sector. One or more cells may be present per BS. The BS 211 refers to a fixed station communicating with a user equipment (UE) 213 and may be called an eNB (evolved NodeB), a BTS (Base Transceiver System), an access point, an AN (Access Network) and the like. The BS 211 can execute functions such as connectivity between a relay station 212 and a UE 214, management, control and resource allocation.

The relay station (RS) 212 refers to a device that relays signals between the BS 211 and the UE 214 and may be called an RN (Relay Node), a repeater, a relay and the like. RSs can use any relay method such as AF (amplify and forward) and DF (decode and forward) and the technical spirit of the present invention is not limited thereto.

The UEs 213 and 214 can be fixed or mobile and may be called an MS (Mobile Station), a UT (User Terminal), an SS (Subscriber Station), a wireless device, a PDA (Personal Digital Assistant), a wireless modem, a handheld device, an AT (Access Terminal) and the like. In the following, a macro UE (ma UE) 213 refers to a UE directly communicating with the BS 211 and a relay UE (re UE) 214 refers to a UE communicating with an RS. Even the macro UE 213 located within the cell of the BS 211 can communicate with the BS 211 via the RS 212 for transmission speed improvement according to diversity effects.

In the following description, links between the BS 211 and the macro UE 213 are referred to as macro links. The macro link can be divided into a macro downlink and a macro uplink. The macro downlink (M-DL) refers to communication from the BS 211 to the macro UE 213 and the macro uplink (M-UL) refers to communication from the macro UE 213 to the BS 211.

Links between the BS 211 and the RS 212 are called backhaul links. The backhaul links can be divided into a backhaul downlink (B-DL) and a backhaul uplink (B-UL). The backhaul downlink refers to communication from the BS 211 to the RS 212 and the backhaul uplink refers to communication from the RS 212 to the BS 211.

Links between the RS 212 and the relay UE 214 are called access links. The access links can be divided into an access downlink (A-DL) and an access uplink (A-UL). The access downlink refers to communication from the RS 212 to the relay UE 214 and the access uplink refers to communication from the relay UE 214 to the RS 212.

The wireless communication system 210 including an RS supports two-way communication. Two-way communication can be performed using TDD (Time Division Duplex) mode, FDD (Frequency Division Duplex) mode and the like. The TDD mode uses different time resources for uplink transmission and downlink transmission. The FDD mode uses different frequency resources for uplink transmission and downlink transmission.

Figure 3:
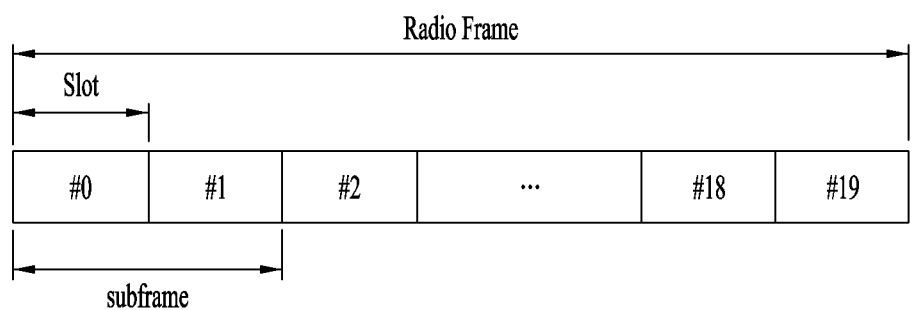
FIG. 3 illustrates a radio frame structure of 3GPP LTE.

FIG. 3 illustrates a radio frame structure used in 3GPP LTE.

Referring to FIG. 3, a radio frame has a length of 10 ms (327200×Ts) and is composed of 10 subframes of equal size. Each subframe has a length of 1 ms and consists of two slots. Each slot has a length of 0.5 ms (15360×Ts). Here, Ts indicates sampling time and Ts=1/(15 kHz×2048)=3.2552× 10−8 (approximately 33 ns). A slot includes a plurality of OFDM symbols in the time domain and includes a plurality of resource blocks (RBs) in the frequency domain. In LTE, one RB includes 12 subcarriers×7(6) OFDM symbols. A unit time in which data is transmitted, TTI (Transmission Time Interval), can be set to one or more subframes. The TTI may be a minimum scheduling unit. A unit time of a D2D subframe in which D2D transmission and reception operations are performed according to the present invention can be set to one subframe or one or more subframes.

The aforementioned radio frame structure is merely an example and the number of subframes included in the radio frame, the number of slots included in a subframe and the number of OFDM symbols included in a slot can be changed.

Figure 4:
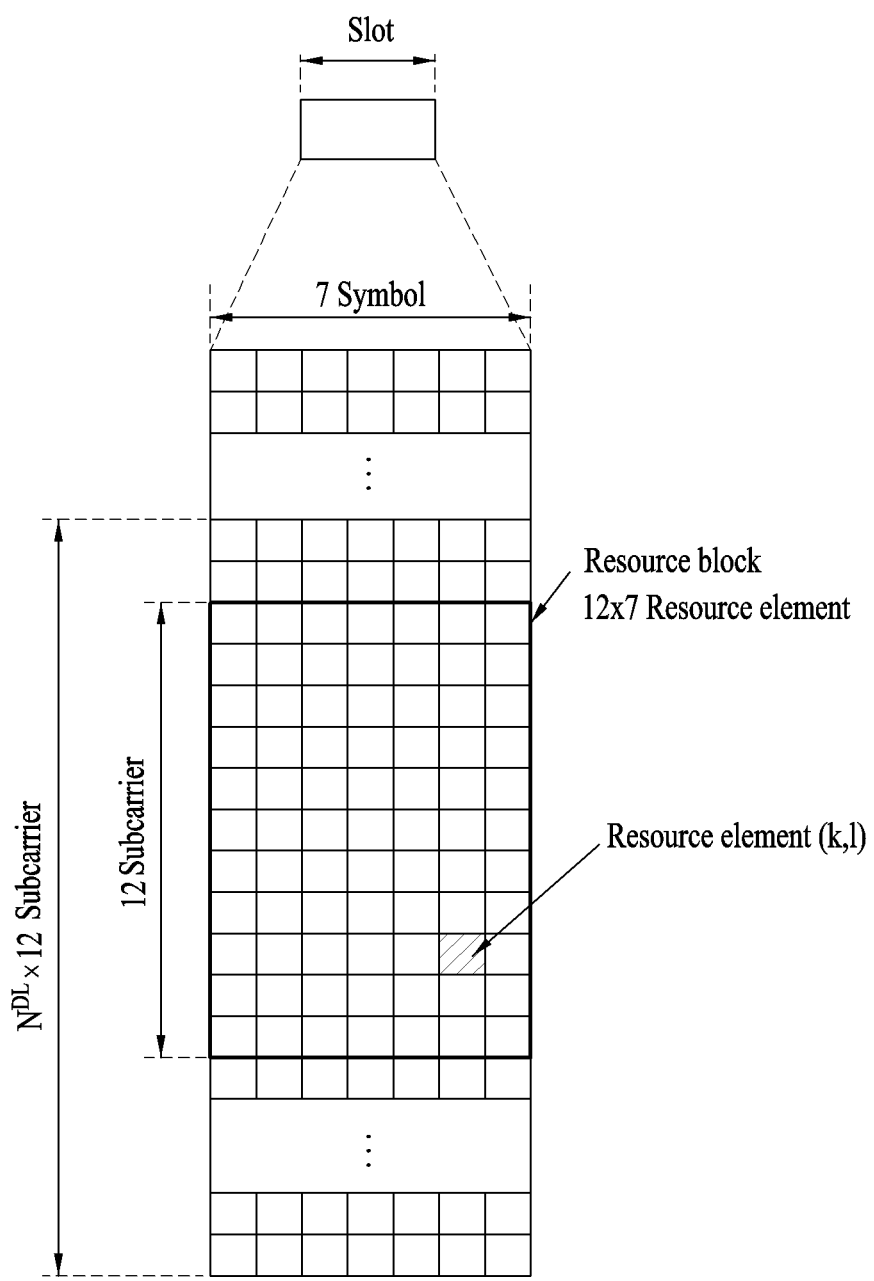
FIG. 4 illustrates a resource grid in a downlink slot.

FIG. 4 is a diagram for a resource grid in a downlink slot.

Referring to FIG. 4, one downlink (DL) slot includes 7 OFDM symbols in time domain and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 5:
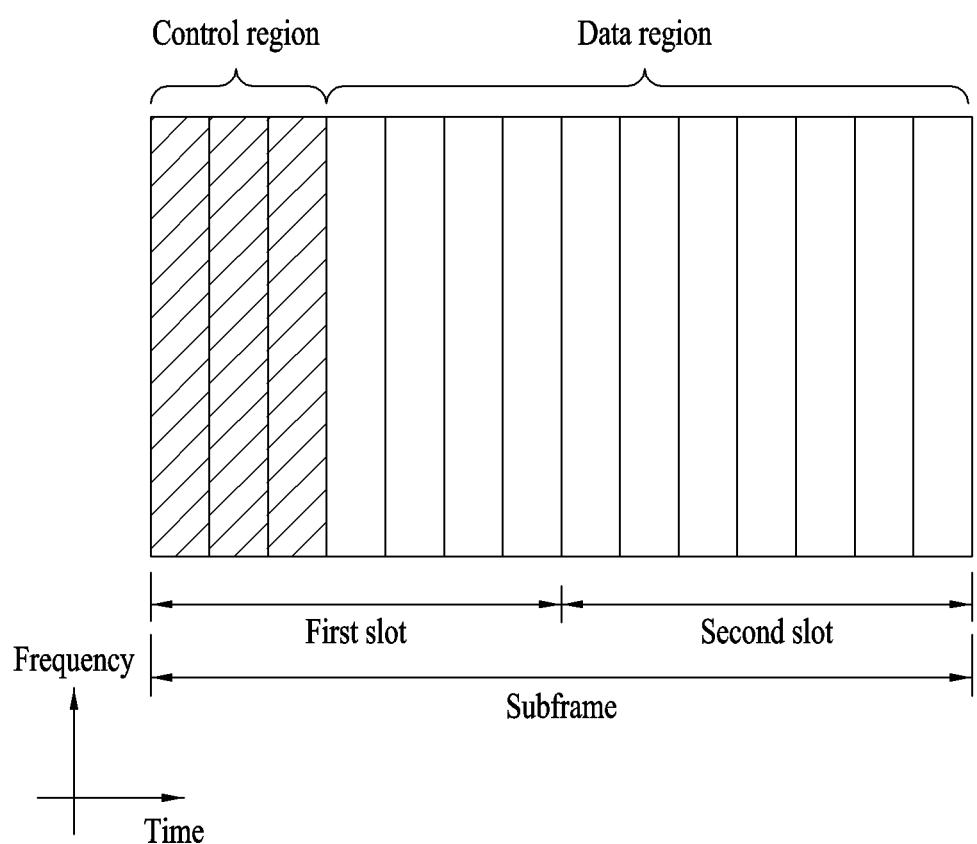
FIG. 5 illustrates a downlink subframe structure.

FIG. 5 is a diagram for a structure of a downlink (DL) subframe.

A maximum of 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipment within a random user equipment (UE) group, activation of VoIP (voice over IP) and the like. A plurality of PDCCHs may be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC may be masked with a unique identifier of the user equipment, i.e., C-RNTI (i.e., Cell-RNTI). If the PDCCH is provided for a paging message, the CRC may be masked with a paging indication identifier (e.g., P-RNTI (Paging-RNTI)). If the PDCCH is provided for system information, and more particularly, for a system information block (SIB), the CRC may be masked with a system information identifier (e.g., SI-RNTI (system information-RNTI). In order to indicate a random access response that is a response to a transmission of a random access preamble of a user equipment, CRC may be masked with RA-RNTI (random access-RNTI).

Figure 6:
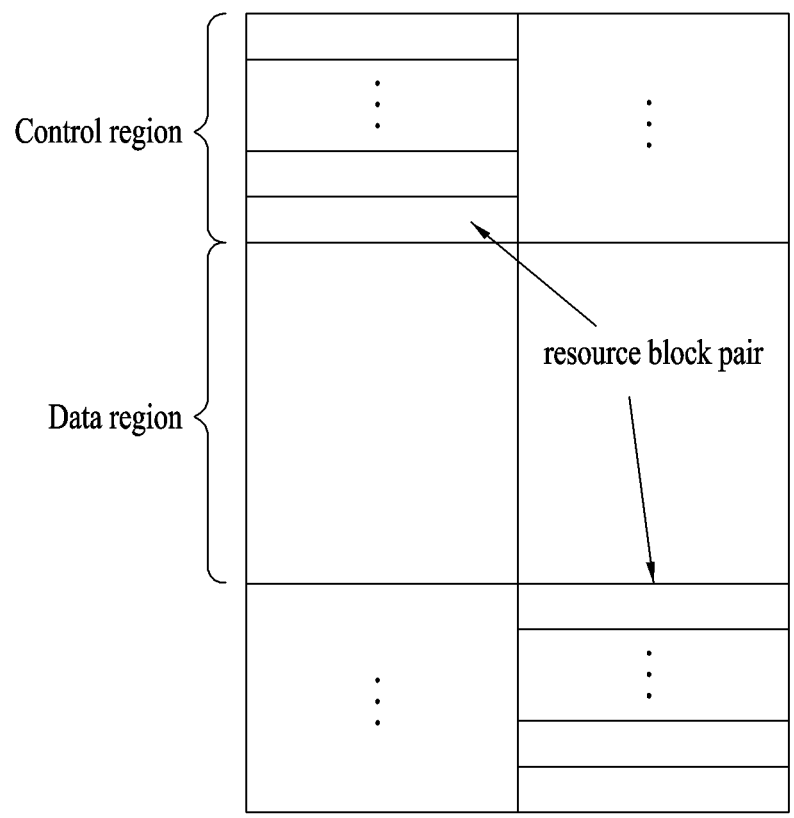
FIG. 6 illustrates an uplink subframe structure.

FIG. 6 is a diagram for a structure of an uplink (UL) subframe.

Referring to FIG. 6, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Figure 7:
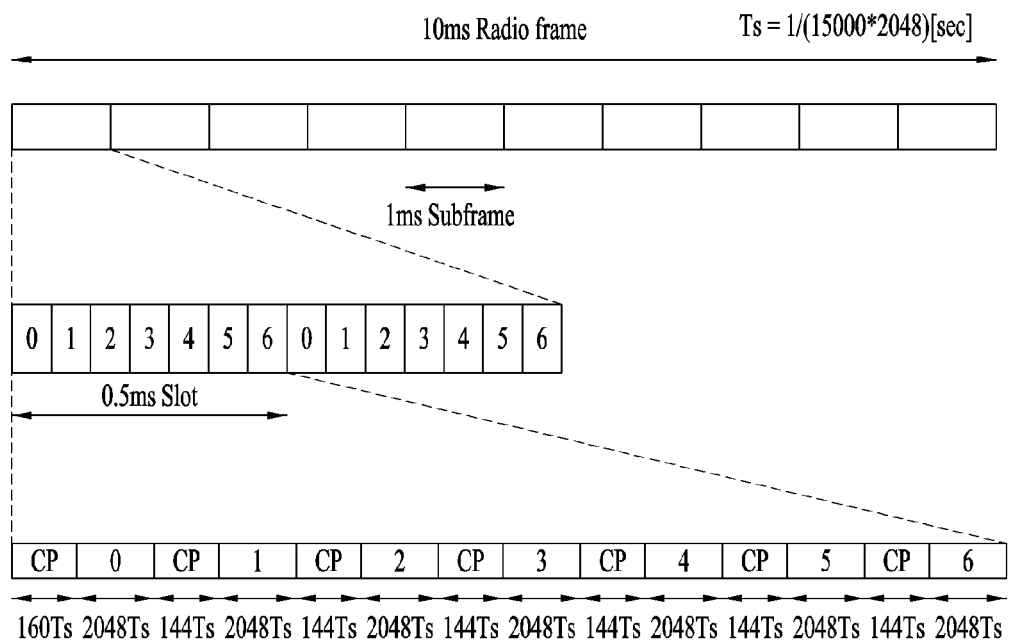
FIG. 7 illustrates an example of inserting a cyclic prefix (CP) into OFDM symbols.

FIG. 7 illustrates an example of inserting a cyclic prefix (CP) into an OFDM symbol.

Referring to FIG. 7, in the case of a normal CP, the normal CP may be inserted into 160 Ts in the first symbol of a subframe and 144 Ts in other symbols (Ts=1/(15000*2048) sec). The CP is a copy of the last part of a symbol, which is added to the head part of the symbol, and is used to avoid inter-symbol interference.

Figure 8:
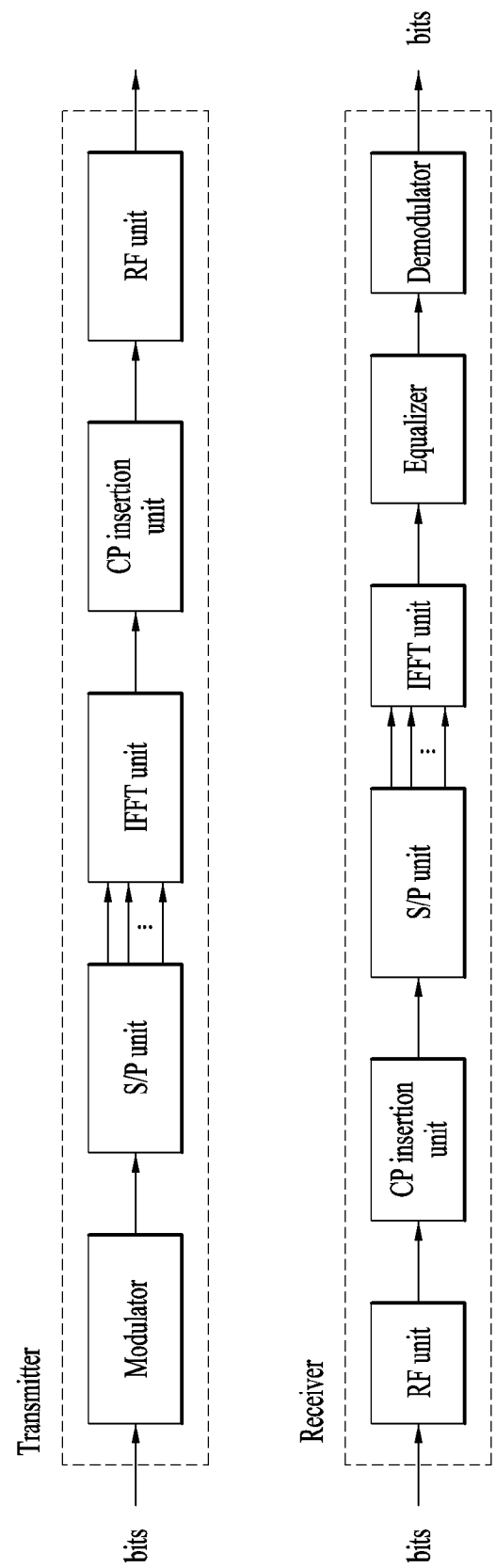
FIG. 8 illustrates exemplary structures of an OFDM transmitter and an OFDM receiver.

FIG. 8 illustrates exemplary structures of an OFDM transmitter and an OFDM receiver.

The OFDM transmitter modulates information bits to be transmitted through a modulator and applies the modulated information bits to a serial-to-parallel (S/P) unit that converts a serial signal into parallel signals. The modulator can use various modulation schemes such as quadrature phase shift keying (QPSK) and (quadrature amplitude modulation (m-QAM). Parallel signals converted by the S/P unit have a longer periodicity than channel delay spread. The parallel signals are input to an inverse fast Fourier transform (IFFT) unit, which transforms a frequency domain signal as a time domain signal, and inverse-fast-Fourier-transformed therein. Then, a CP is inserted into the inverse-fast-Fourier-transformed signal and then the signal having the CP inserted thereinto is transmitted through an RF unit. The RF unit includes at least one antenna.

The OFDM receiver receives a radio signal through an RF unit, removes a CP through a CP remover and converts the serial signal into parallel signals through an S/P unit. The parallel signals are fast-Fourier-transformed through a fast Fourier transform (FFT) unit. FFT represents the time domain signal as a frequency domain signal. The frequency domain signal is restored as data through an equalizer and a demodulator. The equalizer removes the influence of a channel on each subcarrier by multiplying each subcarrier by estimated channel response. The demodulator demodulates the data through a demodulation scheme corresponding to the modulation scheme used by the modulator.

In the present invention, the OFDM transmitter may be part of a BS or an RS. The OFDM receiver may be part of an RS or a BS.

When a wireless communication system includes an RS, it is assumed that it is difficult for the RS to simultaneously receive a signal and transmit a signal in the same frequency band. Accordingly, the RS receives or transmits signals of the same frequency band at different times. For example, the RS can operate in such a manner that the RS receives a signal from a BS in subframe #n and transmits a signal to a relay UE in subframe #n+1.

However, during signal transmission/reception switching, for example, when the RS transmits a signal of a frequency band and then receives a signal of the same frequency band or receives a signal of a frequency band and then transmits a signal of the same frequency band, a guard time (or guard interval) needs to be present between a signal transmission interval and a signal reception interval. The guard interval is required for stabilization and protection of a system or generation of a signal that satisfies requirements of the system. For example, the guard interval can include a transient time for stabilizing operation of a power amplifier for amplifying signals.

Figure 9:
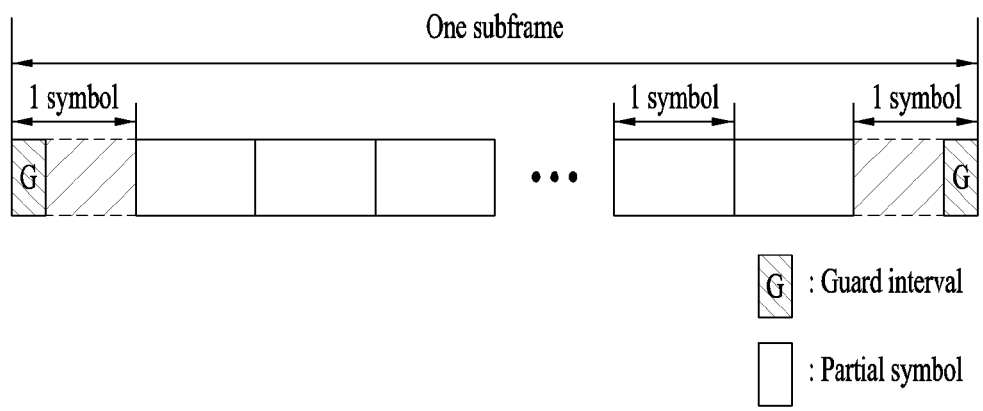
FIGS. 9 and 10 illustrate examples in which a GI is located in a subframe.
Figure 10:
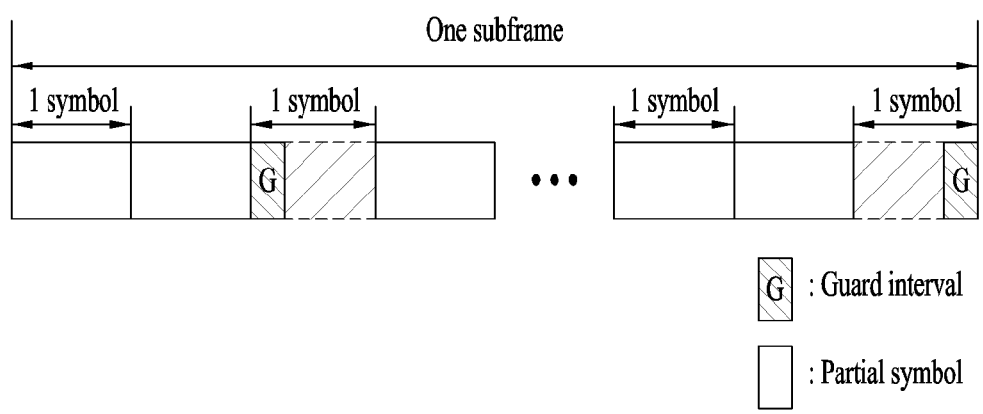

FIGS. 9 and 10 illustrate examples in which a guard interval is located in a subframe.

Referring to FIG. 9, two guard intervals are positioned at the boundaries of the subframe. That is, the first symbol and the last symbol of the subframe respectively include the guard intervals. The guard intervals may be positioned at symbols other than boundary symbols of the subframe. In FIG. 10, one of two guard intervals is positioned at a middle symbol of the subframe, that is, a symbol other than the boundary symbols of the subframe. While positions of guard intervals when a scheduling unit is a subframe are exemplified in this case, the present invention is not limited thereto. That is, when the scheduling unit is a slot, a guard interval can be positioned at the boundary of a slot or at a middle symbol of the slot (which is applied to the following description). Such guard interval may be an interval shorter than one symbol. Part of a symbol, other than the guard interval, is referred to as a partial symbol.

Figure 11:
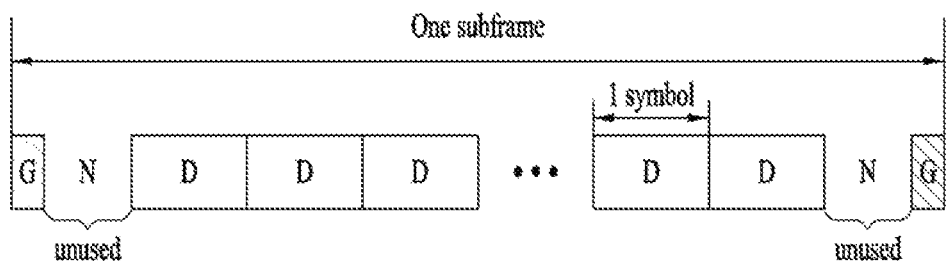
FIG. 11 illustrates a conventional method for transmitting data in a subframe including a GI.

FIG. 11 illustrates a method for transmitting data in a subframe including a guard interval.

It may be difficult to transmit data in a guard interval. When the guard interval is positioned in a symbol corresponding to a boundary of a subframe, as shown in FIG. 11, even the partial symbol of the corresponding symbol other than the guard interval is wasted without being used for data transmission. In LTE, for example, a subframe includes 14 symbols in the case of the normal CP and includes 12 symbols in the case of the extended CP. Two of the symbols are not used due to guard intervals. If scheduling is performed on a slot basis, two symbols may not be used due to guard intervals in one slot and four symbols may not be used due to guard intervals in one subframe. Accordingly, there is a need for a method of using a symbol including a guard interval for signal transmission.

Figure 12:
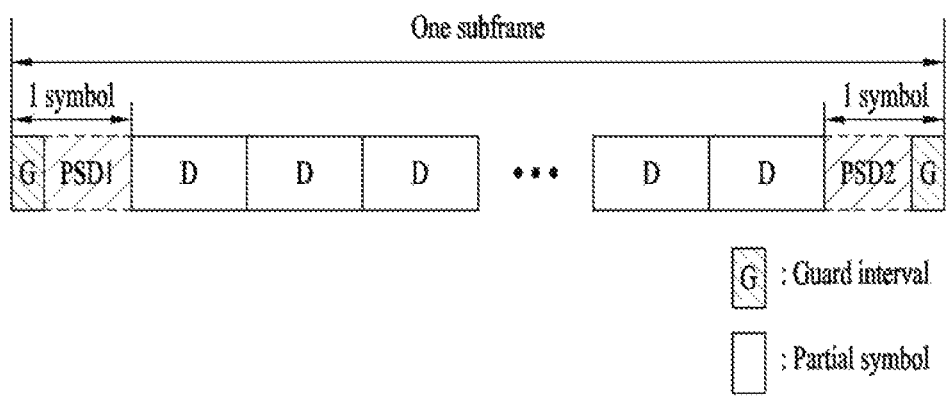
FIG. 12 illustrates an example of transmitting different pieces of data in two symbols including GIs.

FIG. 12 illustrates an example of transmitting different pieces of data in two symbols including guard intervals.

As shown in FIG. 12, different pieces of data can be transmitted through two partial symbols. The portion of a symbol including a guard interval, other than the guard interval, is referred to as a partial symbol, as described above.

When data loaded on the first partial symbol is PSD1 and data loaded on the second partial symbol is PSD2, PSD1 and PSD2 may be different pieces of data. If the guard interval is short enough to be ignorable compared to the symbol interval, PSD1 and PSD2 can be appropriately demodulated.

Strong channel coding may be necessary for PSD1 and PSD2, compared to other symbols, in order to satisfy an error rate that the system requires. To this end, a new resource allocation rule for symbol based channel coding and transmission can be defined. Furthermore, PSD1 and PSD2 can be repeated during channel coding so as to obtain additional coding gain. Since a larger number of coding processes is applied to PSD1 and PSD2, the error rate can be reduced in a demodulation process.

When different pieces of data are transmitted through different partial symbols, it is desirable to assign different symbol indices to symbols respectively including the partial symbols. In addition, symbol indices of a subframe can be sequentially assigned considering that channel coding or a resource allocation rule for a symbol including a partial symbol may be different from that for other symbols. In the case of the normal CP, for example, symbol indices can be assigned in ascending order to the second to the thirteenth symbols of a subframe in such a manner that symbol index #0 is assigned to the second symbol of the subframe and symbol index #1 is assigned to the third symbol, and then symbol index #12 can be assigned to the first symbol and symbol index #13 can be assigned to the last symbol of the subframe. According to this symbol indexing method, data can be transmitted or received through symbols corresponding to symbols indices #0 to #11 as in the conventional method and a data transmission method or a data reception method different from the conventional method can be applied to the symbols corresponding to symbol indices #12 and #13.

A description will be given of a method for repeating and transmitting data in two symbols including guard intervals.

Figure 13:
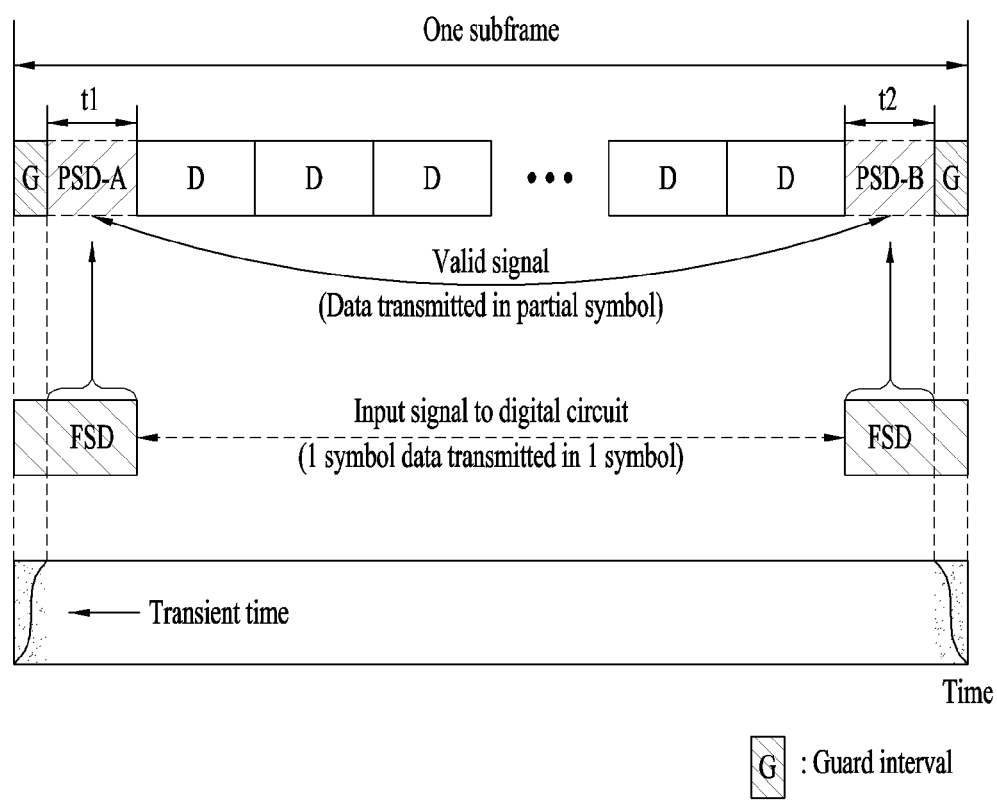
FIG. 13 illustrates an example of repeating and transmitting data in two symbols including GIs.

FIG. 13 illustrates an example of repeating and transmitting data in two symbols including guard intervals.

Referring to FIG. 13, the guard intervals can be included in the first symbol and the last symbol of a subframe. For convenience, data transmitted in a partial symbol of the first symbol is called partial symbol data A (PSD-A) and data transmitted in a partial symbol of the last symbol is called PSD-B. In addition, one piece of symbol data transmitted in one symbol is called full symbol data (FSD). Then, PSD-A and PSD-B are parts of FSD. That is, PSD-A can correspond to the rear part of the FSD and PSD-B can correspond to the front part of the FSD. In general, the FSD is composed of CP+data. The CP is a cyclic copy of the rear part of the data. Accordingly, parts of PSD-A and PSD-B are cyclic copies thereof and thus a symbol in which PSD-A or PSD-B is transmitted may be called a cyclic-copied symbol. Data can be repeated and transmitted in two symbols including guard intervals through the following methods.

1) The first method is to transmit data in a partial symbol and a guard interval, that is, through a full symbol including the guard interval. That is, a transmitter applies, amplifies and transmits a signal through a full symbol including a guard interval positioned at the boundary of a subframe in spite of the guard interval. Although data distortion may occur in the guard interval since data is transmitted even in the guard interval, the signal is transmitted through the same process as that for symbols including no guard interval and thus the method can be conveniently implemented. For example, the guard interval is positioned at the front part of the first symbol and thus data loaded on the front part of the first symbol can be distorted. The last symbol has the guard interval positioned at the rear part thereof and thus data loaded on the rear part of the symbol can be distorted.

2) The second method is to transmit data only in the partial symbol of a symbol including the guard interval. That is, data is not transmitted in the guard interval of the symbol and data is transmitted using all or part of the partial symbol of the symbol. The second method will now be described in detail with reference to FIG. 14.

Figure 14:
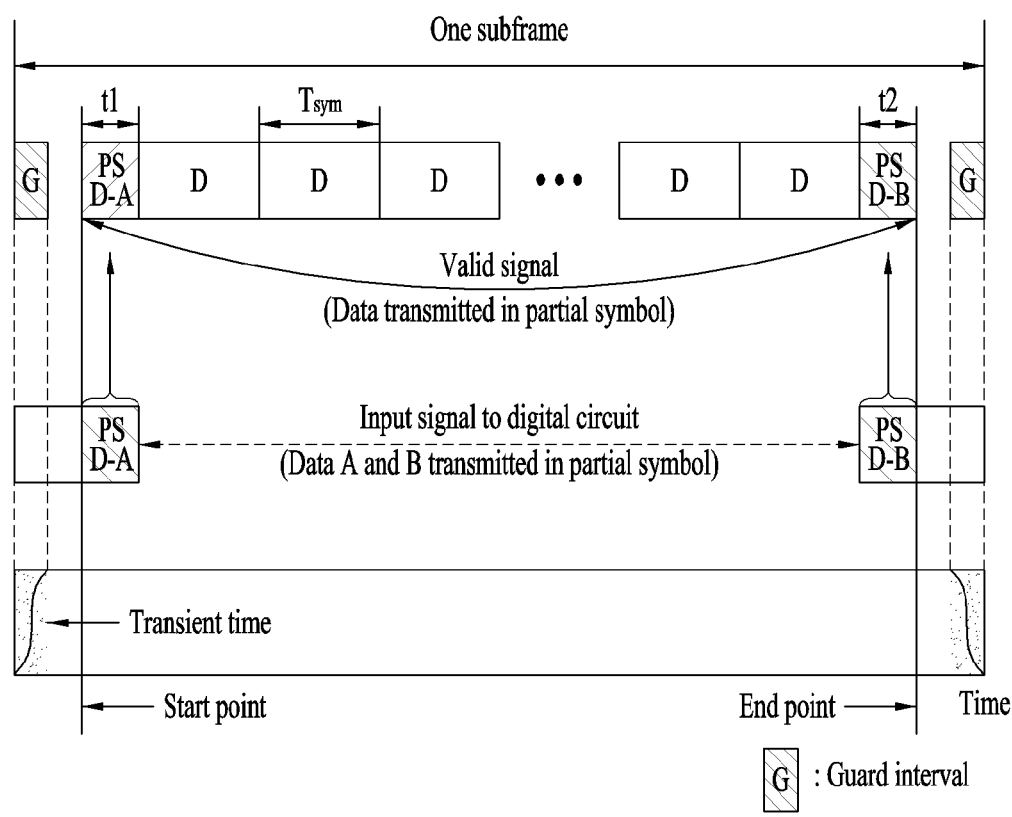
FIG. 14 illustrates an example of repeating and transmitting data only in partial symbols of two symbols including GIs.

FIG. 14 illustrates an example of repeating and transmitting data only in partial symbols of two symbols including guard intervals.

Referring to FIG. 14, data is transmitted only in the partial symbol of each symbol including the guard interval. Here, a signal can be applied and transmitted from specific time of the partial symbol or the signal can be applied and transmitted until specific time of the partial symbol. Loading data in the guard interval may not be significant since the data is distorted in the guard interval. Accordingly, the data is transmitted from specific time of the partial symbol in which data distortion does not occur.

For example, data transmitted in the first symbol of a subframe is applied for t1 in the partial symbol of the first symbol. Data transmitted in the last symbol is applied for t2 in the partial symbol of the last symbol. In FIG. 14, PSD-A may include the rear part of one piece of symbol data and PSD-B may include the front part of the symbol data. While PSD-A and PSD-B are generated from the same symbol data, contents thereof may be different since PSD-A corresponds to the rear part of the symbol data and PSD-B correspond to the front part of the symbol data.

t1 and t2 may be set to various values according to a demodulation scheme of an OFDM receiver. For example, t1 and t2 may be t1=t2=($\frac{1}{2}$)*$T_{sym}$ when one symbol interval is $T_{sym}$. Otherwise, t1≥($\frac{1}{2}$) $T_{sym}$, and t2≥($\frac{1}{2}$)*$T_{sym}$. For correct signal restoration in a demodulation process of the OFDM receiver, t1 and t2 can be set to ($\frac{1}{2}$)*$T_{sym}$+CP length in consideration of a CP of each symbol.

Figure 15:
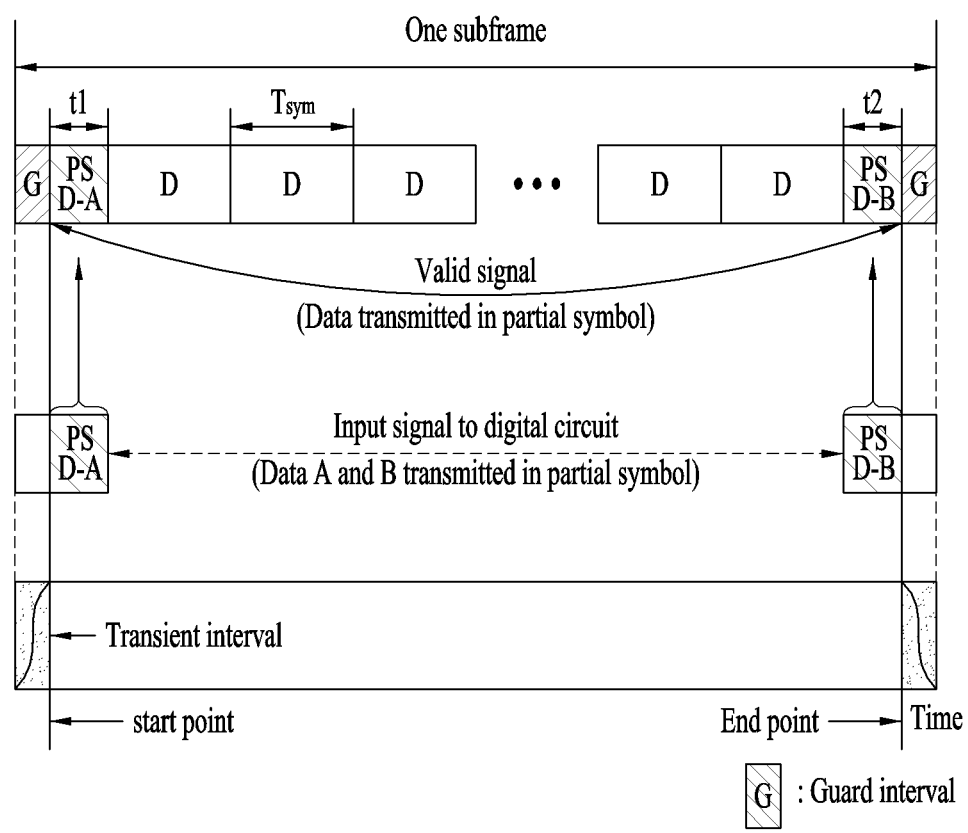
FIG. 15 illustrates an example of repeating and transmitting data in partial symbols of two symbols including GIs.

FIG. 15 illustrates another example of repeating and transmitting data in partial symbols of two symbols including guard intervals.

Referring to FIG. 15, t1 and t2 may be set to intervals other than the guard intervals. Here, an OFDM transmitter may allocate data to the entire partial symbols of the symbols and transmit the data in the partial symbols and an OFDM receiver may select and combine necessary parts of the data.

If one piece of symbol data can be restored, t1 and t2 may be independently set.

Figure 16:
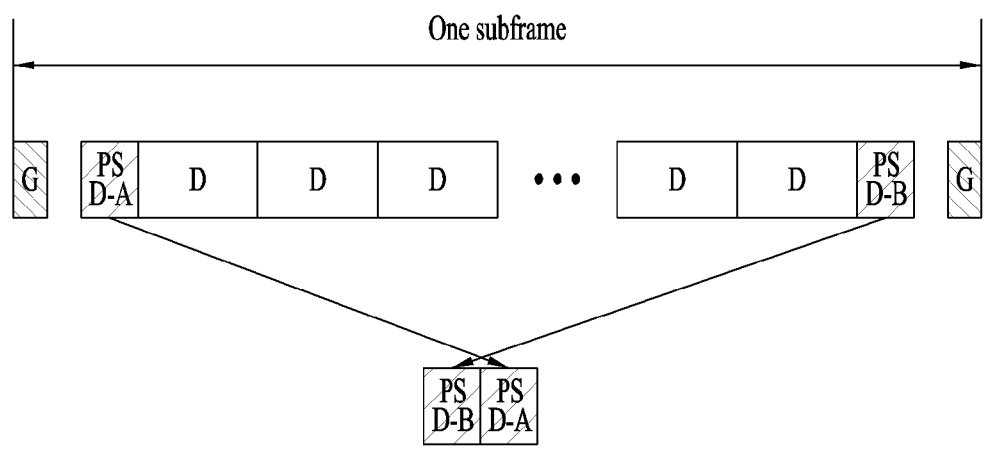
FIG. 16 illustrates an example of combining data of partial symbols in a demodulation process of an OFDM receiver.

FIG. 16 illustrates an example of combining data of partial symbols in a demodulation process of the OFDM receiver.

Data may be combined in the order of PSD-B and PSD-A to restore one piece of symbol data in the demodulation process of the OFDM receiver. Here, PSD-B and PSD-A are preferably combined in the stage before the FFT unit of the OFDM receiver. That is, it is desirable to combine received radio signals first and then restore one symbol through FFT rather than combining partial symbols after FFT and demodulation.

Figure 17:
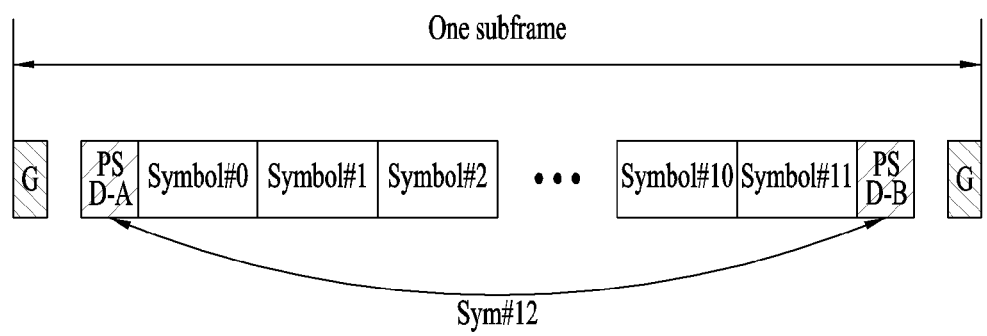
FIG. 17 illustrates an example of assigning symbol indices in a subframe including a GI.

FIG. 17 illustrates an example of assigning symbol indices in a subframe including guard intervals.

In LTE, the index of the first symbol of a subframe is 0, the index of the second symbol is 1 and the index of the last symbol is 13 in the case of the normal CP. However, the first symbol or the last symbol that includes the guard interval may be used to transmit data or not. That is, data may not be transmitted in the first symbol and the last symbol by puncturing the first symbol and the last symbol as in the conventional method or data may be transmitted in the first symbol and the last symbol according to the present invention. Since a symbol including the guard interval can be used for special purposes in this manner, an available last symbol index instead of 0 can be assigned to the first symbol.

In the case of the normal CP, for example, it is possible to assign symbol indices in ascending order to the second to thirteenth symbols of a subframe in such a manner that symbol index #0 is assigned to the second symbol and symbol index #1 is assigned to the third symbol, to combine the partial symbols of the first and last symbols so as to form one symbol and then to allocate last symbol index #12 thereto.

According to this symbol indexing method, the conventional method of performing interleaving, puncturing, mapping and the like on the basis of symbol index as in LTE can be used without modification. However, the signal transmission method according to the present invention can be applied only to a symbol having the last symbol index. If the signal transmission method according to the present invention is not applied, when an RS cannot use two symbols including guard intervals on a backhaul link, the RS can puncture the symbols and transmit data. The RS can puncture two symbols including guard intervals and transmit data using 12 symbols in the case of the normal CP. When the guard interval included in a subframe is ignored and all 14 symbols are used, the RS may transmit data without puncturing any symbol.

A description will be given of a method for transmitting data using a short block (SB) in a symbol including the guard interval. The method for transmitting data using a short block corresponds to a method for transmitting data using a shortened symbol in the time domain. The short symbol refers to a symbol having a shorter interval in the time domain than the normal symbol (refer to FIG. 4). A method for transmitting data using a long block corresponds to a method for transmitting data using a normal symbol in the time domain.

FIG. 18 illustrates a method for comparing a short block with a long block and generating the short block.

The short block refers to a radio resource having a shorter time interval than the long block and a wide subcarrier spacing in the frequency domain. For example, the subcarrier spacing may be 30 kHz. The long block may be a radio resource corresponding to one full symbol in the time domain and having a narrower subcarrier spacing than the short block.

For example, the short block can correspond to half the time interval of the long block. That is, when the time interval of the long block is T, the time interval of the short block can be T/2. In this case, the subcarrier spacing of the long block can be 15 kHz and that of the short block can be 30 kHz in the frequency domain. The number of bits that can be transmitted through the short block may be half the number of bits that can be transmitted through the long block. When the long block is generated through N-point IFFT, the short block can be generated through N/2-point IFFT. While the short block has a time interval corresponding to half the time interval of the long block, the time interval of the short block is not limited thereto. The short block may have a time interval (8 subcarriers in the frequency domain) corresponding to ⅔ of the time interval of the long block.

FIG. 19 illustrates an example of allocating the short block to a symbol including a guard interval.

FIG. 19 illustrates an example of allocating the short block to a symbol including a guard interval.

Referring to FIG. 19, short blocks SB1 and SB2 can be allocated to partial symbols of the first symbol and the last symbol and used. Data that can be transmitted in a symbol including no guard interval can be divided in half, half of the data can be transmitted through the short block SB1 and the other half can be transmitted through the short block SB2. The OFDM receiver receives data transmitted through one symbol by receiving and combining the short blocks SB1 and SB2. Accordingly, the number of symbols wasted due to the guard interval can be reduced by one.

Even when the short blocks are used, it is desirable to allocate the last symbol index of the subframe to the symbol composed of SB1 and SB2. Specifically, index "0" is allocated to the second symbol instead of the first symbol of the subframe. The following symbol indices are sequentially allocated in ascending order from the third symbol. The short block SB1 included in the first symbol of the subframe and the short block SB2 included in the last symbol of the subframe are combined to form one symbol and symbol index "12" is allocated to the symbol.

Figure 20:
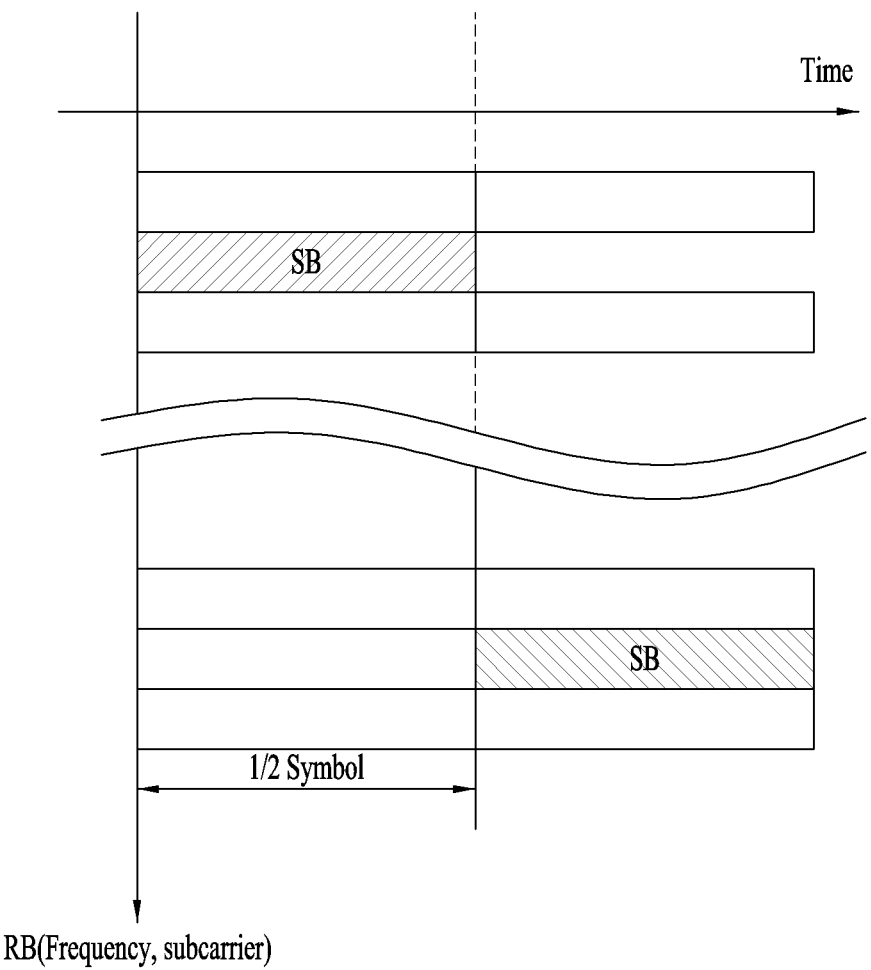
FIG. 20 illustrates an exemplary radio resource position to which a short block can be allocated.

FIG. 20 illustrates exemplary radio resource positions to which the short block can be allocated.

The short block can be allocated to a band suitable for signal transmission from among frequency bands. In addition, the short block can be allocated to the first slot or the second slot of a symbol in the time domain. That is, the short block can be assigned to any slot of a subframe rather than being allocated to a specific slot of the subframe.

Figure 21:
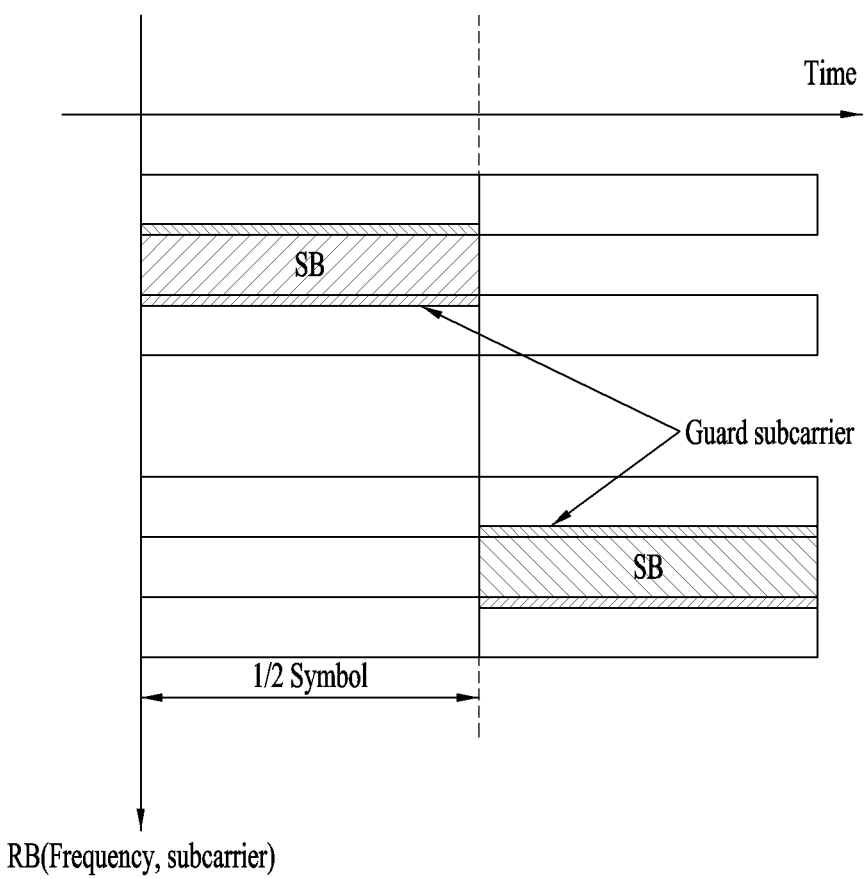
FIGS. 21 and 22 illustrate an example of setting guard subcarriers in a resource block adjoining a short block.
Figure 22:
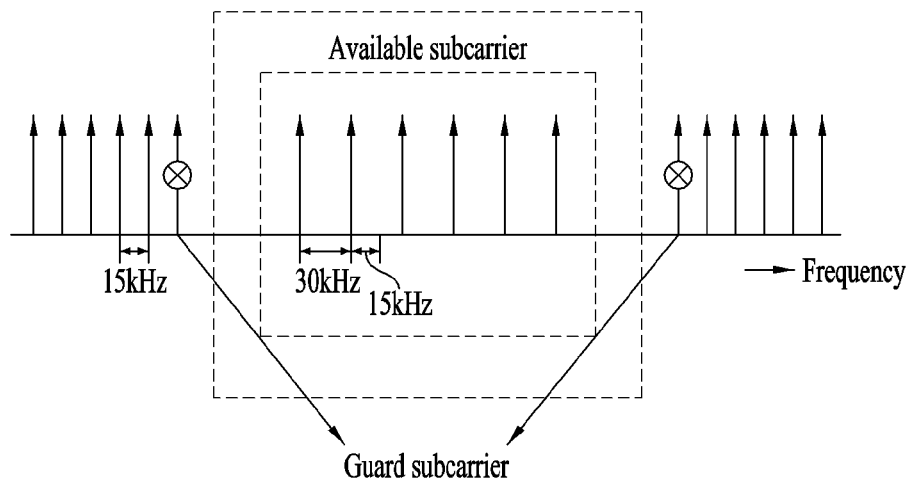

FIGS. 21 and 22 illustrate an example of setting a guard subcarrier in a resource block adjoining a short block.

As shown in FIG. 21, the guard subcarrier can be set in a resource block adjoining a short block in the frequency domain. Subcarrier spacing in the short block is twice that of the long block, that is, 30 kHz. Accordingly, the number of subcarriers that can be used in the short block is half that of the long block. For example, when the number of subcarriers of the long block is 12, the number of subcarriers of the short block is 6. Subcarriers of the long block, adjacent to the short block, are not allocated a signal such that the subcarriers can function as guard subcarriers. In this case, all 6 subcarriers included in the short block can be used, as shown in FIG. 22.

FIGS. 23 to 27 illustrate examples of setting the guard subcarrier in the short block.

Figure 23:
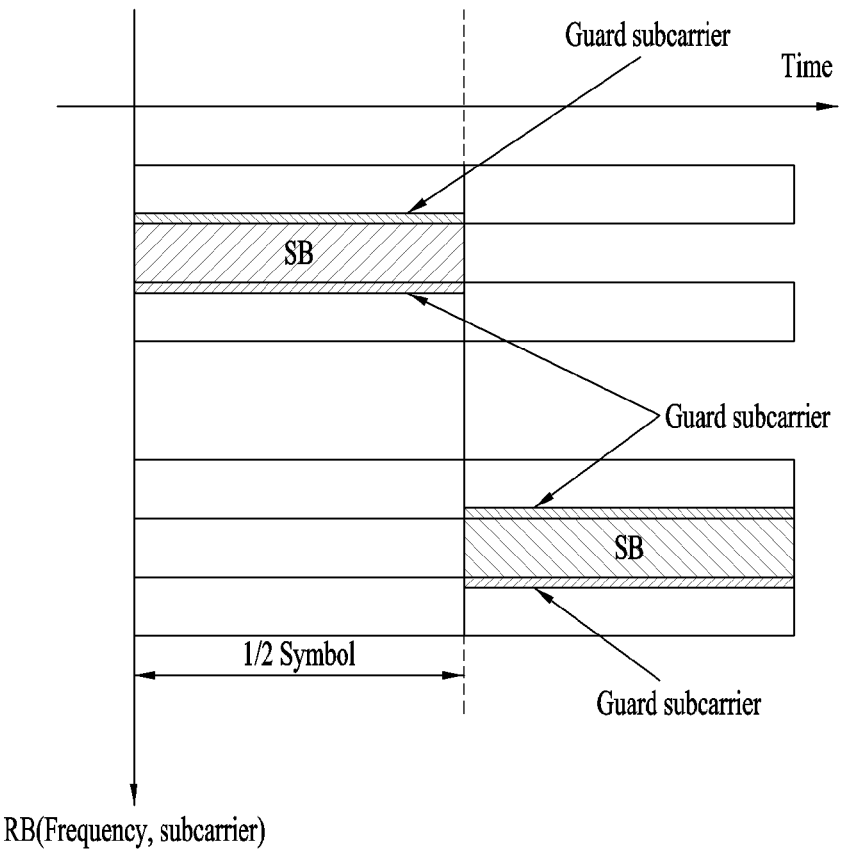
FIGS. 23 to 27 illustrate examples of setting a guard subcarrier in a short block.
Figure 24:
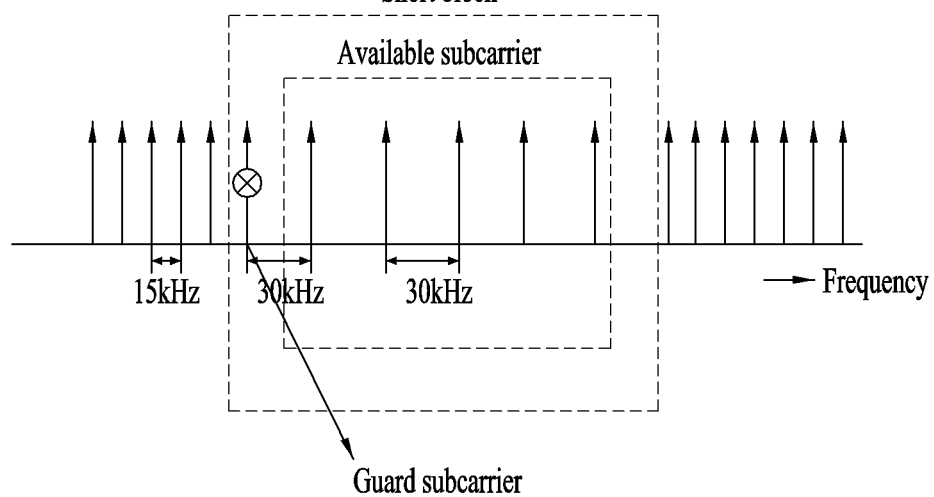
Figure 25:
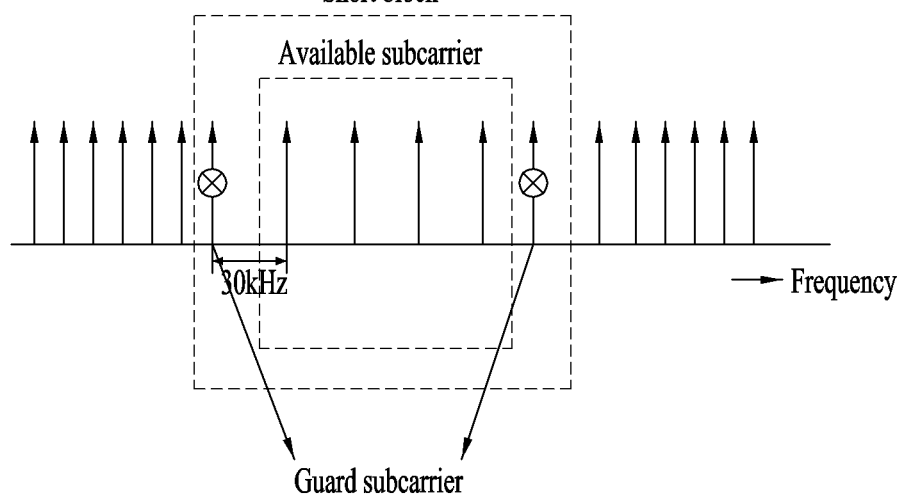
Figure 26:
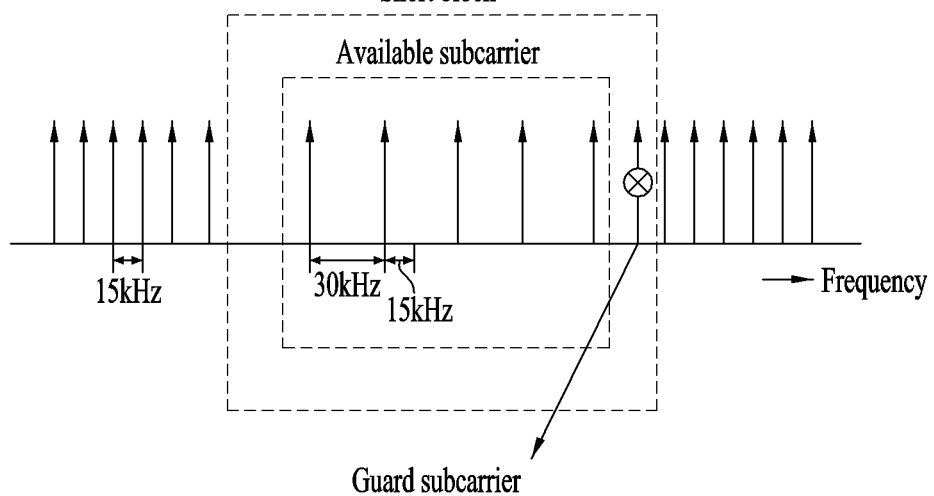
Figure 27:
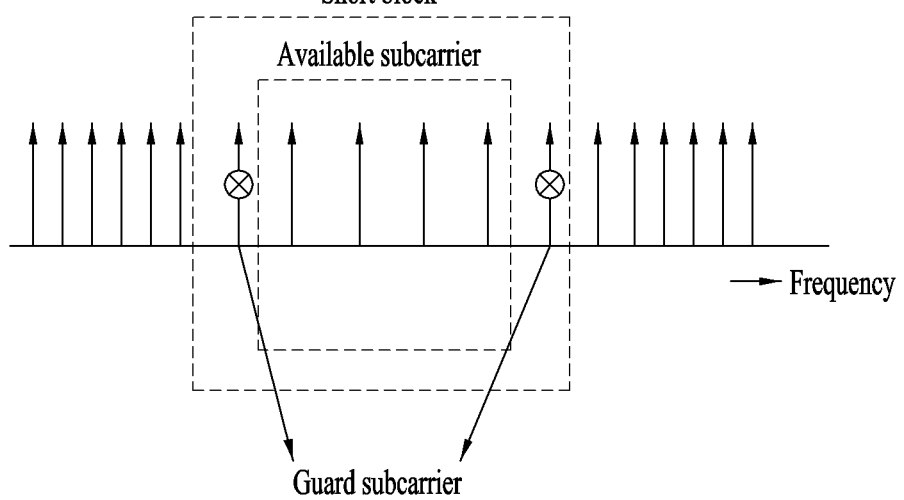

While FIGS. 23 to 25 show an example in which the guard subcarrier is set at both boundaries of a short block in the frequency domain, the present invention is not limited thereto. That is, the guard subcarrier may be set at only one boundary of the short block, as shown in FIG. 26 or 27. When the guard subcarrier is set at both boundaries, the number of subcarriers that can be used in the short block is reduced to 4 but interference applied to neighboring resource blocks can be decreased. When the guard subcarrier is set at only one boundary, the number of subcarriers that can be used in the short block is 5, which is larger than the number of subcarriers that can be used when the guard subcarrier is set at both boundaries. Accordingly, it is possible to determine how to set the guard subcarrier in consideration of channel situation of the backhaul link, for example, data capacity or channel state of the backhaul link. Interference applied to neighboring resource blocks can be reduced according to the guard subcarrier set in the short block. A plurality of consecutive subcarriers may constitute guard subcarriers, distinguished from the examples of FIGS. 21 to 27.

Figure 28:
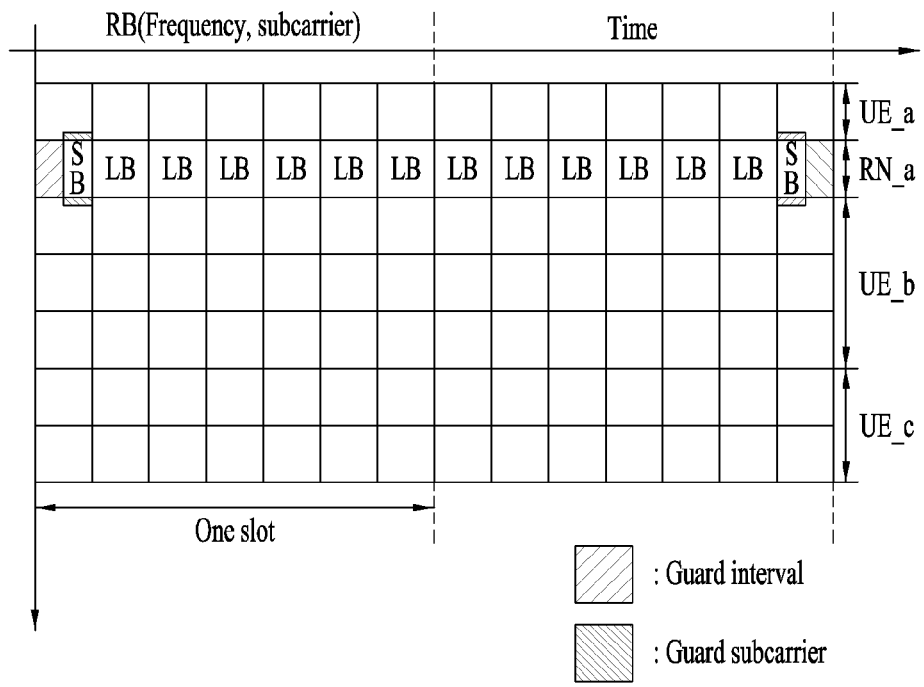
FIGS. 28 and 29 illustrate examples of allocating a short block and a guard subcarrier included in a subframe in a multi-UE environment.
Figure 29:
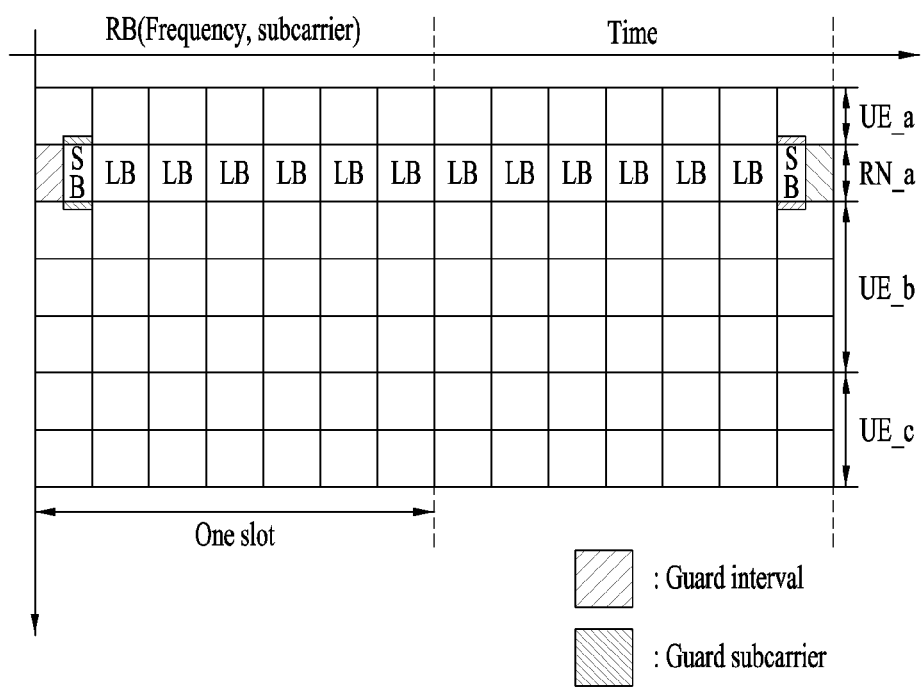

FIGS. 28 and 29 illustrate examples of allocating the short blocks and the guard subcarrier included in a subframe in a multi-UE environment.

As shown in FIGS. 28 and 29, the partial symbol of a symbol including the guard interval may be composed of a short block in a frequency band allocated to an RS. All symbols other than the symbol including the guard interval may be composed of long blocks. In FIG. 28, the guard subcarrier is set in a resource block adjoining the short block in the frequency domain. That is, the guard subcarrier is positioned in a frequency band allocated to UE a or UE b. In FIG. 29, a subcarrier positioned at the boundary of the short block is set as the guard subcarrier.

Figure 30:
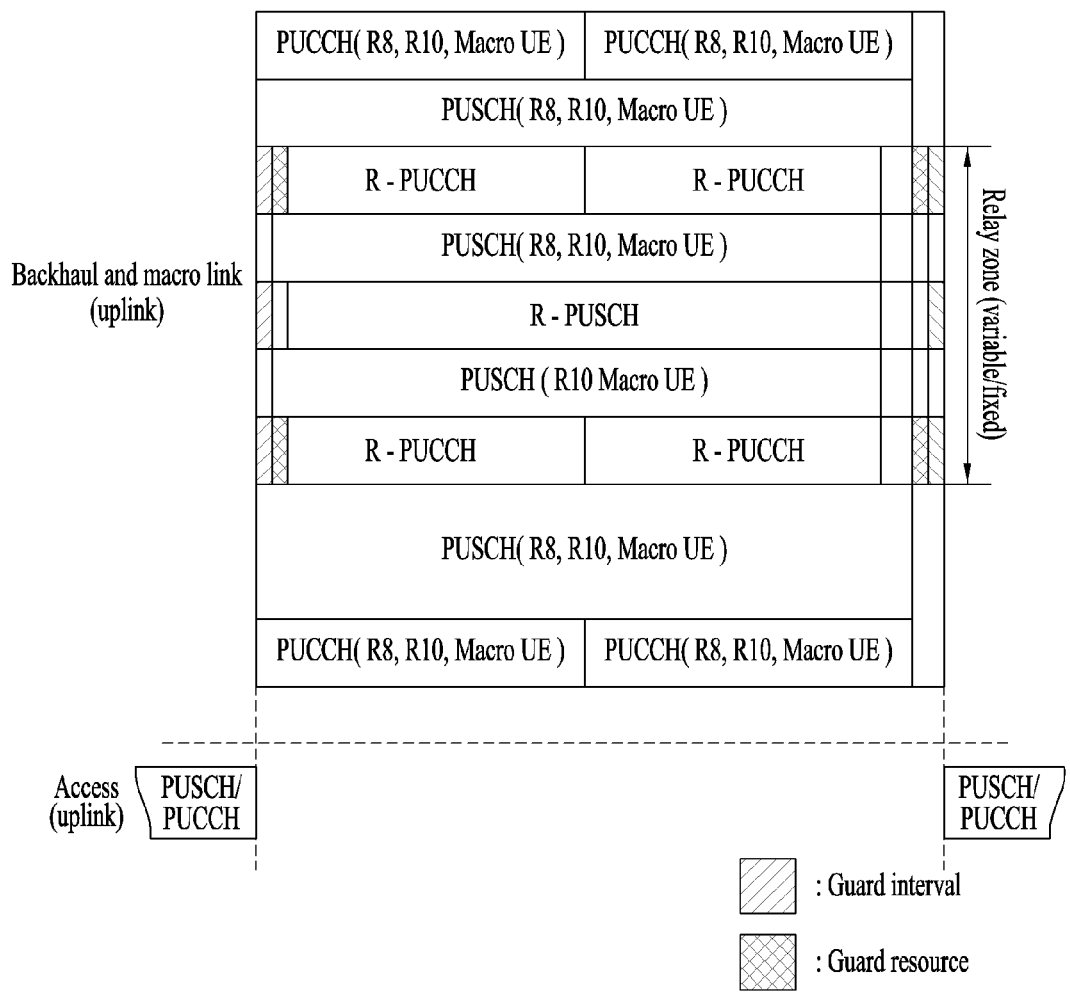
FIGS. 30 and 31 illustrate exemplary subframe structures that can be used in backhaul uplink.
Figure 31:
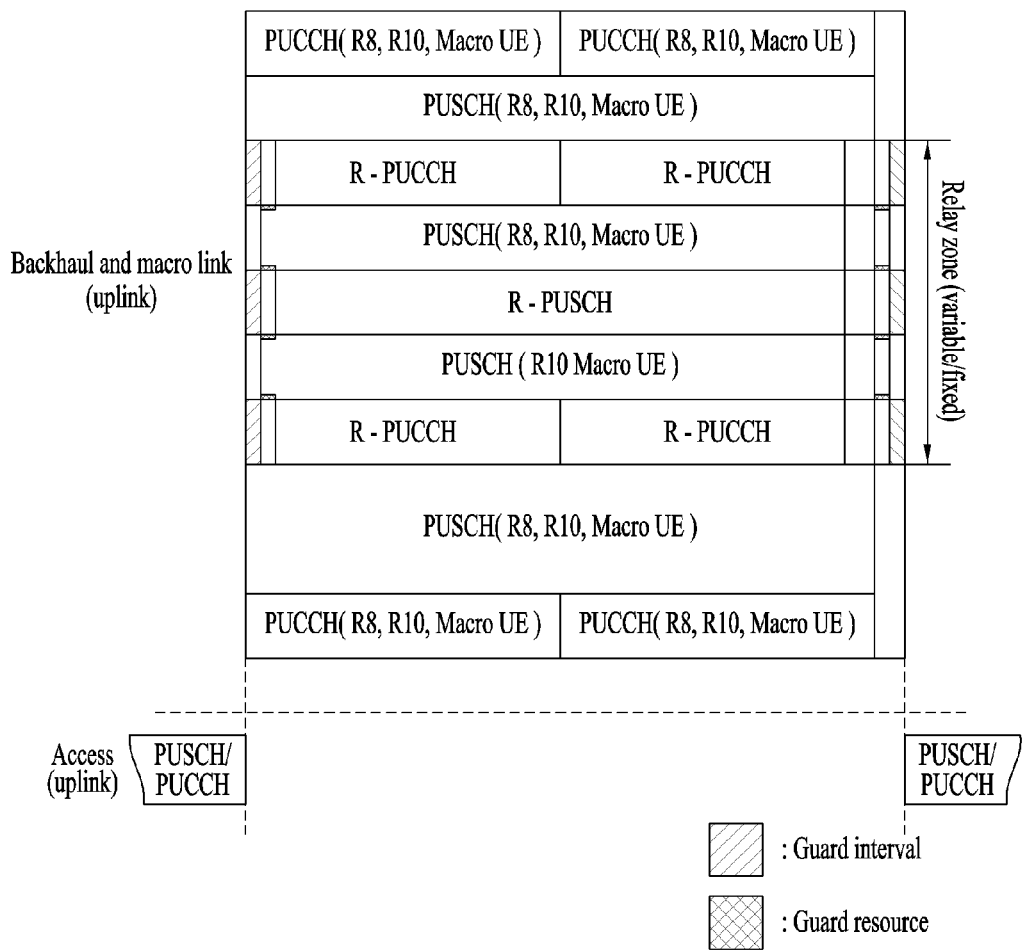

FIGS. 30 and 31 illustrate exemplary subframe structures that can be used on backhaul uplink. In FIGS. 30 and 31, a region in which an RS transmits an uplink control signal to a BS is indicated by R-PUCCH and a region in which the RS transmits data to the BS is indicated by R-PUSCH.

Referring to FIG. 30, when the guard interval is included in the first symbol and the last symbol in the R-PUCCH region, a signal may not be transmitted in the partial symbols of the first symbol and the last symbol. Then, the partial symbols of the symbols including the guard interval can function as guard bands for preventing interference with a frequency band or R-PUSCH band allocated to a macro UE. In view of this, the partial symbols of the first symbol and the last symbol may be called guard resources. When a wide frequency band is allocated to the RS, the percentage of the guard resources is very low and thus resource waste does not become a problem. The guard resources need not correspond to the partial symbols and may be larger or smaller than the partial symbols.

Referring to FIG. 31, when the guard interval is included in the first symbol and the last symbol in the band allocated to the RS, the partial symbols of the first symbol and the last symbol can be allocated to a macro UE. In this case, guard resources can be set in resource blocks adjoining the partial symbols of the first symbol and the last symbol. For example, the macro UE may not use at least one subcarrier adjacent to the partial symbols of the first symbol and the last symbol in a PUSCH band. In other words, the macro UE does not use part (one subcarrier to a plurality of resource blocks) of radio resources allocated thereto for prevention of interference.

The methods illustrated in FIGS. 30 and 31 may be combined and used. That is, the RS does not transmit a signal in the partial symbol of a symbol including the guard interval. The macro UE may transmit a signal in a partial symbol that is not used by the RS and may not transmit a signal in some radio resources of a PUSCH region adjacent to the partial symbol. While an uplink subframe case has been exemplified, the aforementioned methods can be equally applied to a downlink subframe.

A description will be given of mathematical examination of a signal demodulated by a receiver according to the methods described with reference to FIGS. 13 to 16, that is, the method of repeating and transmitting data in the partial symbol of a symbol including the guard interval (methods using a cyclic-copied symbol).

When $A(k)$ is a k-th subcarrier signal of the first symbol and $B(k)$ is a k-th subcarrier signal of the last symbol, time domain signals of the first symbol and the last symbol can be determined as represented by Equation 1.

$$a(n) = \sum_{k=0}^{N-1} A(k)e^{j2\pi kn/N}, \quad b(n) = \sum_{k=0}^{N-1} B(k)e^{j2\pi kn/N} \quad \text{[Equation 1]}$$

In Equation 1, N is an FFT size and corresponds to the exponentiation value of 2. When a time domain signal obtained by combining the signals of the first symbol and the last symbol is $c(n)$, $c(n)$ can be determined as represented by Equation 2.

$$c(n) = \begin{cases} a(n), & 0 \leq n < N/2 \\ b(n), & N/2 \leq n < N \end{cases} \quad \text{[Equation 2]}$$

When an M-th subcarrier signal obtained by fast-Fourier-transforming $c(n)$ in the receiver is $C(M)$, $C(M)$ can be represented by Equation 3. Here, it is assumed that the M-th subcarrier signal is cyclically copied and $A(M)=B(M)$.

[Equation 3]

$$\begin{aligned}
C(M) &= \frac{1}{N}\left[\sum_{n=0}^{N/2-1} a(n)e^{-j2\pi Mn/N} + \sum_{n=N/2}^{N-1} b(n)e^{-j2\pi Mn/N}\right] \\
&= \frac{1}{N}\sum_{n=0}^{N/2-1}\left[\sum_{k=0}^{N-1} A(k)e^{j2\pi kn/N} e^{-j2\pi Mn/N}\right] + \\
&\quad \frac{1}{N}\sum_{n=N/2}^{N-1}\left[\sum_{k=0}^{N-1} B(k)e^{j2\pi kn/N} e^{-j2\pi Mn/N}\right] \\
&= \frac{1}{N}\sum_{k=0}^{N-1}\left[\sum_{n=0}^{N/2-1} A(k)e^{j2\pi(k-M)n/N} + \sum_{n=N/2}^{N-1} B(k)e^{j2\pi(k-M)n/N}\right] \\
&= \frac{1}{N}\sum_{k=0}^{N-1}\left[\sum_{n=0}^{N/2-1} \{A(k) + e^{j\pi(k-M)}B(k)\}e^{j2\pi(k-M)n/N}\right] \\
&= A(M) + \sum_{k=0, k\neq M}^{N-1}\left[(A(k) + (-1)^{(k-M)}B(k))\frac{1}{N}\sum_{n=0}^{N/2-1} e^{j2\pi(k-M)n/N}\right] \\
&= A(M) + \sum_{k=0, k\neq M}^{N-1} [(A(k) + (-1)^{(k-M)}B(k))f(k-M)]
\end{aligned}$$

That is, $C(M)$ is represented by a desired signal $A(M)$ and inter-carrier interference (ICI). In Equation 3, ICI is affected by $f(x)$.

Figure 32:
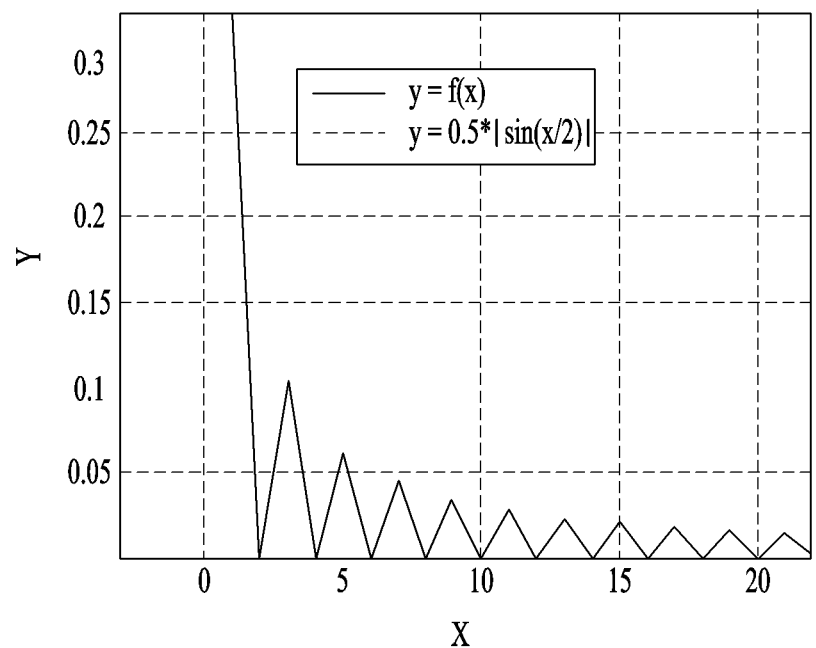
FIG. 32 is a graph showing f(x) of Equation 3 and a sync function.

FIG. 32 is a graph showing $f(x)$ of Equation 3 and a sync function.

Referring to FIG. 32, $f(x)$ of Equation 3 has a form similar to the sync function. $f(x)$ is 0 when x is an even number. That is, when $(k-M)$ is an even number in Equation 3, $f(k-M)$ is 0. Accordingly, there is no ICI from subcarrier k that makes $(k-M)$ be an even number. When subcarrier k that makes $(k-M)$ be an odd number carries a cyclic-copied symbol and thus $A(k)=B(k)$, ICI due to subcarrier k is eliminated.

That is, a cyclic-copied subcarrier receives ICI corresponding to the size of the sync function from a subcarrier that is not cyclically copied. When a frequency band (RS band) allocated to a backhaul link between a BS and an RS and a frequency band (macro access band) allocated to a link between the BS and a UE are composed of consecutive subcarriers in the frequency domain, symbols transmitted through cyclic-copied subcarriers can be restored by providing a guard subcarrier between the RS band and the macro access band. When the guard subcarrier is not provided, ICI from the macro access band can be overcome through strong channel coding or signal repetition.

A description will be given of mathematical examination of a signal demodulated by the receiver when the method for transmitting data using a short block in a symbol including the guard interval is used.

When $A(k)$ is a k-th subcarrier signal of a symbol composed of a short block (referred to as a short block symbol hereinafter) and $B(k)$ is a k-th subcarrier signal of a symbol composed of a long block (referred to as a long block symbol hereinafter), a time domain signal $a(n)$ of the short block symbol and a time domain signal $b(n)$ of the long block symbol can be represented by Equation 4.

$$a(n) = \sum_{k=0}^{N/2-1} A(k)e^{j4\pi kn/N}, \quad b(n) = \sum_{k=0}^{N-1} B(k)e^{j2\pi kn/N} \quad \text{[Equation 4]}$$

Here, N is an FFT size and corresponds to an exponentiation value of 2.

A signal c(n) received by the receiver can be represented by Equation 5.

$$c(n) = \begin{cases} b(n), & 0 \le n < N/2 \\ a(n-N/2) + b(n), & N/2 \le n < N \end{cases} \quad \text{[Equation 5]}$$

The receiver can perform N-FFT on the signal c(n) and extract an M-th subcarrier signal in order to decode the long block symbol. The M-th subcarrier signal C(M) can be represented by Equation 6.

$$C(M) = \frac{1}{N}\left[\sum_{n=0}^{N-1} c(n)e^{-j2\pi Mn/N}\right] \quad \text{[Equation 6]}$$

$$= \frac{1}{N}\left[\sum_{n=0}^{N/2-1} b(n)e^{-j2\pi Mn/N} + \sum_{n=N/2}^{N-1}(a(n-N/2)+b(n))e^{-j2\pi Mn/N}\right]$$

$$= \frac{1}{N}\sum_{n=0}^{N/2-1}\left[\sum_{k=0}^{N-1} B(k)e^{j2\pi kn/N}e^{-j2\pi Mn/N}\right] +$$

$$\frac{1}{N}\sum_{n=N/2}^{N-1}\left[\sum_{k=0}^{N/2-1} A(k)e^{j4\pi k(n-N/2)/N}e^{-j2\pi Mn/N} + \sum_{k=0}^{N-1} B(k)e^{j2\pi kn/N}e^{-j2\pi Mn/N}\right]$$

$$= \frac{1}{N}\sum_{k=0}^{N-1}\left[\sum_{n=0}^{N-1} B(k)e^{j2\pi(k-M)n/N}\right] +$$

$$\frac{1}{N}\sum_{k=0}^{N/2-1}\left[\sum_{n=N/2}^{N-1} A(k)e^{j2\pi(2k-M)n/N-j2\pi k}\right] =$$

$$B(M) + \frac{1}{N}\sum_{k=0}^{N/2-1}\left[A(k)\sum_{n=N/2}^{N-1} e^{j2\pi(2k-M)n/N}\right]$$

$$= B(M) + \frac{1}{N}\sum_{k=0}^{N/2-1}\left[A(k)\sum_{n=0}^{N/2-1} e^{j2\pi(2k-M)n/N}e^{j\pi(2k-M)}\right]$$

$$= B(M) + \frac{1}{N}\sum_{k=0}^{N/2-1}\left[A(k)(-1)^{(2k-M)}\sum_{n=0}^{N/2-1} e^{j2\pi(2k-M)n/N}\right]$$

$$= B(M) + \sum_{k=0}^{N/2-1}[A(k)(-1)^{(2k-M)}f(2k-M)]$$

An ICI component included in C(M) is $$\sum_{k=0}^{N/2-1}[A(k)(-1)^{(2k-M)}f(2k-M)].$$

When (2k−M) is 0 (that is, k=M/2), the ICI component becomes A(k). That is, it is necessary not to use an (M/2)-th subcarrier of the short block symbol in order to use the M-th subcarrier of the long block symbol. When k is not M/2, the ICI component is determined by f(x).

The receiver applies N/2-FFT to the latter part of c(n) and extracts the M-th subcarrier signal in order to decode the signal of the short block symbol. When the M-th subcarrier signal of the short block symbol is C'(M), C'(M) is represented by Equation 7.

$$C'(M) = \frac{2}{N}\left[\sum_{n=N/2}^{N-1} c(n)e^{-j4\pi Mn/N}\right] = \frac{2}{N}\left[\sum_{n=N/2}^{N-1}(a(n-N/2)+b(n))e^{-j4\pi Mn/N}\right] \quad \text{[Equation 7]}$$

$$= \frac{2}{N}\sum_{n=N/2}^{N-1}\left[\sum_{k=0}^{N/2-1} A(k)e^{j4\pi k(n-N/2)/N}e^{-j4\pi Mn/N} + \sum_{k=0}^{N-1} B(k)e^{j2\pi kn/N}e^{-j4\pi Mn/N}\right]$$

$$= \frac{2}{N}\sum_{k=0}^{N/2-1}\left[\sum_{n=N/2}^{N-1} A(k)e^{j4\pi(k-M)n/N-j2\pi k}\right] +$$

$$\frac{2}{N}\sum_{k=0}^{N-1}\left[\sum_{n=N/2}^{N-1} B(k)e^{j2\pi(k-2M)n/N}\right]$$

$$= \frac{2}{N}\sum_{k=0}^{N/2-1}\left[\sum_{n=0}^{N/2-1} A(k)e^{j4\pi(k-M)n/N}\right] +$$

$$\frac{2}{N}\sum_{k=0}^{N-1} B(k)\left[\sum_{n=N/2}^{N-1} e^{j2\pi(k-2M)n/N}\right]$$

$$= A(M) + \sum_{k=0}^{N-1}[2B(k)(-1)^{(k-2M)}f(k-2M)]$$

An ICI component included in C'(M) is $$\sum_{k=0}^{N-1}[2B(k)(-1)^{(k-2M)}f(k-2M)].$$

Here, when (k−2M) is 0, that is, k=2M, the ICI component is B(k). That is, it is necessary not to use a 2M-th subcarrier of the long block symbol in order to use the M-th subcarrier of the short block symbol.

When k is not 2M, the ICI component is determined by f(x). Compared to the aforementioned case in which a cyclic-copied symbol is used, interference averaging effects disappear and thus interference power increases 3 dB. Since one short block symbol is further present in the last symbol of the subframe, however, it is possible to prevent increase of interference power by 3 dB by using the short block symbol.

A description will be given of a method by which an RS transmits a sounding reference signal (SRS) in a subframe including the guard interval.

The SRS is a reference signal transmitted by a UE or an RS to a BS and is not associated with uplink data or control signal transmission. While the SRS is mainly used for channel quality estimation for frequency selective scheduling on uplink (macro uplink or backhaul uplink), the SRS may be used for other purposes. For example, the SRS can be used for power control or initial MCS selection, initial power control for data transmission and the like.

An SRS sequence used for the SRS may equal a sequence used for a DM RS.

The duration of the SRS sequence may be limited to resource block size*(a multiple of 2, 3 and/or 5). The shortest SRS sequence duration may be 12. For example, a transmittable SRS band $N_{RB}^{SRS}$ and SRS sequence duration $M_{SC}^{SRS}$ can be given as represented by Equation 8.

$$N_{RB}^{SRS} = 2^{(1+\alpha_2)} \cdot 3^{\alpha_3} \cdot 5^{\alpha_5}$$
$$M_{sc}^{SRS} = \frac{1}{2} \cdot N_{RB}^{SRS} \cdot 12$$

[Equation 8]

Here, α2, α3 and α5 are positive integer sets. The SRS can maintain orthogonality using different cyclic shift values for the same base sequence while using the same resource block and the same subcarrier. The cyclic shift values can be set per UE or RS.

A case in which a UE transmits a macro SRS to a BS is described and then the present invention is described.

Figure 33:
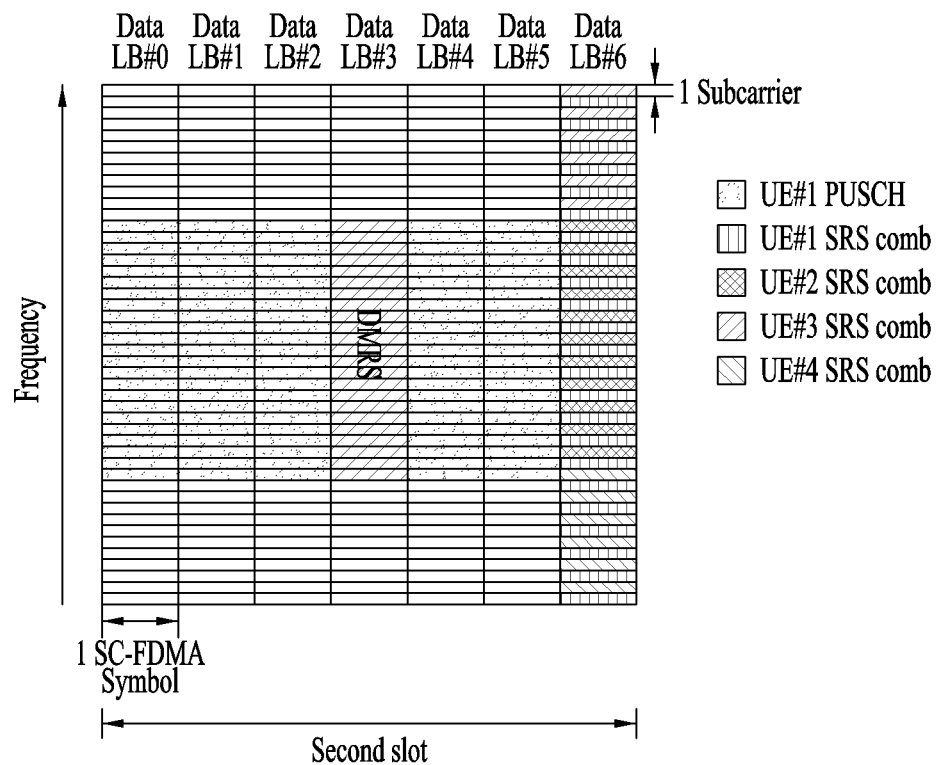
FIG. 33 illustrates an example in which a plurality of UEs transmits macro SRSs to an eNB.

FIG. 33 illustrates an example in which a plurality of UEs transmits the macro SRS to a BS.

Referring to FIG. 33, UE #1 transmits the macro SRS in a comb form over the entire frequency band, that is, through one of every two subcarriers. UEs #2 to #4 transmit the macro SRS through subcarriers allocated in a comb form in SRS bands (i.e., bands in which the SRS is transmitted) assigned thereto. Allocation of subcarriers in a comb form is referred to as interleaved FDMA. When each UE uses a long block in an SC-FDMA symbol through which the macro SRS is transmitted, each UE repeatedly transmits the SRS twice in the SC-FDMA symbol.

Figure 34:
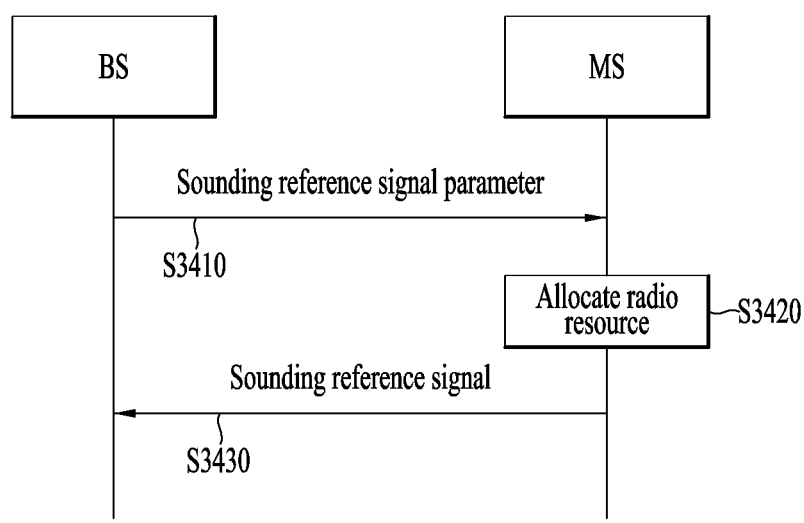
FIG. 34 illustrates an SRS transmission method of a relay station according to an embodiment of the present invention.

FIG. 34 illustrates a method by which an RS transmits the SRS according to an embodiment of the present invention.

The SRS transmission method of the RS includes a step S3410 of receiving SRS parameters from a BS, a step S3420 of allocating radio resources using the SRS parameters and a step S3430 of transmitting the SRS to the BS through the allocated radio resources. Here, the radio resources indicated by the SRS parameters include symbols including the guard interval in the time domain. Each step will now be described in detail.

In the step S3410, the SRS parameters received by the RS from the BS may be parameters shown in the following table.

TABLE 1

| SRS parameter | Meaning | Signal transmission type |
|---|---|---|
| srsBandwidthConfiguration | Maximum SRS band in a cell | Cell-specific |
| srsSubframeConfiguration | Set of subframes in which SRS can be transmitted in a cell | Cell-specific |
| srsBandwidth | SRS transmission band of RS | RS-specific |
| frequencyDomainPosition | Frequency domain position | RS-specific |
| srsHoppingBandwidth | Frequency hop size | RS-specific |
| Duration | Indicate a single SRS or a periodic SRS | RS-specific |
| srsConfigurationIndex | Period and subframe offset | RS-specific |
| transmissionComb | Transmission comb offset | RS-specific |
| $n_{SRS}^{CS}$ | Cyclic shift | RS-specific |
| srsResourcetype | Indicate type of a resource block in which SRS is transmitted | Cell-specific or RS-specific |

In Table 1, "srsBandwidthConfiguration" indicates a maximum band in which the SRS can be transmitted in a cell.

"srsSubframeConfiguration" indicates a set of subframes in which the SRS can be transmitted in each radio frame. In addition, "srsSubframeConfiguration" is a cell-specifically broadcast signal which is transmitted to the RS in the cell and can be 4 bits, for example. The SRS can be transmitted in the last SC-FDMA symbols of subframes capable of carrying the SRS. Backhaul uplink data transmission of the RS may not be permitted in the SC-FDMA symbols in which the SRS is transmitted.

In addition, "srsBandwidth" indicates an SRS transmission band of the RS. The SRS transmission band can be determined on the basis of transmit power of the RS, the number of RSs that can be supported by the BS and the like. The SRS transmission band of the RS, indicated by "srsBandwidth", will be described later.

"Duration" is a parameter indicating whether the BS requests the RS to transmit the SRS once or sets the RS to periodically transmit the SRS. The RS may transmit the SRS only once or periodically transmit the SRS to the BS according to this parameter.

"transmissionComb" indicates subcarriers to which the SRS transmitted by the RS are allocated. To support frequency selective scheduling in a multi-UE environment, it is necessary to overlap SRSs which are transmitted from different UEs or RSs and have different SRS bands. To support this, interleaved FDMA (IFDMA) having a repetition factor (RPF) of 2 is used for SC-FDMA symbols through which the SRS is transmitted. For example, it is possible to indicate whether the SRS is transmitted through an odd-numbered subcarrier or an even-numbered subcarrier in the SRS transmission band. The RPF in the time domain acts as a decimation factor in the frequency domain. Subcarriers through which the SRS is transmitted have a comb-link spectrum according to repetition of the SRS twice in SC-FDMA symbols in which the SRS is transmitted in the time domain. In other words, the subcarriers on which the SRS is transmitted are composed of even-numbered subcarriers (or odd-numbered subcarriers) only in an allocated sounding band. The RS is allocated the parameter "transmissionComb" due to IFDMA structure of symbols in which the SRS is transmitted. "transmissionComb" has a value of 0 or 1 and indicates a position at which the SRS is transmitted. However, "transmissionComb" is not limited thereto and may indicate a subcarrier from among every four subcarriers, such as 4n-th, (4n+1)-th, (4n+2)-th and (4n+3)-th subcarriers, to which the SRS is allocated. In this case, the SRS occupies ¼ symbols in the time domain.

"srsResourceType" is a parameter indicating whether a resource block to which the SRS is allocated is a long block or a short block. That is, the RS may allocate the SRS to the short block and transmit the SRS therein or allocate the SRS to the long block and transmit the SRS therein according to this parameter.

The RS allocates radio resources using the aforementioned SRS parameters.

Figure 35:
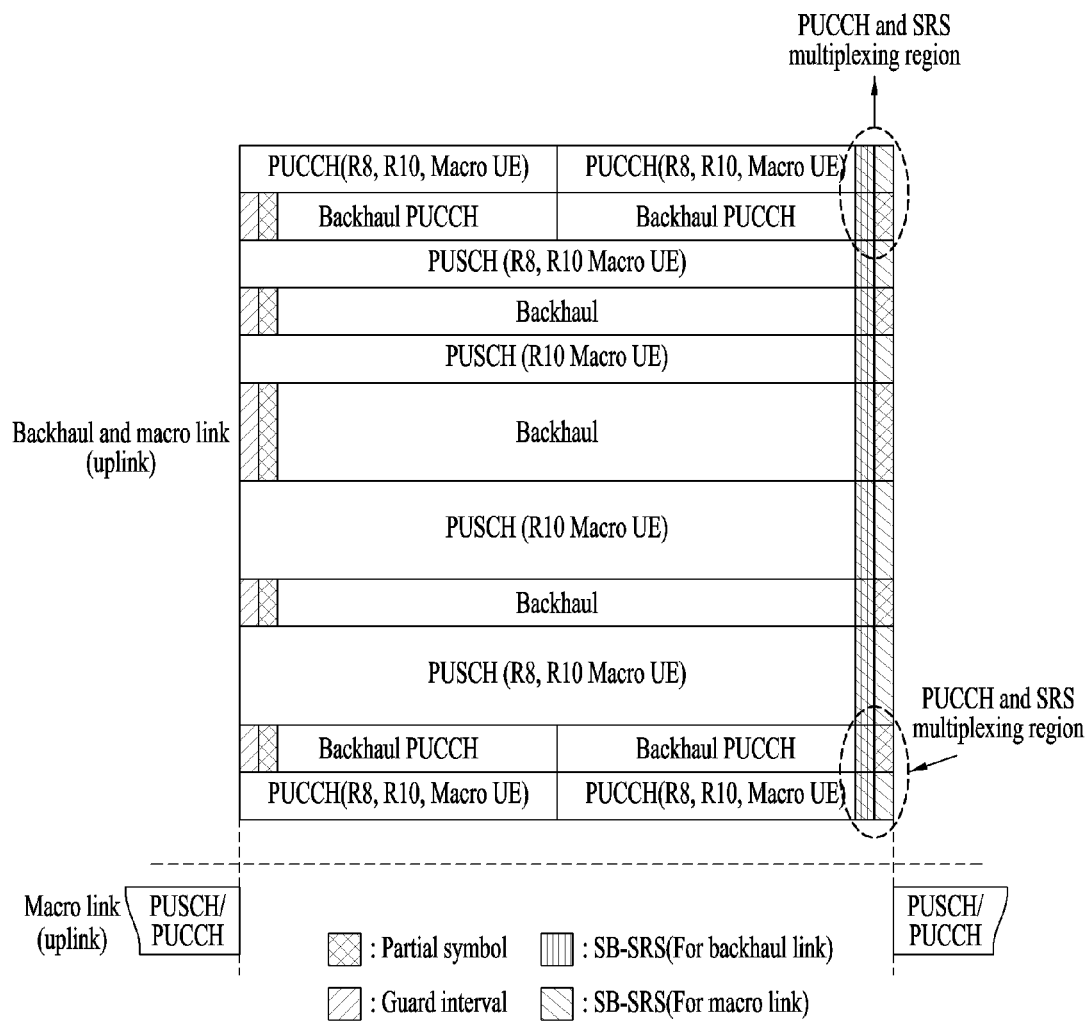
FIG. 35 illustrates an exemplary uplink subframe structure when a relay station transmits an SRS.

FIG. 35 illustrates an exemplary uplink subframe structure when an RS transmits the SRS.

A PUCCH on which an uplink control signal of a UE is transmitted may be allocated to a resource block positioned at the boundary of the frequency domain of an uplink subframe and a backhaul PUCCH on which the RS transmits a backhaul uplink control signal may be allocated adjacent to the PUCCH. A backhaul PUCCH region or a backhaul PUSCH region (region indicated by "backhaul" in FIG. 35) in which backhaul uplink data is transmitted may include the guard interval at the boundary of the subframe. Accordingly, it is difficult for the RS to use the entire last symbol of the subframe. The RS can use only part of the last symbol when transmitting the SRS to the BS. For example, the RS can allocate a short block to the front part of the last symbol and transmit an SRS (SB-SRS) using the short block. The SB-SRS may refer to an SRS allocated to a short block in the time domain.

A UE can transmit the macro SRS using the entire last symbol of the subframe since the last symbol does not include the guard interval. That is, the UE can transmit an SRS (LB-SRS) using a long block. The LB-SRS may refer to an SRS allocated to a normal symbol in the time domain. Here, whether the RS transmits the SRS even in a frequency band to which a PUCCH is allocated may become a problem.

FIGS. 36 to 39 illustrate exemplary SRS transmission bands of an RS, which can be set by the "srsBandwidth" parameter.

Figure 36:
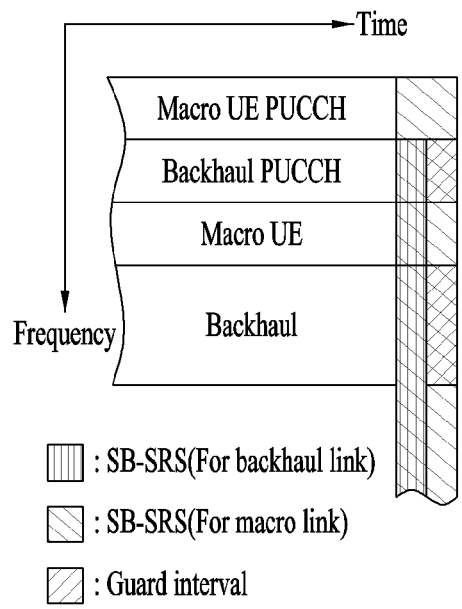
FIGS. 36 to 39 illustrate exemplary SRS transmission bands of a relay station, which can be set by 'srsBandwidth' parameter.
Figure 37:
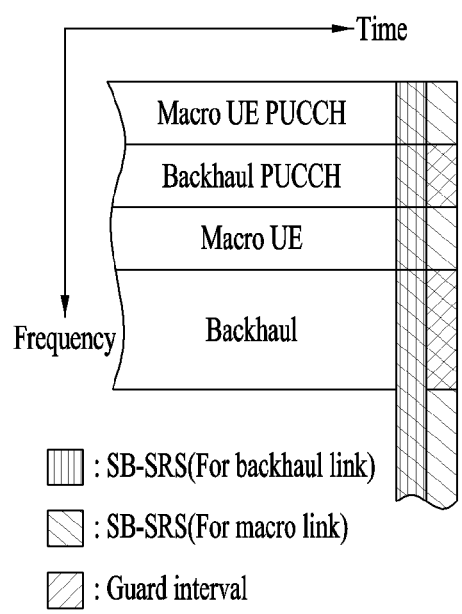

FIG. 36 shows a case in which a PUCCH region of a UE is excluded from the SRS transmission band of the RS and FIG. 37 shows a case in which the SRS transmission band of the RS includes the PUCCH region of the UE.

Figure 38:
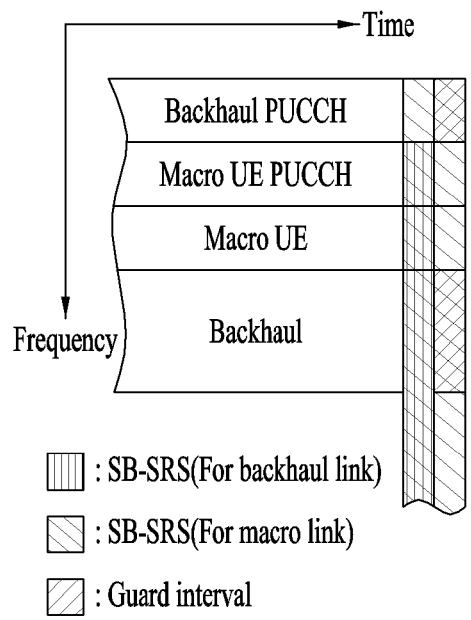
Figure 39:
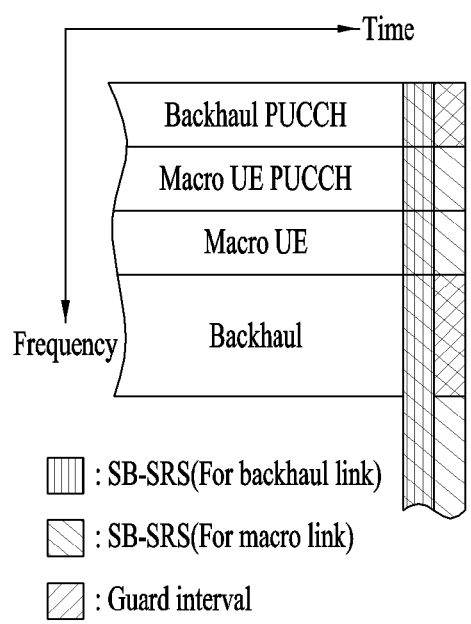

FIGS. 38 and 39 illustrate a case in which a backhaul PUCCH is positioned at the boundary of a frequency band of a subframe. Here, the SRS transmission band of the RS may exclude a backhaul PUCCH region, as shown in FIG. 38, or may include the backhaul PUCCH region, as show in FIG. 39. In addition, the UE may not transmit the SRS in a band in which a backhaul PUCCH is transmitted. As a result, it is possible to prevent the last symbol of the backhaul PUCCH region from being punctured by the macro SRS.

Like the LB-SRS, the SB-SRS can reduce interference and maintain low PAPR/CM characteristics by being spread by a constant amplitude zero autocorrelation (CAZAC) or Zadoff-Chu sequence. Particularly, to obtain high processing gain according to such sequence, the SB-SRS and the LB-SRS may have the same transmission band and the same frequency position.

A transmission band, transmission comb, cyclic shift, hopping rule and the like for the SB-SRS may be known to the RS by the SRS parameters. Here, a new rule may be defined and only newly required parameters may be added while the rule used for the LB-SRS is equally used.

A description will be given of a method by which an RS transmits the SRS to a BS through radio resources allocated by the SRS parameters and a process in which the BS receives the SRS.

Figure 40:
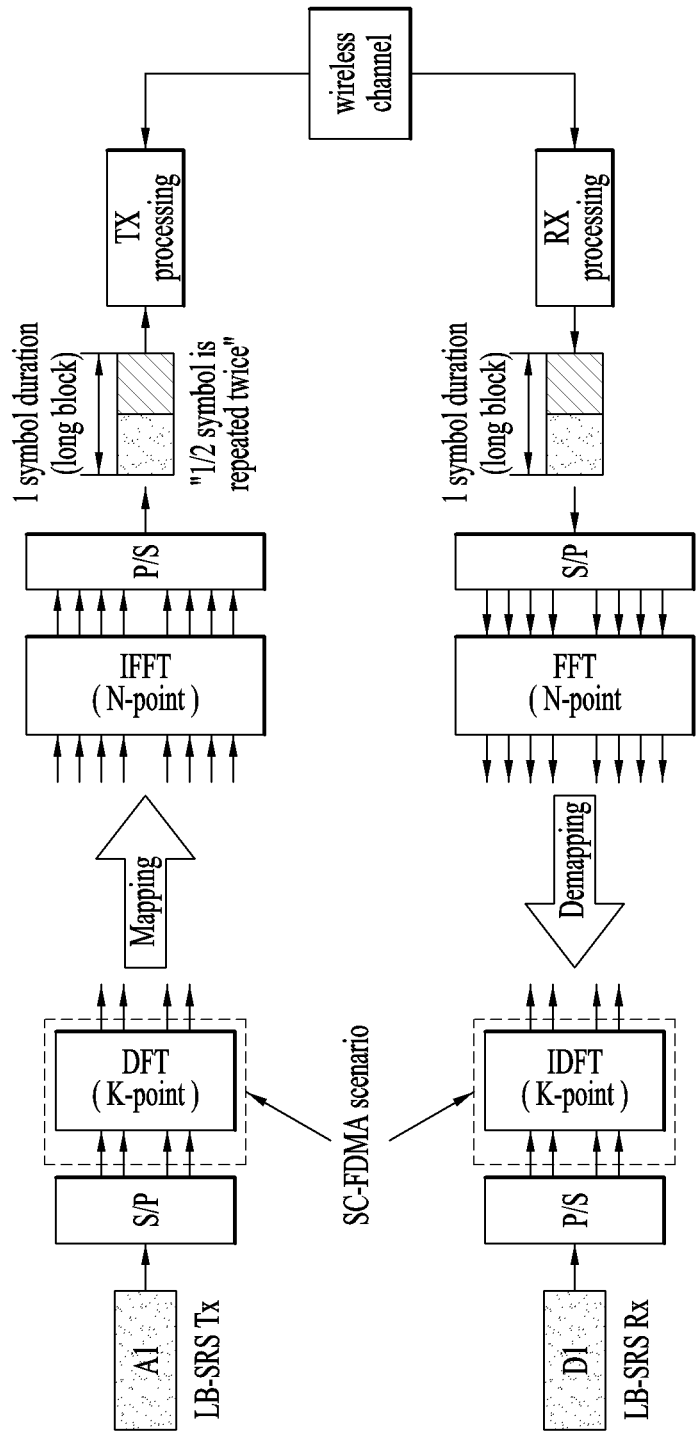
FIG. 40 illustrates a procedure in which a relay station (or UE) generates and transmits a long block SRS and an eNB receives the long block SRS.

FIG. 40 illustrates a procedure in which the RS (or a UE) generates and transmits an LB-SRS and the BS receives the LB-SRS.

Referring to FIG. 40, the RS converts an LB-SRS A1 to be transmitted into parallel signals, performs discrete Fourier transform (DFT) on the parallel signals and maps the resultant signals to subcarriers. Then, the RS transforms the signals into a serial signal through N-point inverse fast Fourier transform (IFFT). Accordingly, the signal A1 to be transmitted by the RS becomes a signal that is repeated twice in one symbol (B1 is repeated twice).

The BS restores the LB-SRS from the signal received via a radio channel through N-point FFT, subcarrier demapping and inverse discrete Fourier transform (IDFT).

Figure 41:
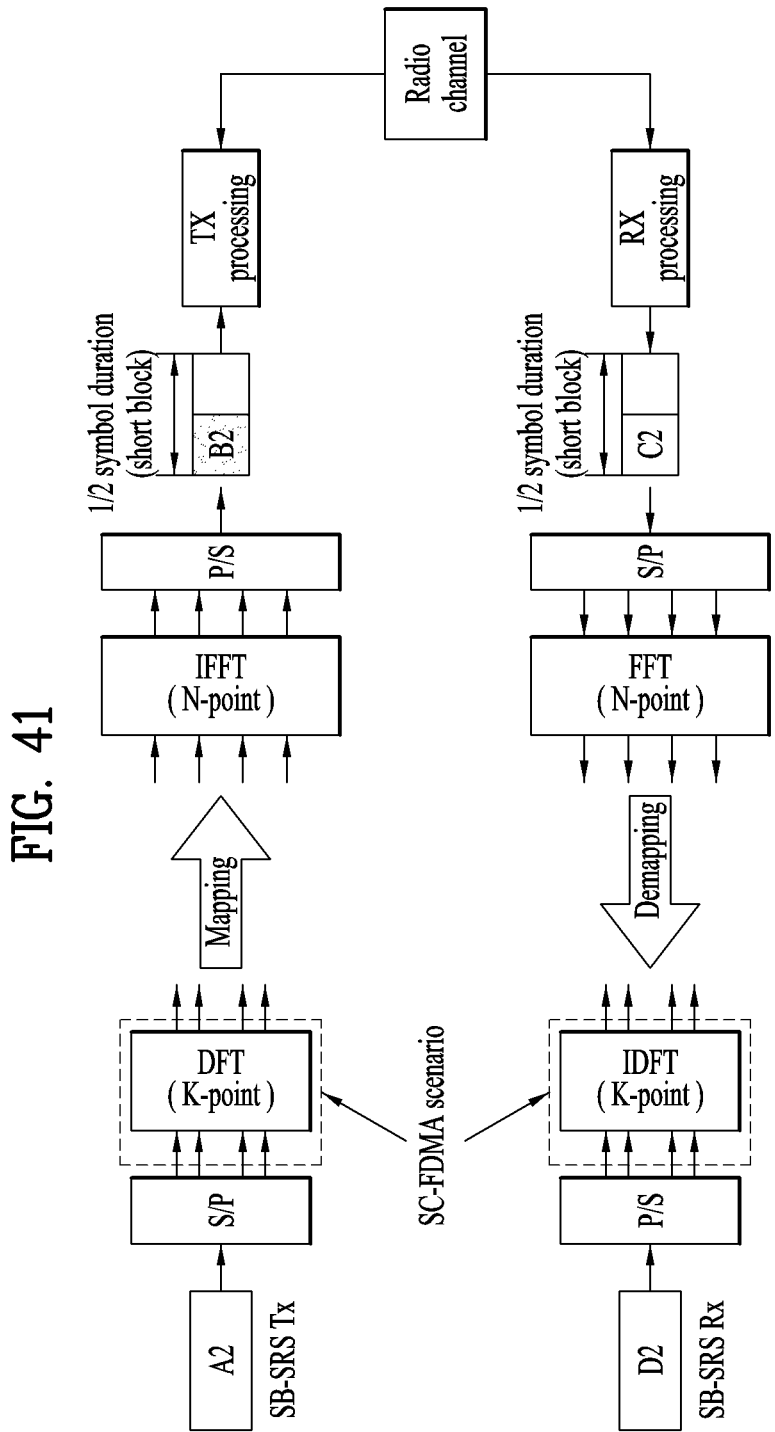
FIG. 41 illustrates a procedure in which the relay station (or UE) generates and transmits a short block SRS and the eNB receives the short block SRS.

FIG. 41 illustrates a procedure in which the RS generates and transmits an SB-SRS and the BS receives the SB-SRS.

N/2-point IFFT instead of N-point IFFT is performed on an SB-SRS A2. That is, the number of sampling points of the SB-SRS corresponds to half that of the LB-SRS. Accordingly, the SB-SRS is disposed only in half of one symbol. That is, B2 is disposed only in a half symbol in FIG. 41. The BS restores the SB-SRS from the signal received via a radio channel through N/2-point FFT, subcarrier demapping and IDFT.

Figure 42:
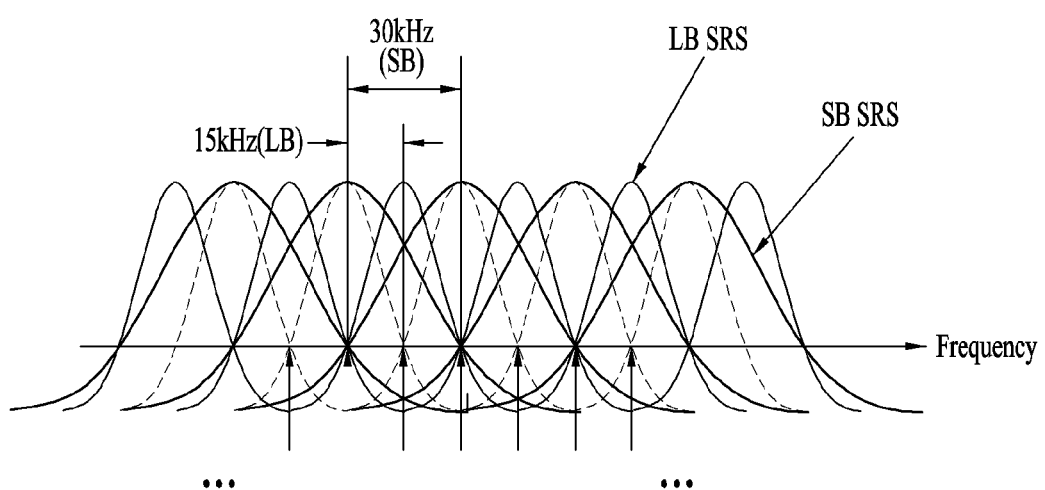
FIG. 42 illustrates comparison of subcarrier waveforms and subcarrier spacings of a long block SRS and a short block SRS.

FIG. 42 shows comparison of subcarrier waveforms and subcarrier spacings of the LB-SRS and the SB-SRS.

Referring to FIG. 42, the LB-SRS is allocated to odd-numbered subcarriers (or even-numbered subcarriers) from among subcarriers having a subcarrier spacing of 15 kHz and the SB-SRS is allocated to subcarriers having a subcarrier spacing of 30 kHz.

Accordingly, while the subcarriers to which the LB-SRS and the SB-SRS are allocated have the same spacing of 30 kHz, the LB-SRS and the SB-SRS may have different waveforms in the frequency domain. That is, each subcarrier takes the form of a sync function in the frequency domain and the zero crossing point spacing of the SB-SRS is twice that of the LB-SRS. Accordingly, at points where the subcarriers on which the LB-SRS is transmitted have maximum values, the subcarriers on which the SB-SRS is transmitted do not have values of 0. However, the values of the subcarriers carrying the SB-SRS at the points are not large and thus the influence thereof is insignificant.

Figure 43:
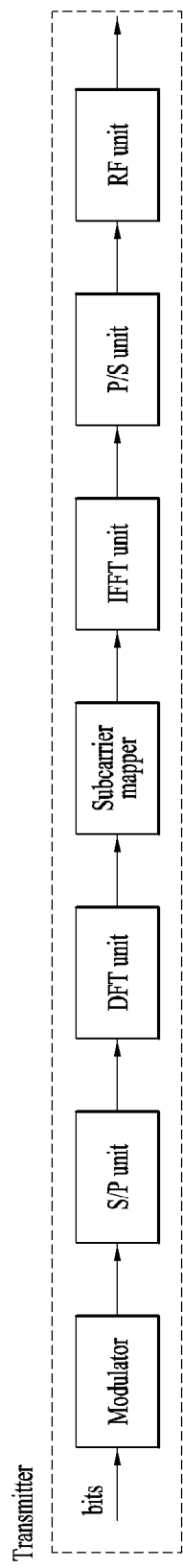
FIG. 43 illustrates a transmitter according to an embodiment of the present invention.

FIG. 43 illustrates a transmitter according to an embodiment of the present invention.

The transmitter may be part of an RS. The transmitter may include a modulator, a DFT unit, a subcarrier mapper, an IFFT unit and an RF unit.

The modulator generates modulated symbols by mapping encoded bits to symbols representing positions on signal constellation. A modulation scheme is not restricted and m-phase shift keying (m-PSK) or m-quadrature amplitude modulation (m-QAM) may be used as a modulation scheme. The modulated symbols are input to the DFT unit. The DFT unit performs DFT on the input symbols so as to output complex-valued symbols. For example, when K symbols are input to the DFT unit, a DFT size is K (K being a natural number).

The subcarrier mapper maps the complex-valued symbols to subcarriers of the frequency domain. The complex-valued symbols can be mapped to resource elements corresponding to a resource block allocated for data transmission. The IFFT unit performs IFFT on the symbols input thereto so as to output a baseband signal for data, which is a time domain signal. When an IFFT size is N, N can be determined by a channel bandwidth (N being a natural number). A CP insertion unit (not shown) copies part of the rear portion of the baseband signal for the data and inserts the copied part into a region before the baseband signal for the data. Inter-symbol interference (ISI) and inter-carrier interference (ICI) are prevented according to CP insertion and thus orthogonality can be maintained even on a multi-path channel.

A transmission scheme in which IFFT is performed after DFT spreading is referred to as single-carrier frequency division multiple access (SC-FDMA). SC-FDMA may also be called DFT spread-OFDM (DFTS-OFDM). In SC-FDMA, a peak-to-average power ratio (PAPR) or cubic metric (CM) can be reduced. When SC-FDMA is used, transmit power efficiency can be increased.

Figure 44:
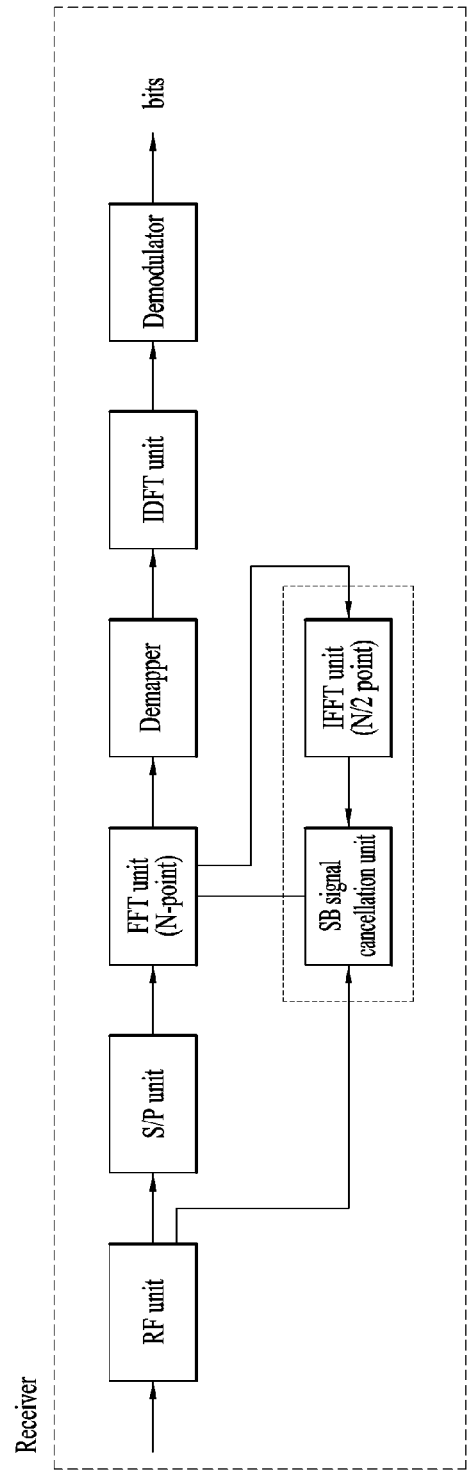
FIG. 44 illustrates a receiver, which may be part of an eNB, according to an embodiment of the present invention.

FIG. 44 illustrates a receiver according to an embodiment of the present invention. The receiver may be part of a BS.

The receiver may include an RF unit, an FFT unit, a demapper and an IDFT unit. In addition, the receiver may include an IFFT unit and an SB signal cancellation unit.

The RF unit may include at least one antenna and receives a radio signal through a radio channel. The received radio signal is converted from a serial signal into parallel signals and then transformed into a frequency domain signal through the FFT unit. The frequency domain signal is transformed into a time domain signal through the demapper and the IDFT unit.

The IFFT unit transforms the frequency domain signal transformed through the FFT unit into a time domain signal. Here, when the FFT unit performs N-point FFT, the IFFT unit can perform N/2-point IFFT. The SB signal cancellation unit subtracts an SB signal received from the IFFT unit from a signal received through the RF unit. That is, the SB signal cancellation unit removes the SB signal from the signal received through the RF unit.

Figure 45:
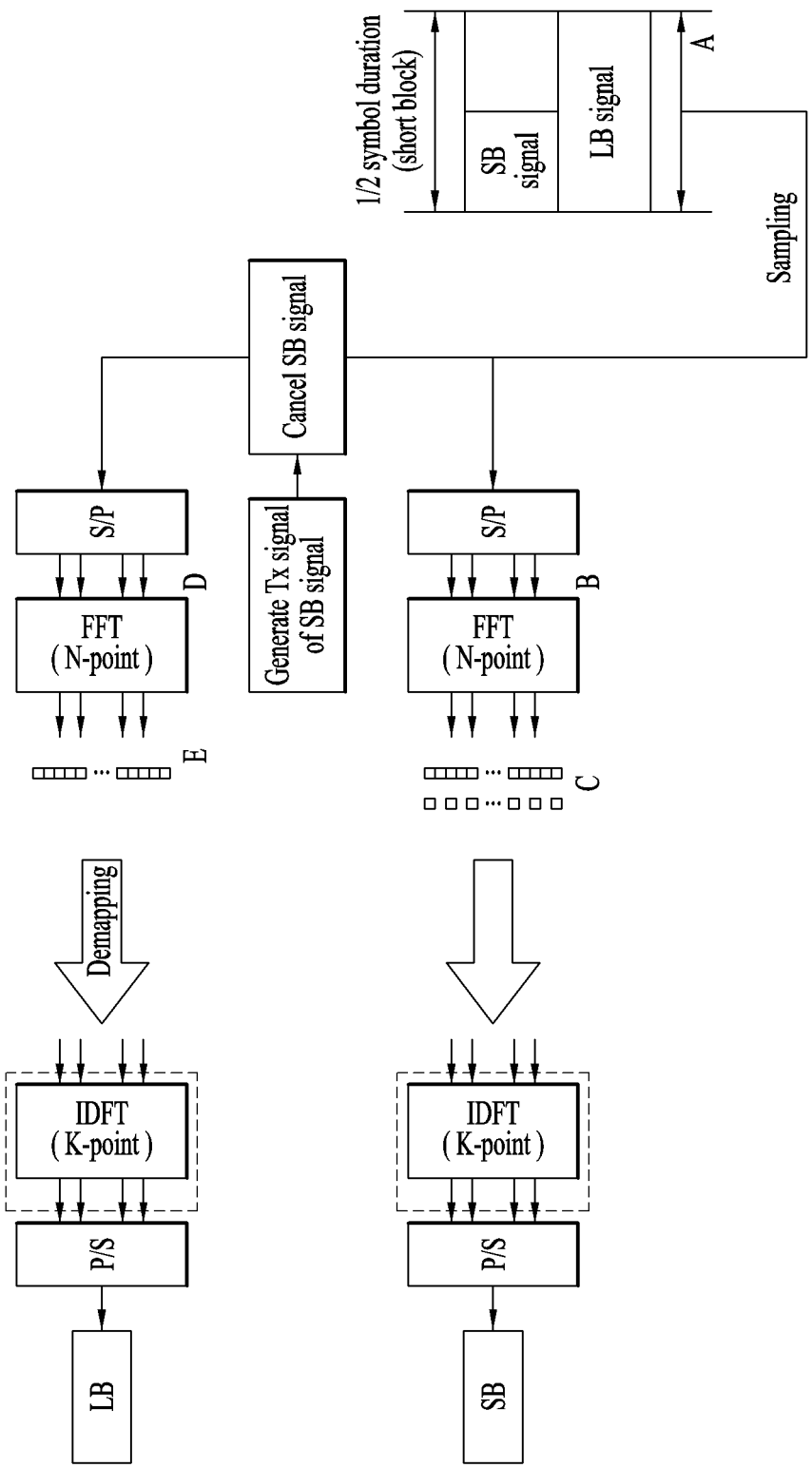
FIG. 45 illustrates a procedure of processing a long block SRS and a short block SRS when a receiver of an eNB simultaneously receives the long block SRS and the short block SRS.

FIG. 45 illustrates a process of processing an LB-SRS and an SB-SRS when a receiver of a BS simultaneously receives the LB-SRS and the SB-SRS.

The BS may simultaneously receive an LB-SRS transmitted by a UE and an SB-SRS transmitted by an RS in the last symbol of a subframe. That is, an analog signal (signal at a point A) received through an RF unit of the receiver may be a signal obtained by mixing an LB signal and an SB signal.

In this case, the receiver samples the received analog signal and then converts the sampled signal into parallel signals (signals at a point B). Subsequently, the receiver performs N-point FFT on the parallel signals. For example, when a carrier bandwidth is 20 MHz, the number of signal samples, N, applied to FFT may be 2048. The receiver can obtain 1024 samples (which can be obtained by acquiring only signals of even-numbered or odd-numbered carriers) from the signal acquired through FFT. The 1024 samples correspond to SB signal samples (signals at a point C). The SB signal samples are restored to the SB signal through IDFT.

The LB signal included in the signal at the point A cannot be directly obtained from the sampled signal because the sampled signal includes both the SB signal and the LB signal. Accordingly, additional processing is necessary to extract only samples with respect to the LB signal.

As described above, the signals at the point C correspond to the SB signal samples. The receiver generates the SB signal samples as the same signal as the SB signal generated by the transmitter. The receiver can cancel interference due to the SB signal in the signal at the point A by subtracting the generated SB signal from the signal of the point A. This process may be implemented by removing the SB signal from the signals of the point B instead of the signal of the point A.

The receiver converts the signal obtained by removing the SB signal from the received signal into parallel signals (signals at a point D) and performs N-point FFT thereon (signals at a point E). Then, the receiver restores the LB signal through IDFT.

A description will be given of the signals in the frequency domain at the points A, B, C and E in the receiver shown in FIG. 45.

Figure 46:
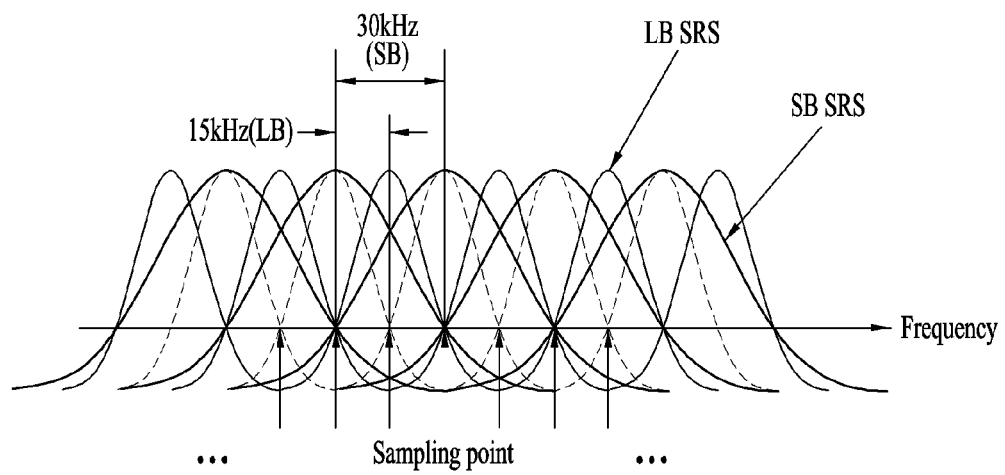
FIG. 46 illustrates signals in the frequency domain at processing point A in the receiver shown in FIG. 45.

FIG. 46 illustrates the signal in the frequency domain at the point A in the receiver of FIG. 45. FIG. 46 shows waveforms of subcarriers in parallel instead of the actual waveform of the LB-SRS or the SB-SRS. The actual waveform corresponds to a result of combination of the subcarriers. While the LB-SRS and the SB-SRS have the same subcarrier spacing of 30 kHz, the LB-SRS and the SB-SRS have different waveforms in the frequency domain. The SB-SRS has a wider zero crossing point spacing. A sampling point spacing in the signal at the point A can be 15 kHz.

Figure 47:
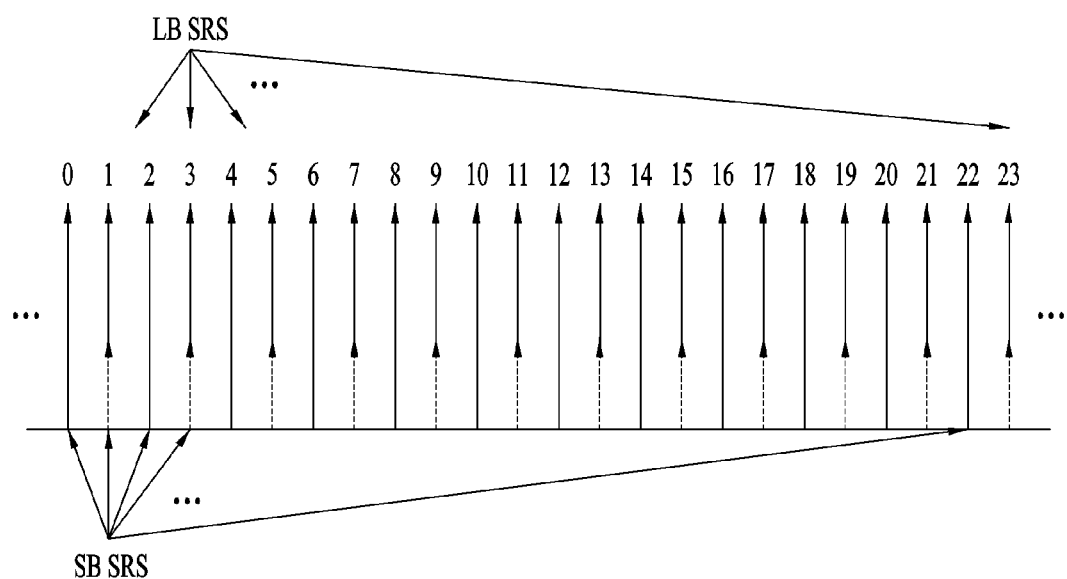
FIGS. 47 to 49 respectively illustrate signals in the frequency domain at processing points B, C and E in the receiver shown in FIG. 45.
Figure 48:
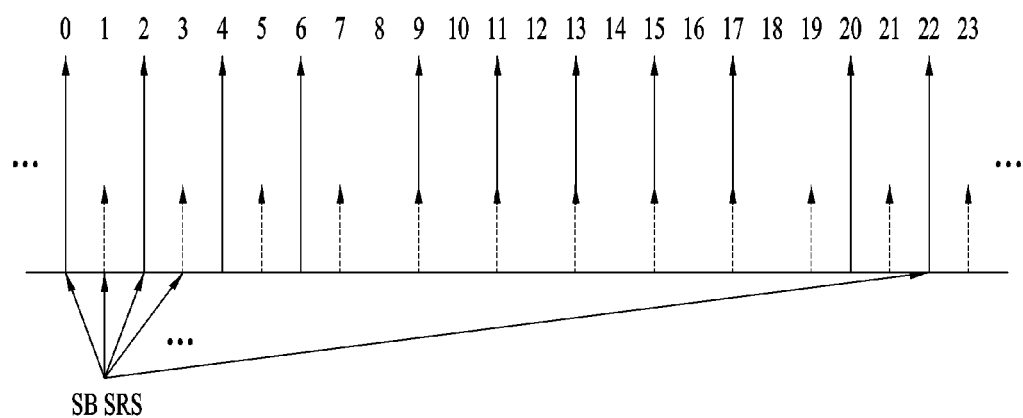
Figure 49:
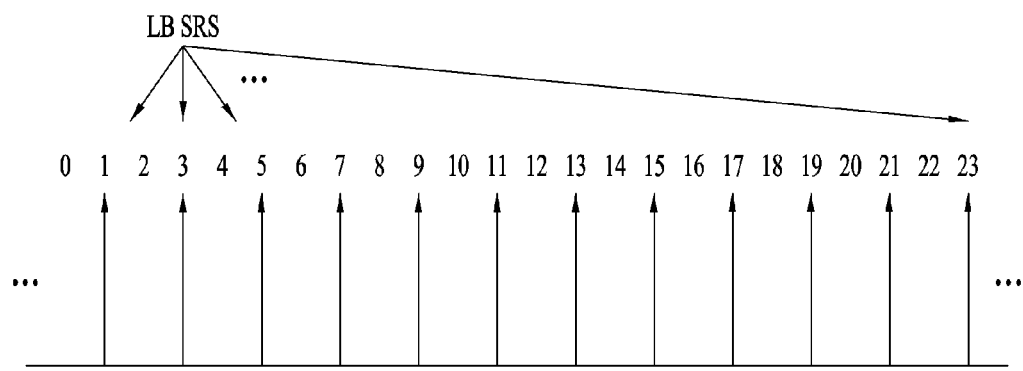

FIGS. 47 to 49 illustrate the signals in the frequency domain at the points B, C and E in the receiver of FIG. 45.

Referring to FIG. 47, both the LB-SRS and the SB-SRS are present at the point B in a mixed form. For example, the LB-SRS can have values at odd-numbered subcarriers and the SB-SRS can have values at even-numbered subcarriers and odd-numbered subcarriers. The SB-SRS applies interference to the LB-SRS since the SB-SRS has values even at odd-numbered subcarriers.

Referring to FIG. 48, the signals at the point C have values on even-numbered subcarriers and odd-numbered subcarriers. That is, the signals at the point C can include the SB-SRS only. Referring to FIG. 49, the signals at the point E, that is, the signals on which N-point FFT has been performed can include the LB-SRS only.

As described above, the SRS transmitted from the RS to the BS can be allocated to part of a symbol including the guard interval in a subframe, for example, the former half or the latter half of the symbol, and transmitted therein. According to this method, the SRS can be prevented from being deteriorated due to the guard interval included in the symbol of the subframe.

In addition, backhaul link transmission capacity increases because radio resources, which may be wasted due to the guard interval when a signal is transmitted through a normal symbol, are used for backhaul link signal transmission. If the RS does not transmit the SRS in the last symbol of the subframe, the RS needs to transmit the SRS in other symbols. Accordingly, the RS needs to puncture symbols in which the SRS is transmitted, and thus symbols to be used for backhaul data transmission are punctured.

Figure 50:
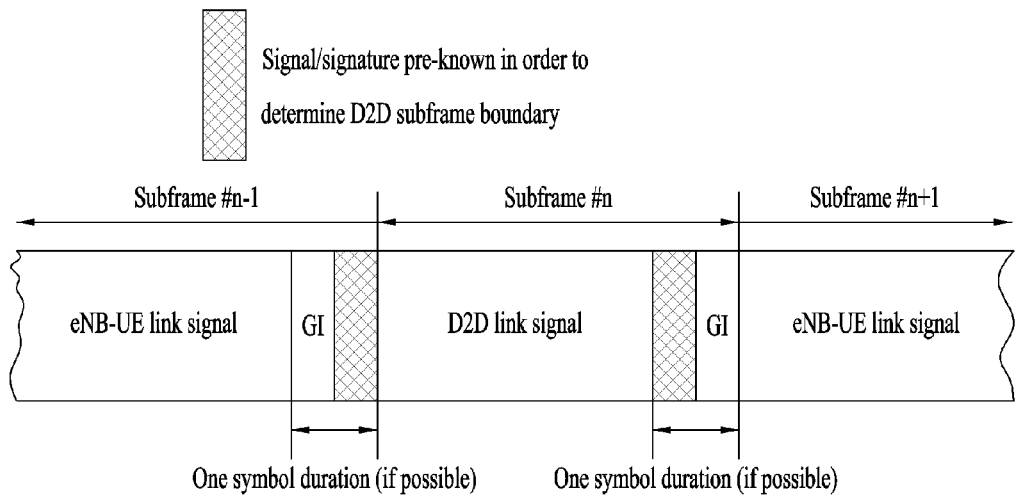
FIGS. 50 to 52 illustrate subframe structures including GIs and a D2D subframe synchronization signal according to an embodiment of the present invention.
Figure 51:
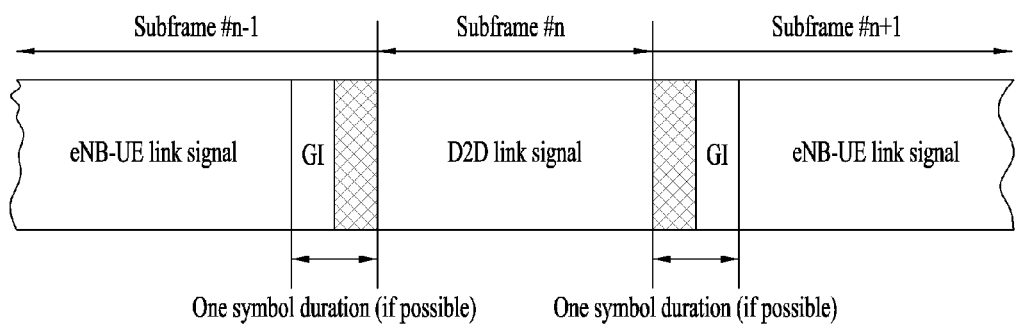
Figure 52:
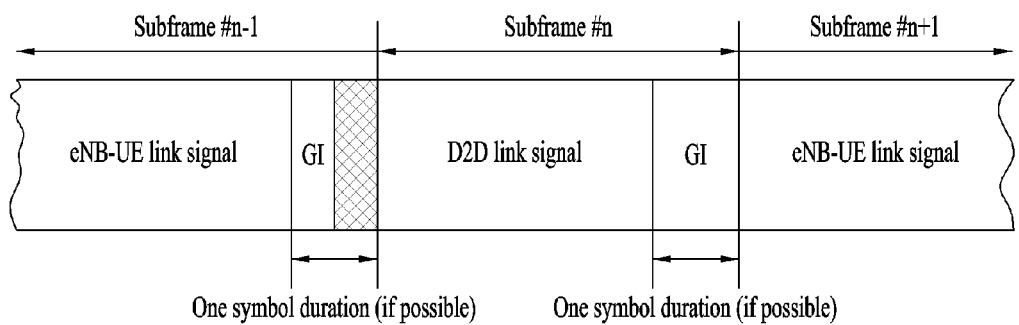

A description will be given of a method for receiving a signal using part of a symbol as described above. In the following description, a subframe operating for a D2D link is referred to as a D2D subframe. Here, a unit time of the D2D subframe in which D2D transmission and reception operations are performed can be determined as one or more subframes. A description will be given of disposition of guard intervals and a D2D subframe synchronization signal according to the aforementioned method when the D2D subframe is given, FIGS. 50 to 52 illustrate subframe structures including the guard intervals and the D2D subframe synchronization signal according to an embodiment of the present invention. Here, it is assumed that a D2D link operates in subframe #n and an NU link operates in subframes #n−1 and #n+1.

Referring to FIG. 50, part of the last symbol of subframe #n−1 prior to subframe #n is set to the guard interval GI and the remaining part thereof is used for transmission and reception of the D2D subframe synchronization signal. As a result, a D2D receiver UE can detect a correct time (i.e., time when reception of the D2D subframe synchronization signal is ended) when the D2D subframe starts and receive a D2D control signal or a D2D data signal in subframe #n from the first symbol thereof. In FIG. 50, it is assumed that part of the last symbol of subframe #n is used for transmission and reception of the subframe synchronization signal and the remaining part thereof is set to the guard interval.

Here, the last symbol of subframe #n−1 cannot be used for normal NU link operation. To solve this problem, an eNB sets the corresponding subframe as a cell-specific SRS subframe and thus UEs can operate to end transmission of a PUSCH or a PUCCH before the last symbol. When propagation delay between UEs is large or a larger number of guard intervals is needed, normal NU link operation may not be performed in the last symbol of subframe #n−1. In this case, the eNB needs to perform appropriate scheduling such that the corresponding UE does not order NU link transmission in subframe #n−1.

Referring to FIG. 51, the D2D subframe synchronization signal and the guard interval are set in the first symbol of subframe #n+1. In this case, while even the last symbol of subframe #n can be used for D2D signal transmission and reception, the first symbol of subframe #n+1 cannot be used for the NU link. To solve this, the eNB may not schedule transmission using the first symbol of subframe #n+1 for a UE that performs D2D operation in subframe #n. For example, the eNB can schedule SRS transmission using the last symbol.

Referring to FIG. 52, a UE may not transmit and receive the D2D subframe synchronization signal at a time when the D2D subframe is ended. However, the UE can perform transmission/reception mode switching for NU link operation in subframe #n+1 as part of the last time region of the D2D subframe is set to the guard interval.

An embodiment in which part of guard intervals is omitted may be considered. For example, when the eNB does not schedule uplink signal transmission in subframe #n−1 for a UE that performs D2D operation in subframe #n in FIG. 52, the guard interval between subframe #n−1 and subframe #n is unnecessary and thus the guard interval can be omitted.

While it is assumed that the guard interval occupies only part of an OFDM symbol in the aforementioned embodiment, the guard interval may have a larger value when a distance between D2D UEs is very long. For example, when the guard interval is extended forward in the embodiment shown in FIG. 52, propagation delay when a distance between UEs is very long can be overcome. In this case, even when a cell-specific SRS is configured in subframe #n−1, normal NU link signal transmission may be impossible. Furthermore, when the guard interval is further extended and thus the guard interval cannot be covered by the last symbol, the eNB may not allocate the corresponding subframe to the corresponding D2D receiver UE.

The aforementioned D2D subframe synchronization signal may be a short SRS, for example. The SRS of 3GPP LTE has a unique structure in which a sequence corresponding to 0.5 symbol size is continuously transmitted twice for one symbol duration. Due to such structure, even if a UE receives only half a symbol, the symbol can be restored through the conventional SRS symbol reception process. Accordingly, a special signal can be inserted into a time interval shorter than one symbol. However, operation of using a half signal is performed by a receiver UE only and a transmitter UE can transmit the D2D subframe synchronization signal using a full symbol. For example, the transmitter UE repeatedly transmits a D2D subframe synchronization signal having a size of 0.5 symbol twice at the start and/or the end of the corresponding subframe, and the receiver UE can use one 0.5 symbol region in which the signal is transmitted once as a guard interval.

Such operation may be more useful for the receiver UE. The receiver UE can perform reception operation in the D2D subframe and perform transmission to the eNB in a neighboring subframe of the D2D subframe. In this case, transmission/reception mode switching needs to be performed at the boundary of the corresponding subframes for the receiver UE and normal transmission and reception operations cannot be performed during mode switching. Accordingly, the aforementioned operation is useful for the receiver UE.

The transmitter UE performs transmission operation in the D2D subframe and performs transmission to the eNB in a neighboring subframe of the D2D subframe. Accordingly, the aforementioned D2D subframe synchronization signal may take the form of a normal signal that occupies one OFDM symbol from the viewpoint of the transmitter UE. For example, the D2D subframe synchronization signal can take the form of a normal SRS. The form of the D2D subframe synchronization signal can be modified. It is important that the D2D subframe synchronization signal be present with a guard interval in a designated size/position in the LTE subframe structure.

As described above, the D2D subframe synchronization signal can be used for various purposes such as channel estimation and synchronization tracking as well as synchronization. Particularly, when the D2D subframe synchronization signal is used for channel estimation, the relation with a modulation reference signal separately present in the D2D subframe can be specially established. In general, the demodulation reference signal is used for channel estimation for each transport layer in multi-antenna transmission and reception situations. Accordingly, when a plurality of layers is transmitted, different precoding schemes may be applied to the respective layers.

On the contrary, the D2D subframe synchronization signal is generally transmitted through a single layer, and thus a problem may be generated when operation is performed on the assumption that the same precoding scheme is applied to the D2D subframe synchronization signal and the demodulation reference signal for signal demodulation. However, since the two signals are transmitted from the same transmitter and received through the same radio channel, the two signals can be assumed to have the same long-term properties of a channel between the transmitter and the receiver, such as Doppler spread, Doppler shift, delay spread and average delay. From this point of view, it can be assumed that the D2D subframe synchronization signal and the demodulation reference signal are transmitted from quasi-co-located antennas sharing many physical properties, rather than the same antenna port, from the view point of a logical antenna including a precoder.

In the aforementioned operation, the D2D subframe synchronization signal may take a form in which a relatively short signal is repeated several times. For example, when the above-described SRS is used as the D2D subframe synchronization signal, the normal SRS can take a form in which 0 is applied once to each of two subcarriers such that the same signal is repeated twice in the time domain. Here, the signal can be transmitted only once and the remaining region can be used as a guard interval, as described above.

This is generalized as follows. A signal is applied only once to each of N subcarriers and 0 is applied to the remaining N−1 subcarriers such that the same signal is repeated N times in one OFDM symbol in the time domain, M signals from among the N signals are used as the D2D subframe synchronization signal and the remaining N−M signal intervals are used for a guard interval. In this case, a conventional SRS sequence may be reused as a sequence used as the D2D subframe synchronization signal. Alternatively, a new sequence may be introduced as the sequence of the D2D subframe synchronization signal. In this case, a transmitted signal can be generated in such a manner that a signal is applied only once to each of N subcarriers. When N=2 and M=1, an SRS signal is transmitted for a 0.5 symbol interval as in the aforementioned embodiment.

Figure 53:
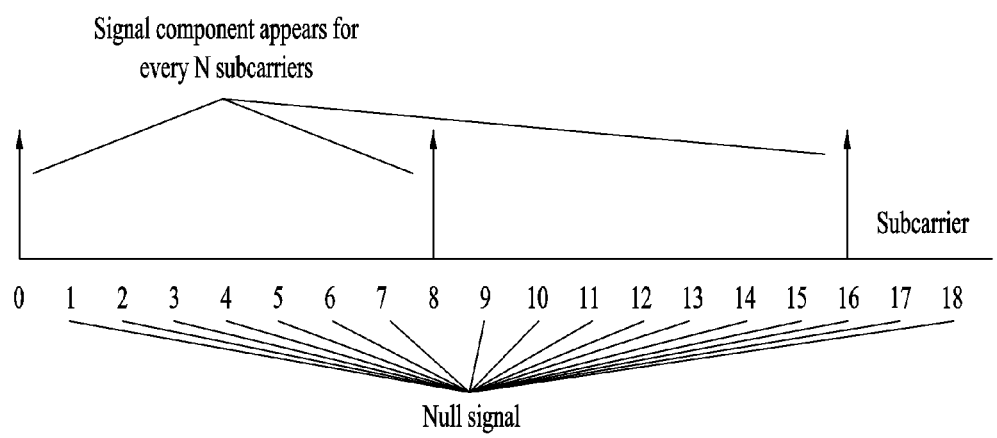
FIG. 53 illustrates a method for generating a subframe synchronization signal according to an embodiment of the present invention.

FIG. 53 illustrates a method for generating a subframe synchronization signal according to an embodiment of the present invention.

Referring to FIG. 53, a UE applies a signal only to one subcarrier from among N subcarriers and applies 0 to the remaining subcarriers in order to generate the subframe synchronization signal when N=8. When the signal generated in this manner is transmitted through a full OFDM symbol, the same signal block appears to be repeated N times in the time domain. However, N−M blocks are used for a guard interval and only the remaining M blocks are transmitted according to the aforementioned principle of the present invention. A description will be given of a method for generating the subframe synchronization signal when M is 4.

Figure 54:
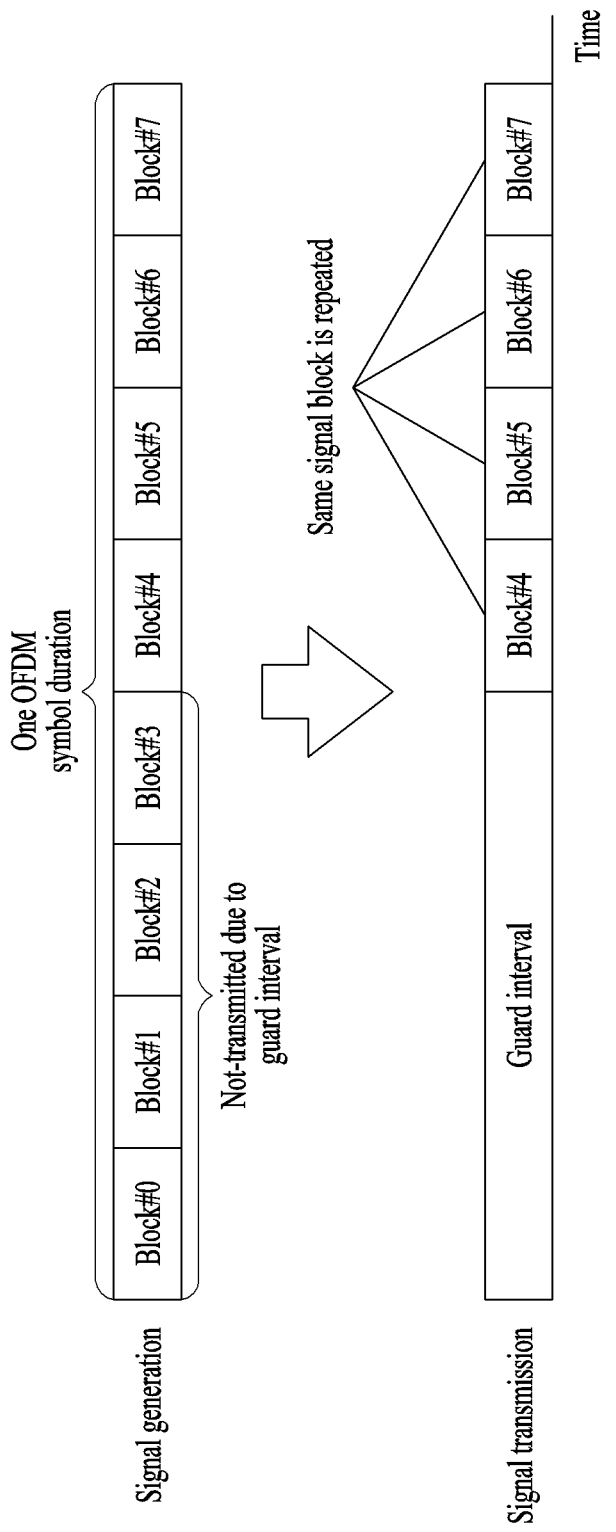
FIG. 54 illustrates a method for generating a subframe synchronization when M=4 according to an embodiment of the present invention.

FIG. 54 illustrates a method for generating the subframe synchronization signal when M is 4 according to an embodiment of the present invention. It is assumed that M signal blocks corresponding to the rear part from among N signal blocks are transmitted. However, M blocks corresponding to the front part may be transmitted.

Referring to FIG. 54, when N=8 and M=4, only four of 8 blocks are transmitted and the remaining four blocks are used for a guard interval. When some of N repeated signal blocks are not transmitted, as shown in FIG. 54, the bandwidth of one subcarrier increases, as shown in FIG. 42. Consequently, a little signal component may appear at a frequency position corresponding to a null subcarrier adjoining a subcarrier to which the signal is applied in FIG. 53. For example, when N=8 and M=4, the effect of combining two subcarriers into one subcarrier can be obtained.

Figure 55:
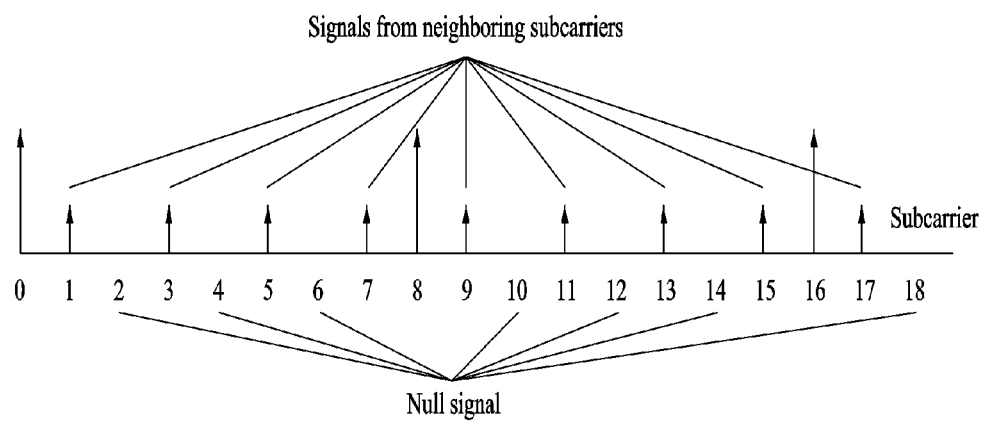
FIG. 55 illustrates inter-carrier interference according to an embodiment of the present invention.

FIG. 55 illustrates inter-carrier interference according to an embodiment of the present invention.

Referring to FIG. 55, a signal is applied to subcarriers corresponding to multiples of 8 and a null signal is accurately applied to the remaining even-numbered subcarriers, whereas a residual component of the signal applied to a neighboring subcarrier may appear at odd-numbered subcarriers.

When properties of the subframe synchronization signal are compared with properties of a signal used for information transmission between UEs, which follows the subframe synchronization signal, with respect to the aforementioned procedure, the subcarrier spacing of the subframe synchronization signal is wider than that of the signal. Similarly, an OFDM symbol interval of the subframe synchronization signal is shorter. Particularly, since the subframe synchronization signal can be detected prior to acquisition of frequency synchronization, a UE can easily detect the subframe synchronization signal even before synchronization when a frequency synchronization error exists when the subcarrier spacing of the subframe synchronization signal is extended such that the subframe synchronization signal is relatively robust to inter-carrier interference due to the frequency synchronization error.

Figure 56:
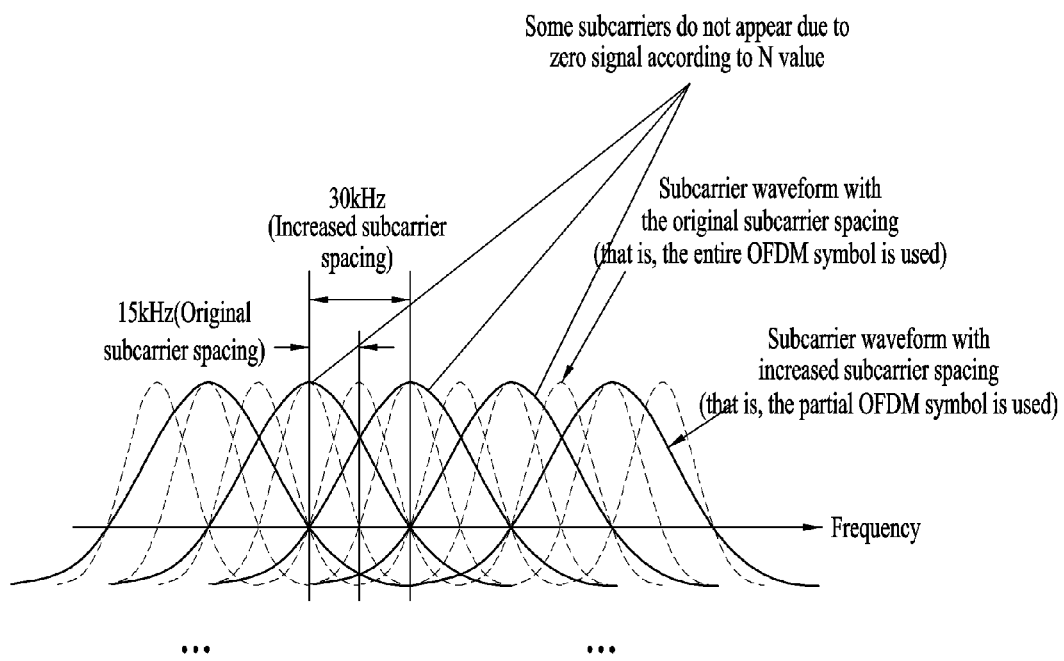
FIG. 56 illustrates frequency response of a signal transmitted by a UE.

FIG. 56 illustrates a frequency response of a signal transmitted by a UE.

A method for acquiring synchronization using the frequency response will now be described with reference to FIG. 56.

As described with reference to FIG. 54, the D2D subframe synchronization signal structure in which the same signal block is repeated is effective to detect and correct frequency error between a transmitter UE and a receiver UE. When the frequency error between the transmitter UE and the receiver UE is present, the phase of the same signal linearly increases over time from the viewpoint of the receiver UE. Accordingly, in the case of the structure as shown in FIG. 56, the UE can detect a phase change rate of the same signal on the basis of a predetermined interval between two signal blocks by comparing a phase difference between the two signal blocks. In addition, the UE can detect and correct frequency error on the basis of the phase change rate.

Through such process, the receiver UE needs to acquire frequency synchronization of the transmitter UE and then to acquire time synchronization in which a D2D subframe starts. If the receiver UE acquires frequency synchronization of the receiver UE through the aforementioned process and receives a signal at the same frequency, the receiver UE can also acquire time synchronization using the signal block repetition structure as shown in FIG. 54. A description will be given of a method for acquiring frequency/time synchronization with reference to FIG. 57.

Figure 57:
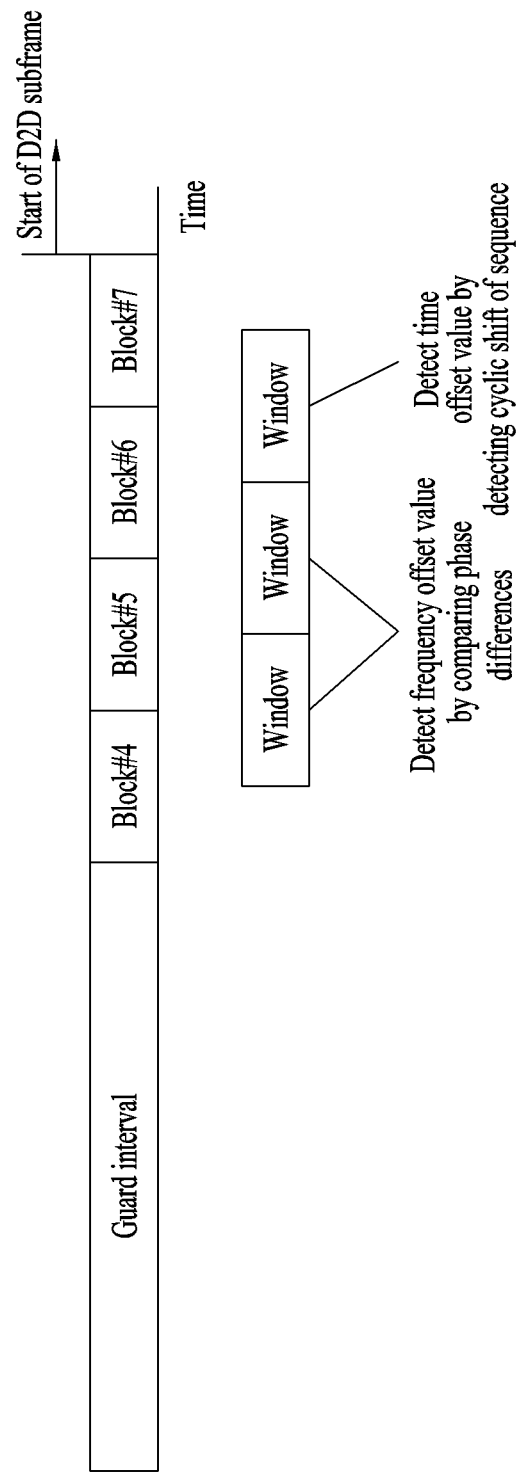
FIG. 57 illustrates a method for acquiring frequency/time synchronization according to an embodiment of the present invention.

FIG. 57 illustrates a method for acquiring frequency/time synchronization according to an embodiment of the present invention.

Constant amplitude zero auto correlation (CAZAC) sequences used for the SRS have a characteristic that a shift in the time domain appears as a cyclic shift of a predetermined base sequence in the frequency domain. Accordingly, when a transmission sequence is detected over two signal blocks using a synchronized frequency while time synchronization has not been acquired as shown in FIG. 56, a sequence to which a cyclic shift corresponding to a time interval between the start point of the actual signal block and the start point of a window having the same length as the signal block has been applied is detected in the frequency domain. Accordingly, the receiver UE can detect an error between the start point of the actual signal block and the start point of the detection window on the basis of a cyclic shift value of a sequence detected once within the window on the assumption that the receiver UE pre-recognizes the base sequence. In addition, the receiver UE can acquire time synchronization with respect to the start point of the D2D subframe on the basis of the detected error. In the following description, the window is referred to as a detection window and a cyclic shift is referred to as CS.

Referring to FIG. 57, the receiver UE can acquire frequency synchronization on the basis of a phase difference between identical signals measured in two detection windows which respectively correspond to signal blocks #4 and #5 and signal blocks #5 and #6 and then detect the start point of the D2D subframe on the basis of a CS value of a sequence detected in a detection window corresponding to signal blocks #6 and #7. The number of signal blocks shown in FIG. 57 is exemplary and can be changed. Furthermore, a method of selecting signal blocks used for the receiver UE to acquire time and frequency synchronization can be varied in various manners.

Figure 58:
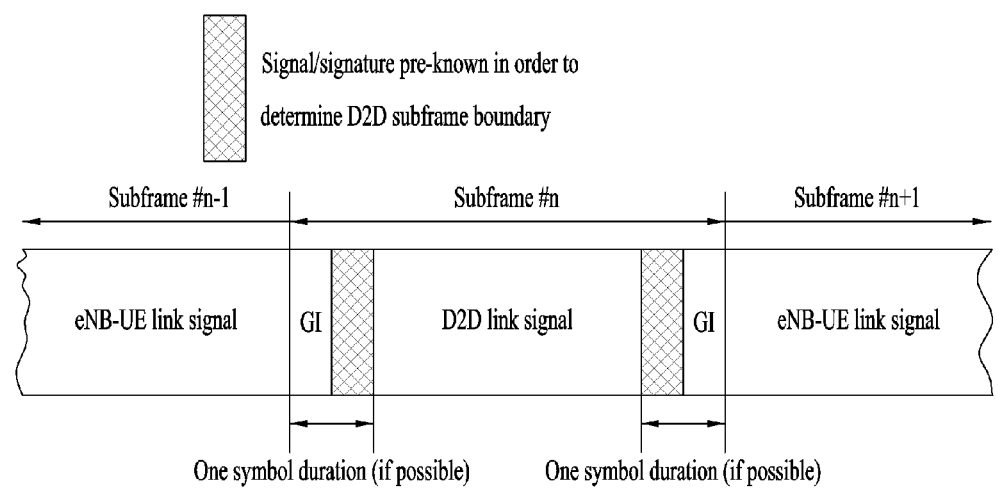
FIG. 58 illustrates a position at which a synchronization signal is transmitted according to an embodiment of the present invention.

FIG. 58 illustrates a position at which the D2D subframe synchronization signal is transmitted according to an embodiment of the present invention.

The D2D subframe synchronization signal can be transmitted prior to transmission of a D2D control signal or a D2D data signal. The D2D subframe synchronization signal can be transmitted at the position shown in FIG. 50, 51 or 52. Alternatively, the D2D subframe synchronization signal may be transmitted using the first OFDM symbol of a subframe allocated as a D2D subframe, as shown in FIG. 58. Furthermore, the D2D subframe synchronization signal appearing at the end of a subframe can be omitted or moved to a different position, as described above.

As described above with reference to FIG. 57, the receiver UE can detect the start point of the D2D subframe after acquisition of frequency/time synchronization. However, if the receiver UE misses a front part of signal blocks during transmission of the signal blocks, the receiver UE may not detect the start point of the D2D subframe because it is difficult to detect the end point of signal block repetition of the D2D subframe synchronization signal. Of course, the UE may detect a point from which the signal block is not detected as the start point of the D2D subframe by continuously observing transmission of the signal block after acquisition of frequency/time synchronization under the condition that the signal block is sufficiently repeated. Alternatively, the UE may detect the start point of the D2D subframe synchronization signal using the start point of the D2D control signal or the D2D data signal. However, such operation is a method depending on energy detection of the signal block and thus reliability may be deteriorated when noise is strong. As a method for overcoming this problem, a method of transmitting or receiving a D2D boundary signal will now be described.

Figure 59:
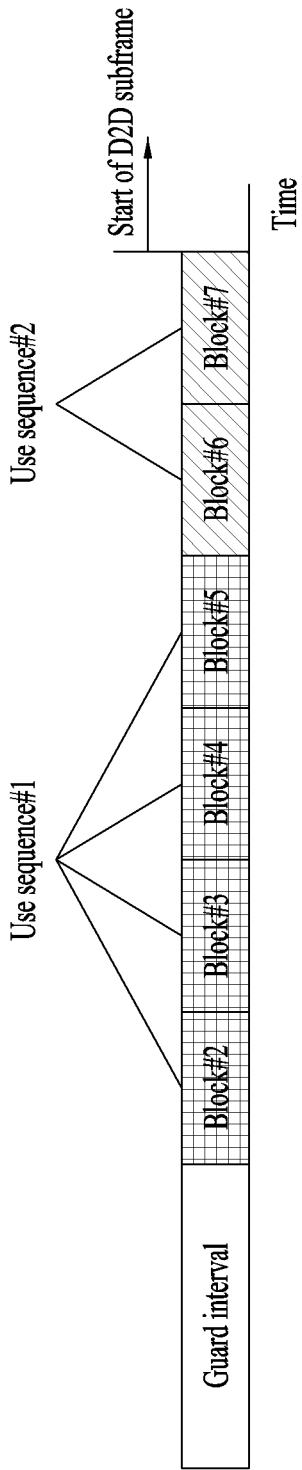
FIG. 59 illustrates a method for detecting a signal start time according to an embodiment of the present invention.

FIG. 59 illustrates a method for detecting the start point of a signal according to an embodiment of the present invention.

Referring to FIG. 59, a signal having a sequence different from the existing signal block can be transmitted in latter signal blocks. It is assumed that six signal blocks are present in FIG. 59. Here, four signal blocks in the front part and two signal blocks in the rear part use different sequences. By using this structure, the receiver UE can acquire frequency/time synchronization on the basis of the front signal blocks and then detect the start point of the D2D subframe on the basis of the rear signal blocks using the sequence different from that of the front signal blocks. Specifically, the receiver UE can attempt to detect the sequence to be transmitted in the rear signal blocks and, upon successful detection of the sequence, immediately detect beginning of the D2D subframe. This principle can be modified in various manners. The number of front signal blocks and the number of rear signal blocks may be changed. However, it is desirable that the number of front signal blocks necessary to acquire frequency/time acquisition be larger than the number of rear signal blocks, in general.

A demodulation reference signal (DM-RS) can be used as the D2D subframe boundary signal. That is, to transmit an additional signal for detecting the start point of the D2D subframe, the DM-RS used to demodulate a D2D signal can be used to detect the start point of the D2D subframe. Particularly, this method is effective when the DM-RS is transmitted upon beginning of the D2D subframe. Here, the DM-RS used to detect the start point of the D2D subframe is referred to as a D2D DM-RS hereinafter. A description will be given of a method for detecting the start point of the D2D subframe using the DM-RS.

Figure 60:
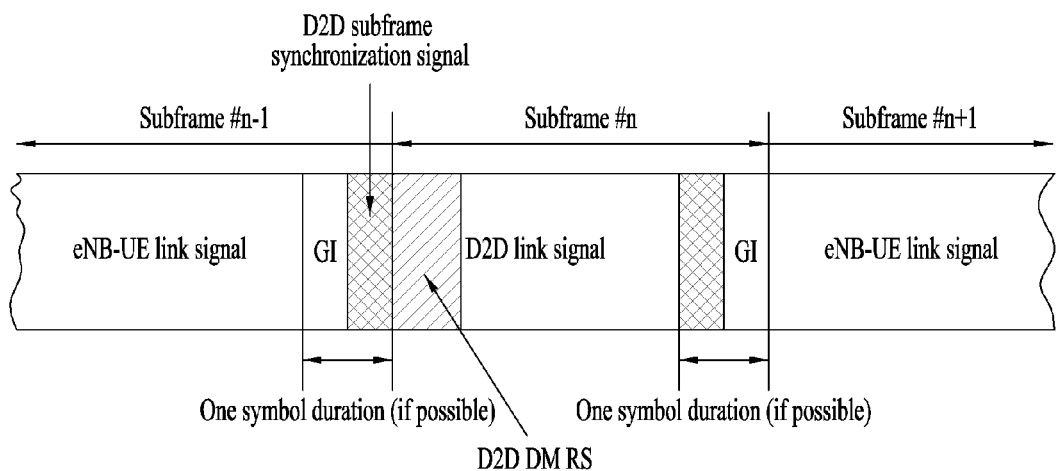
FIGS. 60 and 61 illustrate a method for detecting a signal start time using a DM-RS according to an embodiment of the present invention.
Figure 61:
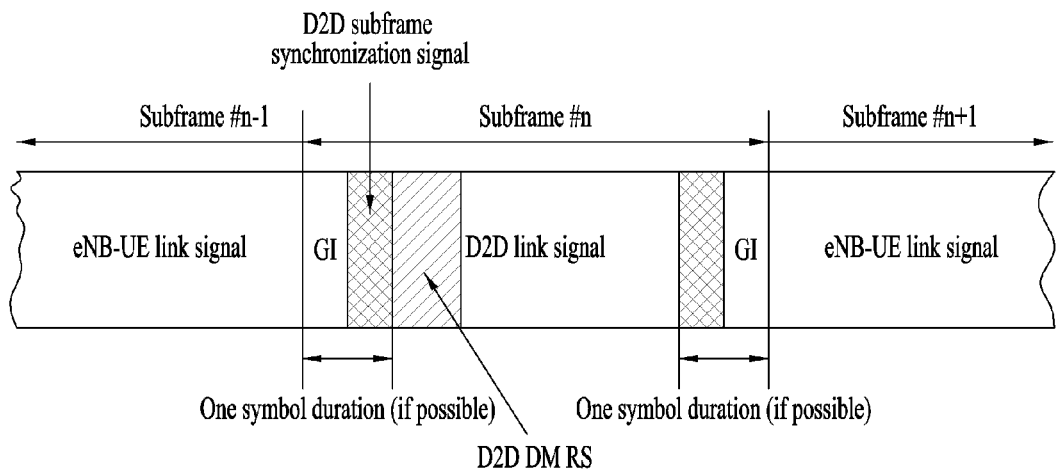

FIGS. 60 and 61 illustrate a method for detecting the start point of the D2D subframe using the DM-RS according to an embodiment of the present invention.

Referring to FIG. 60, the D2D subframe synchronization signal is transmitted using the last symbol of subframe #n−1 which is the preceding subframe, as shown in FIG. 510. In this case, the receiver UE acquires frequency/time synchronization using the D2D subframe synchronization signal and then attempts detection of a D2D DM-RS. Upon successful detection of the D2D DM-RS, the receiver UE can recognize the time when the D2D DM-RS is successfully detected as a time when the D2D subframe synchronization signal is ended and the D2D subframe is started.

Referring to FIG. 61, the D2D subframe synchronization signal is transmitted in the first symbol of the D2D subframe and the D2D DM-RS is transmitted in the second symbol thereof. The D2D subframe synchronization signal and the D2D DM-RS have different transmission durations or subcarrier spacings. Specifically, the D2D DM-RS is preferably transmitted using a full OFDM symbol with a D2D signal, whereas the D2D subframe synchronization signal is transmitted using a part of one OFDM symbol other than a guard interval.

The D2D DM-RS show in FIGS. 60 and 61 may be part of D2D DM-RSs appearing in one D2D subframe. Accordingly, an additional D2D DM-RS may appear in the following OFDM symbol and be used for correct channel estimation for a D2D signal transmitted in the rear part of the subframe. Accordingly, the position of the D2D DM-RS shown in FIGS. 60 and 61 can be interpreted as the position of a D2D DM-RS initially appearing in the D2D subframe.

It may be impossible to achieve stable synchronization through transmission of the D2D subframe synchronization signal for a time shorter than the duration of one symbol as described above. In this case, it is possible to increase the D2D subframe synchronization signal transmission time.

Figure 62:
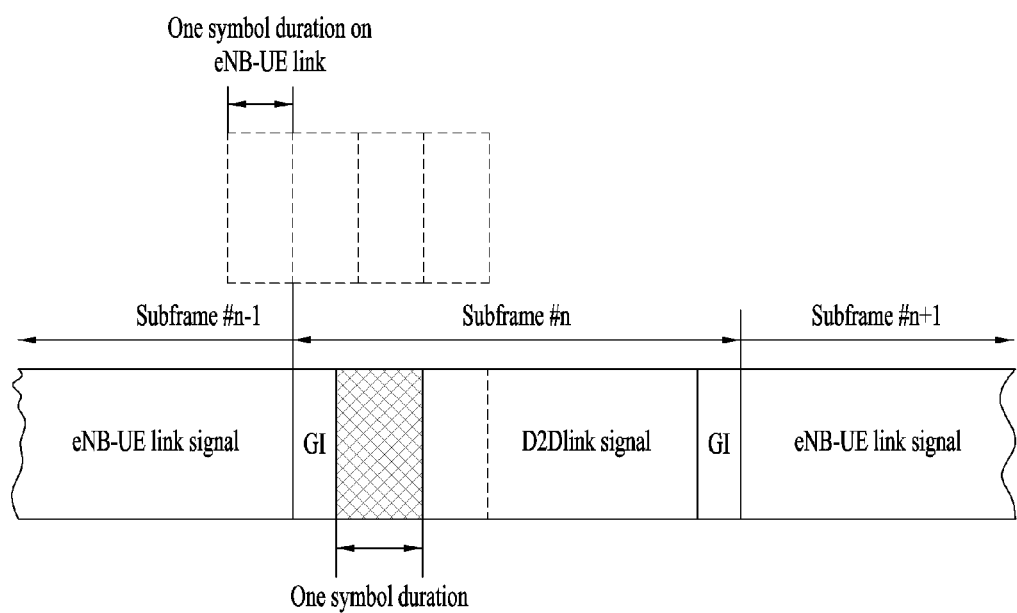
FIGS. 62 and 63 illustrate a method for extending subframe synchronization signal transmission time according to an embodiment of the present invention.
Figure 63:
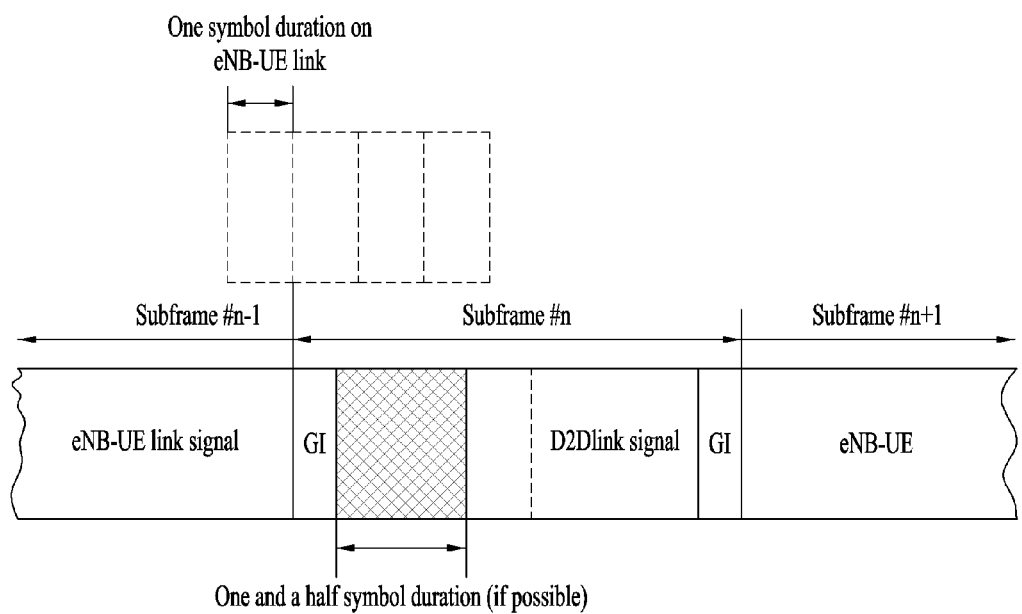

FIGS. 62 and 63 illustrate a method for extending a subframe synchronization transmission time according to an embodiment of the present invention. It is assumed that one guard interval corresponds to half of one symbol duration and transmission of the D2D subframe synchronization signal is omitted in the rear part of subframe #n.

Referring to FIG. 62, the D2D subframe synchronization signal completely occupies one symbol. In this case, since the guard interval for transmission/reception switching is defined as a time shorter than the duration of one symbol, a symbol timing difference may be generated between a D2D subframe and an NU link subframe. In FIG. 62, since it is assumed that one guard interval corresponds to half one symbol duration, the sum of two guard intervals positioned at the boundaries of subframe #n corresponds to one symbol duration. Accordingly, symbols exclusive of one symbol from among available symbols in one subframe can be used to transmit and receive a D2D signal.

In addition, referring to FIG. 62, one of the symbols used to transmit and receive the D2D signal is used for a D2D subframe boundary signal. As a result, the number of symbols that can be used to transmit a control signal or a data signal as the D2D control signal or the D2D data signal is smaller than the number of symbols that can be used for a normal NU link by two.

A transmission time of each symbol is described. Since transmission of a symbol is started from a point delayed by the guard interval in subframe #n, the transmission time of the symbol may differ from that of a symbol of an NU link subframe in which transmission of the symbol is started from the boundary of the subframe. Such difference may make it difficult to obtain orthogonality between a D2D signal and an NU signal according to OFDM in subframe #n. To prevent interference due to this, a specific frequency region between the D2D signal and the NU signal may be set as a guard region which is not used for communication.

Referring to FIG. 63, the D2D subframe boundary signal is transmitted in an interval corresponding to one and a half symbols. Consequently, a symbol that can be used to transmit the D2D control signal or the D2D data signal has the same symbol timing as the NU signal and thus the D2D signal and the NU signal can be orthogonalized through OFDM.

The duration of the transmission time of the D2D subframe boundary signal may depend on whether a UE is located inside or outside of the coverage of the eNB. Here, positioning of the UE outside of the coverage may mean that a transmitter UE is located outside of the coverage or mean that the transmitter UE is located inside of the coverage whereas a receiver UE is located outside of the coverage. Similarly, positioning of the UE inside of the coverage may mean that a UE located outside of the coverage transmits a signal to a UE located inside of the coverage. To clearly discriminate positioning of the UE outside of the coverage from positioning of the UE inside of the coverage, an indicator may be introduced. For example, when a reference signal is transmitted for a UE located outside of the coverage, the indicator can be included in the reference signal to indicate whether the reference signal is a reference signal transmitted inside of the coverage. In this case, UEs located outside of the coverage can recognize whether a potential receiver UE is located inside or outside of the coverage through the indicator.

When a UE performs D2D operation inside of the coverage, it is important that a D2D link signal is well multiplexed with an NU link signal using a different subcarrier in the same subframe. To this end, the two signals need to use the same symbol timing, and thus the duration of an available subframe boundary signal may be restricted. For example, the UE can use a subframe boundary signal having a symbol duration which is not an integer, as described with reference to FIG. 58 or FIG. 63, such that D2D link symbol timing is identical to NU link symbol timing. Particularly, since the UE is relatively well synchronized inside of the coverage, the UE can use a subframe boundary signal having a duration less than the duration of one symbol, as shown in FIG. 58.

When the UE performs D2D operation outside of the coverage, a problem with respect to multiplexing with the NU link signal is not generated. Accordingly, the UE may operate such that D2D link symbol timing differs from NU link symbol timing and thus the UE may use a subframe boundary signal having a duration different from that of the subframe boundary signal used in FIG. 58 or 63, as shown in FIG. 62. Particularly, since satisfactory synchronization of UEs is not achieved outside of the coverage, a subframe boundary signal having a longer duration than the subframe boundary signal used inside of the coverage can be effectively used for more correct synchronization.

In a similar manner, the duration of the subframe boundary signal can be adjusted depending on a carrier frequency. For example, when a carrier at a higher frequency is used, a large frequency error is generated. Accordingly, a subframe boundary signal having a longer duration can be used to correct the frequency error.

While it is assumed that the two guard intervals positioned at the boundaries of subframe #n have the same duration in FIGS. 62 and 63, this is exemplary and the aforementioned principle of the present invention can be applied when the sum of the durations of the two guard intervals is shorter than or equal to the duration of one symbol even if the two guard intervals have different durations.

A description will be given of frequency domain resources occupied by the D2D subframe boundary signal.

When the D2D subframe boundary signal is transmitted for a time shorter than one symbol duration, as shown in FIG. 50, the subcarrier spacing is widened, as shown in FIG. 56. Consequently, the level of interference applied to neighboring subcarriers may increase compared to a case in which one symbol is completely used. Particularly, when inter-carrier interference is present since perfect frequency synchronization between a transmitter and a receiver is not achieved, a signal using a wider subcarrier spacing applies more interference to neighboring subcarriers at the same positions.

It is not necessary to transmit the D2D subframe boundary signal using a large amount of frequency resources, distinguished from a normal control signal or data signal, since the D2D subframe boundary signal is transmitted in order to detect a D2D subframe start point and D2D signal reception power or to acquire frequency synchronization with respect to the D2D signal. Accordingly, the D2D subframe boundary signal described in the present invention can be configured to be transmitted using at a narrower bandwidth than a D2D control signal or data signal following the D2D subframe boundary signal, and thus inter-carrier interference applied by the D2D subframe boundary signal having a transmission time shorter than one symbol to other signals can be mitigated.

Figure 64:
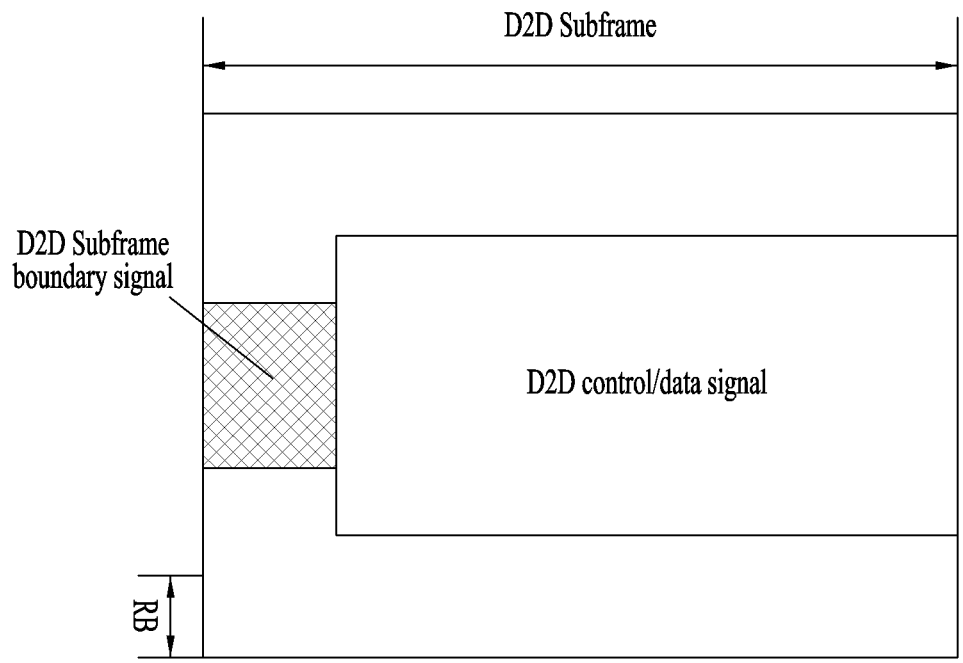
FIGS. 64 and 65 illustrate a resource region of a subframe boundary signal according to an embodiment of the present invention.
Figure 65:
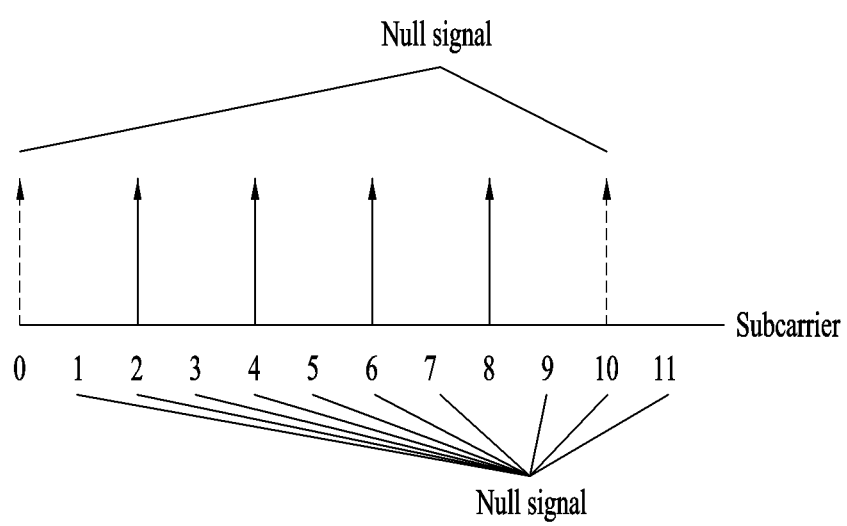

FIGS. 64 and 65 illustrate a method for allocating resources to a subframe boundary signal according to an embodiment of the present invention. While the guard interval is omitted in FIG. 64 for convenience of description, the guard interval may be included in the D2D subframe.

Referring to FIG. 64, the D2D subframe boundary signal can be transmitted in a subset of resource blocks (RSs) in which a D2D control signal or data signal is transmitted. In this case, the D2D subframe boundary signal can be transmitted in some RBs located at the center from among the RBs through which the D2D control signal or data signal is transmitted and the remaining RBs can be used a guard band of RBs in which signals of other UEs are transmitted. When the D2D subframe boundary signal does not use the full symbol duration even in the RBs in which the D2D subframe boundary signal is transmitted, only some subcarriers can be used for signal transmission, as described above with reference to FIGS. 53 to 56.

For example, when the D2D subframe control signal or data signal continuously uses resource blocks from n1 to n2, resource block k is regarded as a center resource block and k1+K2+1 resource blocks from resource block k−k1 to resource block k+k2 are used as the D2D subframe boundary signal. Here, k is determined by k=floor((n1+n2)/N2) where floor(x) can be represented as $\lfloor x \rfloor$ and is defined as a largest integer less than or equal to x. When M resource blocks are used as the D2D subframe boundary signal, k1 and k2 can be set as follows in order to symmetrically configure the D2D subframe boundary signal in a resource block region in which the D2D control signal or data signal is transmitted. When the number of resource blocks used as the D2D subframe boundary signal, M, is an odd number, k1 and k2 can be set to k1=k2=(M−1)/2. When M is an even number, k1 and k2 can be respectively set to k1=M/2−1 and k2=M/2.

The number of resource blocks used as the D2D subframe boundary signal, M, can be simply prefixed as a value such as 1 or 2. Alternatively, the number of resource blocks used as the D2D subframe boundary signal, M, can be determined by the number of resource blocks used by the D2D control signal or data signal, N. Here, N=n2−n1+1. In this case, when N increases, a larger number of resource blocks can be allocated to the D2D subframe boundary signal and thus M is preferably set as a non-decreasing function.

Specifically, M may be M=floor(a×N)(0<a<1) which means that approximately a×100% of resource blocks used for the D2D control signal or data signal are used for the D2D subframe boundary signal. Here, a is an arbitrary value and M can be defined as M≥L all the time in order to guarantee a minimum number of resource blocks for the D2D subframe boundary signal. Here, L indicates a specific minimum value.

Alternatively, a region corresponding to N may be divided into several partial regions, a value M may be allocated per partial region and a value allocated to the corresponding partial region may be used as M when N is given. Preferably, M increases as N increases. However, the value M may be allocated to each partial region such that M maintains at least the same value.

For example, M is set to M=N until N reaches a specific value T such that every available resource block is used to transmit the D2D subframe boundary signal. When N exceeds T, M can be maintained as M=T upon determining that the benefit that can be obtained when more resource blocks are used to transmit the D2D subframe boundary signal is insignificant.

Alternatively, M may be set by dividing N. M=N is maintained until N reaches T1 such that the D2D subframe boundary signal occupies the same resource blocks as those for the D2D control signal or data signal. When N exceeds T1, the region corresponding to N is divided into a plurality of regions and a value M used per region is maintained as a specific value. M, which is set according to the relationship between N and T, is shown in Table 2.

TABLE 2

| | N ≤ T1 | T1 < N ≤ T2 | T2 < N ≤ T3 | T3 < N |
|---|---|---|---|---|
| M | M = N | M = T1 | M = T2 | M = T3 |

Table 2 is exemplary and the relationship between N, T and M may be set in a different manner.

From the viewpoint of subcarriers occupied by the D2D subframe boundary signal transmitted in RBs, inter-carrier interference applied to neighboring RBs can be reduced when subcarriers positioned at boundaries of the corresponding RBs are set such that the subcarriers are not used. This described with reference to FIG. 65.

Referring to FIG. 65, when the D2D subframe boundary signal is transmitted for half the duration of one symbol and thus the signal is applied to every even-numbered subcarrier, interference applied to neighboring RBs can be reduced by applying a null signal to subcarriers positioned at boundaries of one RB. FIG. 65 shows that the null signal is applied to subcarriers #0 and #10. Particularly, operation that does not use subcarriers positioned at boundaries of RBs as the D2D subframe boundary signal is more effective when the bandwidth occupied by a D2D signal is narrow and a signal of another UE is closely present. Accordingly, the aforementioned operation may be selectively performed when the number of RBs occupied by the D2D subframe boundary signal or the D2D control signal or data signal is less than a predetermined value.

A description will be given of methods for detecting a transmission bandwidth of a D2D signal using the aforementioned subframe boundary signal with reference to FIGS. 66 and 67.

Figure 66:
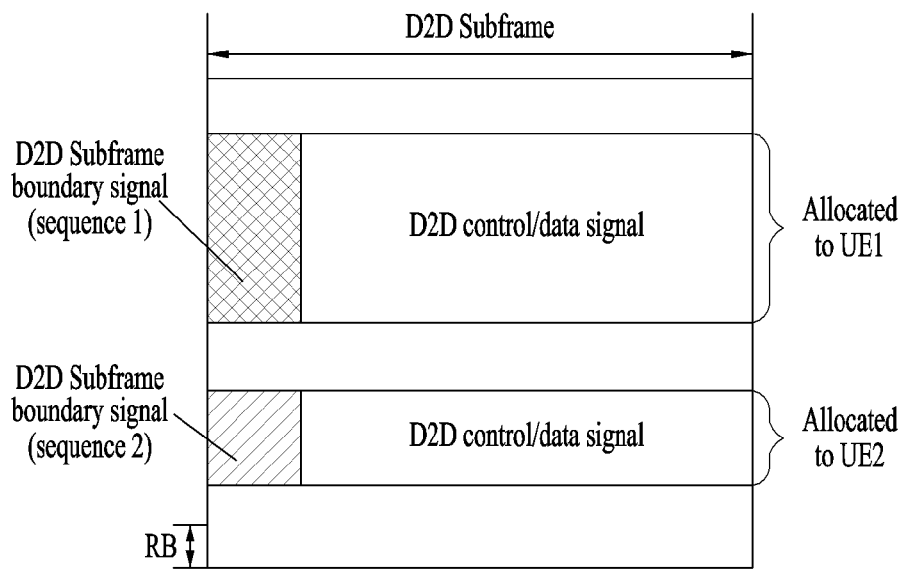
FIGS. 66 and 67 illustrate a method for detecting a transmission bandwidth of a signal according to an embodiment of the present invention.
Figure 67:
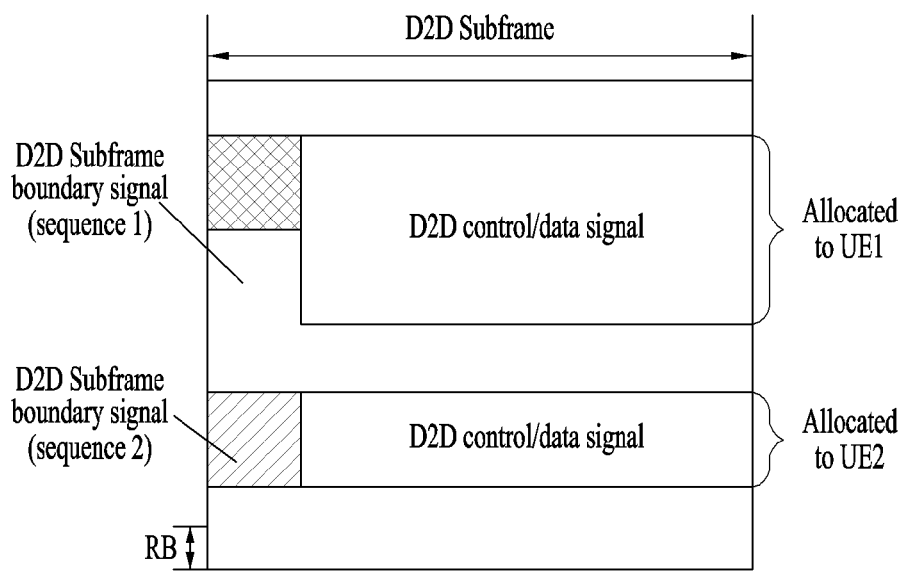

FIGS. 66 and 67 illustrate methods for detecting a transmission bandwidth of a signal according to an embodiment of the present invention.

FIG. 66 illustrates a method for detecting a transmission bandwidth of a corresponding D2D signal using a bandwidth through which a D2D boundary signal is transmitted.

When a specific UE is allocated a specific RB set through D2D transmission and transmits a subframe boundary signal using all the allocated RBs, a receiver UE can detect the transmitted subframe boundary signal, detect a transmission bandwidth of a D2D signal by detecting RBs occupied by the subframe boundary signal and perform signal demodulation.

In this case, to discriminate D2D signals from different UEs, which are frequency-multiplexed in the same subframe, it is desirable that the UEs use different sequences as the subframe boundary signal. To this end, each UEs may allocate a parameter necessary to generate the subframe boundary signal from an eNB or another UE or may randomly determine the parameter when the eNB or other UE does not allocate the parameter. For example, the parameter can be a pseudo random sequence (PRS) generation seed value or a CS value applied to a base sequence. Particularly, a method of setting a parameter on the basis of the ID of a UE can be used as a method for randomly determining the parameter. Since the number of UE IDs is considerably greater than the number of available parameters, in general, the method for setting the parameter may have the form of a hashing function through which IDs of multiple UEs are mapped to one parameter.

In addition, to prevent two UEs from continuously using the same parameter, the hashing function may vary with time. For example, the hashing function can be derived from Equation 9 for use in 3GPP LTE.

$$Y_k = (A \cdot Y_{k-1}) \bmod D \qquad \text{[Equation 9]}$$

Here, $Y_{-1}$ indicates a UE ID, A and D are arbitrary primes and k is a time index, which can indicate a subframe index, for example. In addition, mod indicates modulo operation, and "a mod b" means a remainder obtained when a is divided by b. A UE can determine a parameter combination to be used at the corresponding time by using a final value obtained by performing modulo operation on the value $Y_k$ and a total number of parameter combinations.

Referring to FIG. 66, UE1 and UE2 respectively use 5 RBs and 3 RBs and transmit subframe boundary signals over the entire bands allocated thereto. UE1 and UE2 operate to be discriminated from each other using different sequences. That is, since the sequences of the two transmitter UEs are different, a receiver UE can discriminate regions allocated to the two transmitter UEs from the fact that the sequences of the subframe boundary signals are not consecutive even though the two UEs occupy consecutive resource blocks.

A description will be given of a method for detecting a transmission bandwidth of a D2D signal using a bandwidth through which a D2D boundary signal corresponding to the D2D signal is transmitted as a modification of the method described with reference to FIG. 66.

Referring to FIG. 64 or 67, even when the subframe boundary signal is transmitted only in a subset of a frequency occupied by the D2D signal, a receiver UE can detect the bandwidth of the D2D signal using the bandwidth of the subframe boundary signal. This is because the bandwidth of the subframe boundary signal depends on the frequency region occupied by the D2D signal and thus, when the receiver UE is aware of the rule with respect to the relationship between the bandwidths of the D2D signal and the subframe boundary signal, the receiver UE can detect the bandwidth of the subframe boundary signal and then estimate the bandwidth of the D2D signal according to the rule.

In the aforementioned method, the receiver UE needs to have a function of attempting blind detection of a set of transport blocks in which a subframe boundary signal of a specific sequence is transmitted and estimating a transmission bandwidth of a D2D control signal or data signal on the basis of the detected transport block set. To facilitate such implementation, values available for the transmission bandwidth of the D2D signal can be prefixed to several values and, particularly, the values can be determined by a system bandwidth.

In this case, since a larger number of resource blocks can be used for D2D operation of an individual UE when the system bandwidth is wide, available values for D2D operation of the individual UE may increase according to the system bandwidth. Furthermore, a regulation may be made such that at least one RB must be present between transmissions of D2D signals of two UEs in order to easily detect the boundary between the D2D signals of the two UEs. This regulation may be applied to all D2D control signals or data signals and restrictively applied to the subframe boundary signal.

The method for setting the bandwidth of the subframe boundary signal as a subset of the bandwidth of the D2D control signal or data signal, as described above with reference to FIG. 64 or 67, may be considered to be one embodiment for implementing the second method. Since the subframe boundary signals of the two UEs are not consecutive in resource blocks in any case, the receiver UE can detect the boundary between the subframe boundary signals even though the two UEs transmit the subframe boundary signals of the same sequence.

To this end, even when N RBs are allocated for D2D transmission of a UE, the UE can use only N-k RBs without using the remaining k RBs all the time. Even in this case, the value k may increase according to the system bandwidth or the value N.

Alternatively, the UE may predetermine a base bandwidth, use the base bandwidth for the subframe boundary signal and associate the transmission bandwidth of the D2D control signal or data signal with a transmission parameter of the subframe boundary signal for the D2D control signal or data signal. In this case, a one-to-one relationship between the parameter of the subframe boundary signal and the transmission bandwidth of the D2D signal can be pre-established. The receiver UE attempts to detect the subframe boundary signal on the assumption that the subframe boundary signal is transmitted with the base bandwidth. In this case, the receiver UE needs to assume that various parameters can be used. The receiver UE can detect the transmission bandwidth of the D2D signal, which is associated with the subframe boundary signal, through a finally detected parameter.

Referring to FIG. 67, on the assumption that 3 RBs correspond to the base bandwidth of the subframe boundary signal, a transmitter UE uses sequence 1 when 5 RBs are used for D2D signal transmission and reception and uses sequence 2 when 3 RBs are used for D2D signal transmission and reception.

Similarly, a frequency region in which the subframe boundary signal can be transmitted may be predetermined in order to aid in operation of the receiver UE and the base transmission bandwidth of the subframe boundary signal may increase when the system bandwidth increases. Furthermore, association of a subframe boundary signal with a D2D signal in the frequency domain, that is, which subframe boundary signal is associated with which D2D signal in the frequency domain needs to be determined according to a predetermined rule. This rule can be simply defined such that the bandwidth of the associated D2D signal includes the subframe boundary signal. That is, the receiver UE can detect the subframe boundary signal transmitted through the base bandwidth and then recognize that the D2D control signal or data signal is transmitted through a bandwidth associated with a sequence detected in a region including the subframe boundary signal.

To this end, relative positions of the frequencies of the subframe boundary signal and the D2D control signal or data signal need to be predetermined. For example, a regulation can be made such that the subframe boundary signal is transmitted at the center or one end of the bandwidth of the D2D control signal or data signal or transmitted from a region having a predetermined offset from one end of the bandwidth of the D2D control signal or data signal. FIG. 67 illustrates a case in which the subframe boundary signal is transmitted at one end of the bandwidth of the D2D signal. However, this is exemplary and the present invention is not limited thereto.

If the subframe boundary signal is positioned at the end of a subframe as well as the head of the subframe, the aforementioned operation can be performed and the entire bandwidth of the D2D signal can be used all the time upon determining that the subframe boundary signal disposed at the end of the subframe need not additionally deliver information on the bandwidth.

When the aforementioned method is used, signaling overhead can be reduced since it is possible to transmit information about the bandwidth used for transmission of the D2D control signal or data signal to the receiver UE without additional signaling.

The aforementioned method may be modified into a method of using a DM-RS used to demodulate the D2D control signal or data signal. Particularly, a reference signal transmitted in an interval in which the D2D control signal or data signal is transmitted can be used.

Various types of information other than bandwidth information can be transmitted using the aforementioned principle of transmitting information on the D2D control signal or data signal through parameters of the subframe boundary signal. In this case, the principle of associating a transmission parameter of the subframe boundary signal with a parameter of the D2D control signal or data signal can be usefully used. For example, when a parameter of the subframe boundary signal is selected on the basis of a UE ID according to the aforementioned embodiment, the receiver UE can blind-detect the subframe boundary signal within an available parameter set. Then, the receiver UE can recognize that the D2D control signal or data signal is transmitted from a UE having the ID associated with the detected parameter set at the corresponding position. Accordingly, the receiver UE can selectively receive only a signal transmitted from a transmitter UE in which the receiver UE is interested. The aforementioned principle can be applied to a service ID that defines a service type.

The aforementioned principle can be applied to information on a parameter of a DM-RS present in a D2D control signal or data signal region. Here, the parameter of the DM-RS may be a DM-RS sequence generation seed value or a CS value applied to a base sequence. That is, a specific parameter of the subframe boundary signal can be associated with a specific parameter of the DM-RS.

When a subframe boundary signal parameter is set to a specific value, a specific parameter of the DM-RS can be designated as a specific value according to the association relationship which corresponds to a one-to-one relationship. Alternatively, a specific parameter of the DM-RS can be limited to one of values included in a specific set according to the association relationship. In this case, the association relationship corresponds to a one-to-multiple relationship. Accordingly, the receiver UE can blind-detect subframe boundary signals with various parameters, detect a parameter of a finally detected signal and then recognize a value of a specific parameter of the DM-RS on the basis of the aforementioned association relationship. Alternatively, the receiver UE may recognize possibility that the specific parameter of the DM-RS can use a value.

Particularly, such operation aids in mitigation of the phenomenon that different UEs use the same DM-RS sequence so as to cause serious interference in channel estimation since a D2D transmitter UE randomly selects a parameter of the DM-RS. For example, a CS applied to a sequence can be considered as parameters of the subframe boundary signal and the DM-RS in the aforementioned case.

If a total of 8 CS values is available for the DM-RS, the transmitter UE can randomly select one of the values so as to reduce the probability of generating the same DM-RS sequence as those of other UEs. In this case, however, a receiver UE needs to blind-detect the DM-RS using all 8 CS values It is assumed that the subframe boundary signal has two CS values and 4 DM-RS CS values are associated with each CS value according to the aforementioned principle. The CS values of the subframe boundary signal are represented as CS_boundary1 and CS_boundary2 and the DM-RS CS values are represented as CS_DMRS_1, CS_DMRS_2, CS_DMRS_3, CS_DMRS_4, DM-RS CS_DMRS_5, CS_DMRS_6, CS_DMRS_7 and CS_DMRS_8.

Association of each subframe boundary signal CS value with four DM-RS CS values means that the DM-RS can have one of CS_DMRS_1, CS_DMRS_2, CS_DMRS_3 and CS_DMRS_4 when CS_boundary1 is used for the subframe boundary signal and have one of DM-RS CS_DMRS_5, CS_DMRS_6, CS_DMRS_7 and CS_DMRS_8 when CS_boundary2 is used for the subframe boundary signal. Accordingly, the receiver UE can perform blind detection of the two CS values of the subframe boundary signal and then attempt blind detection only on the set of the DM-RS CS values associated with a detected CS value. Since the set consists of 4 CS values, the total number of blind detections is reduced to 6.

Alternatively, more reliable blind detection may be performed using the subframe boundary signal and the DM-RS together. Here, all combinations of parameters of the two signals are not available. For example, a combination of CS_boundary2 and CS_DMRS_1 respectively applied to the subframe boundary signal and the DM-RS is not present. Accordingly, blind detection can be performed using only available combinations according to the association relationship so as to reduce the number of blind detection combinations. Particularly, when the subframe boundary signal uses a smaller number of subcarriers in order to cover the aforementioned transmission/reception switching operation, the number of parameters of the subframe boundary signal can be reduced. In this case, the number of parameters available for the subframe boundary signal can be limited. Accordingly, when a one-to-multiple relationship is established between subframe boundary signal parameters and DM-RS parameters, the number of selectable DM-RS parameters can be maintained. That is, when multiple DM-RS parameters are associated with one subframe boundary signal parameter, the number of selectable DM-RS parameters can be maintained.

For example, if 12 CS values are available for the DM-RS, the subframe boundary signal can be allocated 3 CS values each of which is associated with 4 DM-RS CS values. In addition, in order to further smooth double CS blind detection, it is desirable that preferentially detected subframe boundary signal values be composed of CS values having a large difference therebetween. In other words, it is desirable that detected subframe boundary signals be composed of CS values with large delta CS values.

When the aforementioned operation is applied, the subframe boundary signal is a preferentially detected signal and thus reliability of subframe boundary signal detection can be considered to be important. For detection reliability, in the case of a UE including multiple transmission antennas, particularly, a technique of changing a precoder applied to the subframe boundary signal per transmitted modulation symbol (or symbol group of a series of modulation symbols) can be applied.

For example, when subframe boundary signal sequences are sequentially mapped to frequencies, it is possible to transmit a signal while changing a precoder used per transmission subcarrier according to a predetermined rule. Accordingly, even when a specific receiver UE cannot successfully receive a specific precoder signal, subframe boundary signal detection above a predetermined level is possible since different precoders are used for at least some subcarriers.

Alternatively, when the subframe boundary signal is transmitted at the start and end of a subframe, as shown in FIG. 58, a precoder applied to the start of the subframe can be set to be different from a precoder applied to the end of the subframe. In such operation, a receiver UE may detect a state of a channel between the receiver UE and a transmitter UE, that is, channel phase information, using a subframe boundary signal sequence detected through blind detection and a predetermined precoder change rule. Here, the information can be used for channel estimation using a DM-RS so as to promote performance improvement.

As another method for improving DM-RS parameter blind detection performance, a precoder applied to the subframe boundary signal is set to differ from a precoder applied to the DM-RS. In this case, even when the precoder used for one signal is disadvantageous for a specific receiver UE, the possibility that the other signal uses a satisfactory precoder is high. Accordingly, stable blind detection can be performed using the aforementioned association relationship between the two signals. When the transmitter UE uses one transmission antenna, phases of the two signals can be set according to a specific rule or randomly.

In addition, when the receiver UE is aware of the relationship between the precoders or phases of the two signals, the receiver UE may perform channel estimation by combining all or part of the subframe boundary signal with the DM-RS. For example, when the subframe boundary signal is alternately transmitted through two transmission antennas and the DM-RS is transmitted through the first antenna, channel estimation can be performed by combining only the part of the subframe boundary signal, which is transmitted through the first antenna, with the DM-RS. When the receiver UE is not aware of the relationship between the precoders of the two signals (for example, when the transmitter UE randomly selects precoders) or cannot separately detect a channel component after a precoder, which commonly appears for all precoders, since the receiver UE can estimate only valid channels between the transmitter UE and the receiver UE including precoders even if the receiver UE is aware of the precoder relationship, the receiver UE cannot perform channel estimation for demodulation by combining the two signals. However, the receiver UE may perform an operation of considering a long-term channel property such as quasi-co-location information (i.e., Doppler spread, Doppler shift and average delay) obtained from the subframe boundary signal to be the same as the DM-RS.

In the above description, a precoder represents antenna selection for selecting an antenna from the antennas of the transmitter UE, which will be used for actual transmission. For example, if the transmitter UE has two antennas, precoders $[1\ 0]^T$ and $[0\ 1]^T$ respectively represent use of the first and second antennas for signal transmission.

In application of the aforementioned principle, subframe boundary signal parameters and DM-RS parameters, which are associated, may be combined in various manners. Furthermore, the number of blind detection attempts on the subframe boundary signal and the number of blind detection attempts on the DM-RS may be combined in various manners. If the subframe boundary signal uses a smaller amount of subcarriers or needs to be used for the aforementioned time/frequency tracking, blind detection reliability may be decreased and thus it may be desirable to reduce the number of blind detections of the subframe boundary signal to blow that of the DM-RS. Otherwise, to detect all given DM-RS parameters through a minimum number of blind detections, the numbers of blind detections performed on the two signals can be set to be identical. For example, 8 blind detections can be performed by associating every 4 DM-RS parameter candidates. In addition, the aforementioned principle may be applied to a case of determining a scrambling seed value that randomizes D2D data in addition to the DM-RS parameters.

When at least one subframe boundary signal parameter, selected from a given candidate group, is transmitted, the receiver UE operates to blind-detect the parameter. Through such operation, other information may be transmitted. For example, information on whether a signal of the corresponding transmission subframe and a signal of the previous transmission subframe can be combined and received can be transmitted. Here, combining the signals of the two subframes may include integrating DM-RSs in the two subframes and performing channel estimation. For example, more stable channel estimation can be performed by carrying out linear combination such as averaging the DM-RSs of the two subframes on the assumption that valid channels including precoders are identical in the two subframes. Otherwise, only indirect combination may be performed by performing channel estimation on the assumption that large-scale parameters, such as Doppler spread, Doppler shift and average delay, are identical in the two subframes even though the DM-RSs of the two subframes cannot be directly combined due to spacing between the two subframes.

Furthermore, when decoding is performed on the assumption that information bits of D2D data transmitted in the two subframes or scrambling sequences applied thereto are identical, decoding can be performed using the average of demodulation symbols in the two subframes.

In this case, the receiver UE can operate upon determining that all or part of the aforementioned signal combination is possible for subframes having the same detected subframe boundary signal parameter. To this end, the transmitter UE needs to maintain subframe boundary signal parameters when transmitting the same signal as that of a previous subframe or using the same precoding as in the previous subframe and to change the subframe boundary signal parameters when the property of the transmitted signal is changed such that the receiver UE does not combine signals. For example, when new D2D data information different from that transmitted in a previous subframe is transmitted, the transmitter UE can set subframe boundary signal parameters different from those of the previous subframe.

Figure 68:
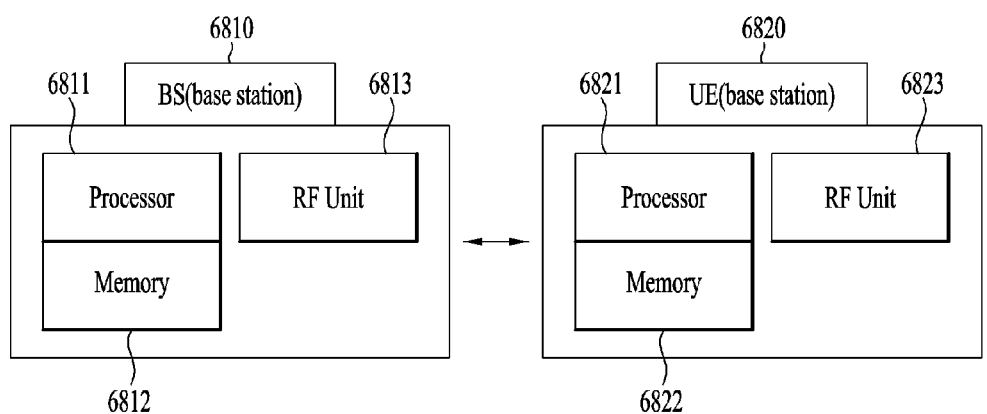
FIG. 68 is a block diagram of a communication apparatus according to an embodiment of the present invention.

FIG. 68 is a block diagram of a communication apparatus according to an embodiment of the present invention.

Referring to FIG. 68, a wireless communication of the present invention includes a BS and a UE.

A transmitter may be part of the BS 6810 and a receiver may be part of the UE 6820 on downlink. The transmitter may be part of the UE 6820 and the receiver may be part of the BS 6810 on uplink. The BS 6810 includes a processor 6811, a memory 6812 and a radio frequency (RF) unit 6813. The processor 6811 may be configured to implement the procedures and/or methods proposed by the present invention. The memory 6812 is connected to the processor 6811 and stores various types of information related to operation of the processor 6811. The RF unit 6813 is connected to the processor 6811, and transmits and/or receives RF signals. The UE 6820 includes a processor 6821, a memory 6822 and a radio frequency (RF) unit 6823. The processor 6821 may be configured to implement the procedures and/or methods proposed by the present invention. The memory 6822 is connected to the processor 6821 and stores various types of information related to operation of the processor 6821. The RF unit 6823 is connected to the processor 6821, and transmits and/or receives RF signals. The BS 6810 and/or the UE 6820 may have a single antenna or multiple antennas.

The above-described embodiments correspond to combination of elements and features of the present invention in prescribed forms. Additionally, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention are described centering on the signal transmission/reception relations between a UE and a base station. These transmission/reception relations are equally/similarly extended even in the case of signal transmission/reception between a UE and a relay or between a base station and a relay. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, "base station" can be replaced by such a terminology as a fixed station, a Node B, an eNode B (eNB), an access point and the like and "terminal" can be replaced by such a terminology as a user equipment (UE), a mobile station (MS), a mobile subscriber station (MSS) or the like.

Embodiments of the present invention can be implemented using various means. For instance, embodiments of the present invention can be implemented using hardware, firmware, software and any combinations thereof. When implemented by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and the like.

In case of the implementation by firmware or software, a method according to each embodiment of the present invention can be implemented by modules, procedures, and/or functions for performing the above-explained functions or operations. Software code is stored in a memory unit and is then driven by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention cover the modifications and variations of this invention that come within the scope of the appended claims and their equivalents.

INDUSTRIAL APPLICABILITY

While the method for setting resources in D2D communication and the apparatus therefor have been described in the context of a 3GPP LTE system, the present invention is also applicable to many other wireless communication systems.

The invention claimed is:

1. A method for receiving, by a first user equipment (UE), a signal through device-to-device (D2D) communication in a wireless communication system, the method comprising: receiving a first synchronization signal from a second UE and a second synchronization signal from a third UE;
acquiring synchronization of the second UE and the third UE based on the first synchronization signal and the second synchronization signal;
receiving a first boundary signal from the second UE and a second boundary signal from the third UE; and
receiving a first D2D signal from the second UE based on the first boundary signal and a second D2D signal from the third UE based on the second boundary signal,
wherein the first synchronization signal and the second synchronization signal are transmitted using a part of one symbol, respectively,
wherein the first D2D signal and the second D2D signal are frequency-multiplexed in a same subframe,
wherein the first UE discriminates the first D2D signal and the second D2D signal based on the first boundary signal and the second boundary signal, and
wherein the first boundary signal and the second boundary signal are transmitted using difference sequences.

2. The method according to claim 1, wherein the symbol includes N intervals, the first and second synchronization signals are transmitted using M intervals from among the N intervals and the remaining N-M intervals are used as a guard interval.

3. The method according to claim 2, wherein the first and second synchronization signals are repeated in the M intervals.

4. The method according to claim 3, wherein the synchronization is acquired based on a difference between starting points of the first and second synchronization signals and a starting point of a window.

5. The method according to claim 1, wherein the first and second boundary signals are transmitted using a sequence different from the first and second synchronization signals.

6. The method according to claim 1, wherein the receiving of the first and second D2D signals based on the first and second boundary signals comprises determining a bandwidth of the first and second D2D signals based on a bandwidth of the first and second boundary signals.

7. The method according to claim 6, wherein the bandwidths of the first and second boundary signals are a subset of the bandwidths of the first and second D2D signals.

8. The method according to claim 7, wherein the first and second boundary signals are transmitted in resource blocks k−k1 to k+k2,
the first and second D2D signals are transmitted in resource blocks n1 to n2, and
k is determined by floor((n1+n2)/2).

9. The method according to claim 8, wherein the number of resource blocks in which the first and second boundary signals are transmitted is determined by the number of resource blocks in which the first and second D2D signals are transmitted.

10. The method according to claim 9, wherein the resource blocks in which the first and second boundary signals are transmitted are grouped into a plurality of groups, and the number of resource blocks in which the first and second boundary signals are transmitted is determined per group.

11. The method according to claim 1, wherein the first and second boundary signals are generated based on specific parameters, and
wherein the specific parameters are determined based on a hashing function by which IDs of the second and third UEs are mapped to one parameter.

12. The method according to claim 1, wherein the first and second boundary signals are generated based on specific parameters, and
> wherein the specific parameters are associated with transmission parameters of the first and second D2D signals.

13. The method according to claim 12, wherein the transmission parameters are grouped into a plurality of groups, and
> wherein the groups are associated with the specific parameters.

14. The method according to claim 12, wherein transmission parameters include at least one of the bandwidth of the first D2D signal, the bandwidth of the second D2D signal and a demodulation reference signal parameter.

* * * * *